(12) United States Patent
Hiramatsu et al.

(10) Patent No.: US 10,023,150 B2
(45) Date of Patent: Jul. 17, 2018

(54) SEAT BELT RETRACTOR AND SEAT BELT APPARATUS PROVIDED WITH SAME

(71) Applicant: JOYSON SAFETY SYSTEMS JAPAN K.K., Tokyo (JP)

(72) Inventors: Koji Hiramatsu, Tokyo (JP); Tetsuya Yamamoto, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 238 days.

(21) Appl. No.: 15/030,220

(22) PCT Filed: Nov. 21, 2014

(86) PCT No.: PCT/JP2014/080928
§ 371 (c)(1),
(2) Date: Apr. 18, 2016

(87) PCT Pub. No.: WO2015/076377
PCT Pub. Date: May 28, 2015

(65) Prior Publication Data
US 2016/0244021 A1  Aug. 25, 2016

(30) Foreign Application Priority Data
Nov. 25, 2013 (JP) .................. 2013-243096

(51) Int. Cl.
*B60R 22/46* (2006.01)
*B60R 22/34* (2006.01)
*B60R 22/28* (2006.01)

(52) U.S. Cl.
CPC .......... *B60R 22/4676* (2013.01); *B60R 22/28* (2013.01); *B60R 22/3413* (2013.01);
(Continued)

(58) Field of Classification Search
CPC ........ B60R 22/4628; B60R 2022/4642; B60R 2022/287
(Continued)

(56) References Cited

U.S. PATENT DOCUMENTS 5,611,498 A * 3/1997 Miller, III et al. . B60R 22/3413
242/379.1
5,799,893 A * 9/1998 Miller, III et al. . B60R 22/3413
242/379.1
(Continued)

FOREIGN PATENT DOCUMENTS

JP  H11-192924 A  7/1999
JP  2000-025567 A  1/2000
(Continued)

OTHER PUBLICATIONS

International Search Report for PCT/JP2014/080928 dated Feb. 24, 2015.

*Primary Examiner* — Toan To
(74) *Attorney, Agent, or Firm* — Foley & Lardner LLP

(57) ABSTRACT

[Object] To provide a seat belt retractor that is capable of generating a more stable load when restricting a load acting on the seat belt and when absorbing energy, and a seat belt apparatus including the same.
[Solution] A seat belt retractor 3 includes a frame 11, a seat belt 4, a spool 12 that is rotatably supported by the frame 11 and that retracts the seat belt 4, a lock mechanism 60 that allows rotation of the spool 12 while not in operation and that prevents rotation of the spool 12 in a seat belt withdrawing direction while in operation, and an energy absorption mechanism 20 that restricts a load acting on the seat belt 4 and that absorbs energy of an occupant. In the seat belt retractor 3, the energy absorption mechanism 20 includes a first energy absorption member 21 that absorbs energy through a rotational difference between the spool 12 and the
(Continued)

lock mechanism 60, a first energy transmission member 22 that is attached on one end side of the first energy absorption member 21, a second energy transmission member 23 that meshes with the first energy transmission member 22, and a second energy absorption member 24 that absorbs energy through a rotational difference between the second energy transmission member 23 and the spool 12.

15 Claims, 51 Drawing Sheets

(52) U.S. Cl.
CPC .... *B60R 22/4628* (2013.01); *B60R 2022/287* (2013.01); *B60R 2022/288* (2013.01); *B60R 2022/4642* (2013.01); *B60R 2022/4685* (2013.01)

(58) Field of Classification Search
USPC ....... 280/806, 807; 242/374, 390.8; 297/483
See application file for complete search history.

(56) References Cited

U.S. PATENT DOCUMENTS

| | | | |
|---|---|---|---|
| 6,206,315 B1 | 3/2001 | Wier | |
| 6,250,579 B1 | 6/2001 | Bannert et al. | |
| 6,616,081 B1 | 9/2003 | Clute et al. | |
| 2005/0284978 A1* | 12/2005 | Zolkower | B60R 22/3413 242/382.4 |
| 2006/0022077 A1 | 2/2006 | Hiramatsu | |
| 2006/0022078 A1 | 2/2006 | Kitazawa et al. | |
| 2006/0214043 A1* | 9/2006 | Nomura | B60R 22/3413 242/374 |
| 2006/0267331 A1* | 11/2006 | Tanaka | B60R 22/44 280/806 |
| 2010/0301152 A1 | 12/2010 | Fleischmann et al. | |
| 2011/0011969 A1 | 1/2011 | Ogawa | |
| 2011/0049283 A1* | 3/2011 | Nakaoka | B60R 22/46 242/374 |
| 2011/0121120 A1 | 5/2011 | Ogawa et al. | |
| 2012/0043407 A1 | 2/2012 | Ogawa et al. | |
| 2012/0049500 A1 | 3/2012 | Wang et al. | |
| 2012/0074253 A1 | 3/2012 | Dahlquist et al. | |
| 2013/0240655 A1* | 9/2013 | Yanagawa | B60R 22/34 242/407 |
| 2016/0221532 A1* | 8/2016 | Yamamoto | B60R 22/46 |

FOREIGN PATENT DOCUMENTS

| | | |
|---|---|---|
| JP | 2001-354111 A | 12/2001 |
| JP | 2006-062632 A | 3/2006 |
| JP | 3775046 B2 | 5/2006 |
| JP | 2008-126817 A | 6/2008 |
| JP | 4524732 B2 | 8/2010 |
| JP | 2011-079387 A | 4/2011 |
| JP | 2011-105281 A | 6/2011 |
| JP | 2012-528754 A | 11/2012 |
| WO | WO-2009/123314 A1 | 10/2009 |
| WO | WO-2010/119778 A1 | 10/2010 |

* cited by examiner

SEAT BELT RETRACTOR AND SEAT BELT APPARATUS PROVIDED WITH SAME

TECHNICAL FIELD

The present invention relates to a technical field of a seat belt retractor that retracts a seat belt in a retractable and withdrawable manner. In particular, the present invention relates to a technical field of a seat belt retractor and a seat belt apparatus, which is provided with the seat belt retractor provided with an energy absorption mechanism (hereinafter, also referred to as an EA mechanism) that, when preventing withdrawal of the seat belt in an emergency, such as when a rapid vehicle deceleration acts on the vehicle in a case of collision or the like in a seat belt worn state, absorbs energy of an occupant by restricting a load acing on the seat belt with an operation of an energy absorption member, such as deformation of a screw of a torsion bar.

BACKGROUND ART

Hitherto, a seat belt apparatus equipped in a vehicle, such as an automobile, prevents an occupant from being thrown out from the seat in an emergency described above by restricting the occupant with a seat belt.

Such a seat belt apparatus is provided with a seat belt retractor that retracts the seat belt. In such a seat belt retractor, when the seat belt is not worn, the seat belt is retracted in a spool, and when worn, the seat belt is withdrawn and is worn by an occupant. Furthermore, in an emergency such as the one described above, withdrawal of the seat belt is prevented by an operation of a lock mechanism of the seat belt retractor preventing rotation of the spool in a seat belt withdrawing direction. With the above, in an emergency, the seat belt restricts the occupant.

Incidentally, in the above known seat belt retractor of the seat belt apparatus, when the seat belt restricts the occupant in an emergency, such as in a vehicle collision, since a rapid vehicle deceleration occurs, the occupant is made to move forward due to a large inertia. Accordingly, a large load is applied to the seat belt and a large energy is applied to the occupant by the seat belt. The energy is not particularly a problem to the occupant but, if possible, it is desirable that the energy is restricted.

Accordingly, conventionally, a seat belt retractor has been developed that is provided with a torsion bar so that, in a state in which the seat belt is worn and in an emergency, the load acting on the seat belt is restricted and energy is absorbed.

However, in conventional seat belt retractors, only a single limit load is set for the limit load after the collision. In actuality, the energy applied to the occupant differs in various manners depending on the weight and the like of the occupant. Rather than responding to such a large energy that differ variously with a single limit load, by setting limit loads according to the circumstances of the vehicle in an emergency, the occupant can be restricted in a more effective and adequate manner.

Accordingly, seat belt retractors that are capable of setting various limit loads applied to the seat belt have been proposed (see Patent Literature 1 and Patent Literature 2, for example).

The seat belt retractors disclosed in Patent Literature 1 and Patent Literature 2 are each provided with two EA mechanisms each having a different EA characteristics, and one or two EA mechanisms are operated according to the state of the emergency. As described above, by selectively operating the two EA mechanisms according to the state of the emergency as appropriate, the limit load applied to the seat belt can be set in two stages.

CITATION LIST

Patent Literature

PTL 1: Japanese Patent No. 4524732
PTL 2: Japanese Patent No. 3775046

SUMMARY OF INVENTION

Technical Problem

In a seat belt retractor described in PTL 1, as illustrated in FIG. 1 of PTL 1, a torsion bar includes a section that has a large cross-section and a section that has a small cross-section that are serially connected to each other. Furthermore, in using the seat belt retractor, the section having a large cross-section and the section having a small cross-section are switched depending on the withdrawal speed of the belt. Since the torsion bar is a serial connection of sections having different diameters, the length of each section is short in the axial direction. Accordingly, the operation stroke of each section of the torsion bar is short such that there are cases in which the load on the torsion bar during operation easily increases abruptly, causing unstableness.

Furthermore, PTL 2 describes a seat belt retractor in which torsion bars are disposed inside a spool in a parallel manner. The seat belt retractor described in PTL 2 switches between using a first torsion bar and using both the first torsion bar and a second torsion bar. Accordingly, in a case in which both the first torsion bar and the second torsion bar are used, since loads that are generated in the two torsion bars that have different characteristics are applied, there are cases in which the total amount of load is unstable.

The present invention has been made in view of the above circumstances and an object thereof is to provide a seat belt retractor that is capable of generating a more stable load when restricting a load acting on the seat belt and when absorbing energy, and a seat belt apparatus provided with the same.

Solution to Problem

In order to overcome the above problems, a seat belt retractor of the present invention includes, a frame, a seat belt, a spool that is rotatably supported by the frame and that retracts the seat belt, a lock mechanism that allows rotation of the spool while not in operation and that prevents rotation of the spool in a seat belt withdrawing direction while in operation, and an energy absorption mechanism that restricts a load acting on the seat belt and that absorbs energy of an occupant. In the seat belt retractor, the energy absorption mechanism includes a first energy absorption member that absorbs energy through a rotational difference between the spool and the lock mechanism, a first energy transmission member that is attached on one end side of the first energy absorption member, a second energy transmission member that meshes with the first energy transmission member, and a second energy absorption member that absorbs energy through a rotational difference between the second energy transmission member and the spool.

Furthermore, in a seat belt retractor of the present invention, the energy absorption mechanism includes a third energy absorption mechanism that absorbs energy through a rotational difference between the second energy transmission member and the spool.

Furthermore, in a seat belt retractor of the present invention, the energy absorption mechanism includes a third energy transmission member that meshes with the first energy transmission member, and a third energy absorption member that is in a parallel relationship with the second energy transmission member and that absorbs energy through a rotational difference between the third energy transmission member and the spool.

Furthermore, in a seat belt retractor of the present invention, the energy absorption mechanism includes a moving member that integrally rotates with the spool and that moves, with respect to the spool, to a first position and a second position that is different from the first position, and a cover member that transmits rotation of the moving member to the first energy transmission member when the moving member is in the first position and that becomes separated from the moving member when the moving member is in the second position.

Furthermore, in a seat belt retractor of the present invention, the energy absorption mechanism includes a moving member holder that holds the moving member when the moving member is in the first position.

Furthermore, a seat belt retractor of the present invention includes a drive mechanism that moves the moving member.

Furthermore, in a seat belt retractor of the present invention, the drive mechanism includes a drive member, a press member that is driven by the drive member and that moves the moving member to the first position and the second position, and a housing that movably supports the press member and in which the drive member is installed.

Furthermore, in a seat belt retractor of the present invention, the housing includes a cam portion against which the press member is capable of abutting, and the press member is separated from the cam portion before the drive member is operated and the press member abuts against the cam portion when the drive member is operated.

Furthermore, a seat belt retractor of the present invention includes an occupant information acquisition unit that acquires occupant information, and a controller that determines whether the occupant information acquired by the occupant information acquisition unit satisfies a condition set in advance and that operates the drive mechanism according to a determination result.

Furthermore, a seat belt retractor of the present invention includes a pretensioner mechanism that rotates the spool in a seat belt retracting direction when in an emergency.

Furthermore, in a seat belt retractor of the present invention, the controller operates the drive mechanism according to the determination result, after the pretensioner mechanism has completed retracting the seat belt.

Furthermore, in a seat belt retractor of the present invention, the controller operates the drive mechanism according to the determination result, before or at a same time as the pretensioner mechanism starts to retract the seat belt.

Furthermore, a seat belt retractor of the present invention includes a frame, a seat belt, a spool that is rotatably supported by the frame and that retracts the seat belt, a lock mechanism that allows rotation of the spool while not in operation and that prevents rotation of the spool in a seat belt withdrawing direction while in operation, an energy absorption mechanism that restricts a load acting on the seat belt and that absorbs energy of an occupant, a drive mechanism that switches energy absorbed by the energy absorption mechanism, a pretensioner mechanism that rotates the spool in a seat belt retracting direction when in an emergency, an occupant information acquisition unit that acquires occupant information, and a controller that determines whether the occupant information acquired by the occupant information acquisition unit satisfies a condition set in advance and that operates the drive mechanism according to a determination result. In the seat belt retractor, the controller operates the drive mechanism according to the determination result, after the pretensioner mechanism has completed retracting the seat belt.

Furthermore, a seat belt retractor of the present invention includes a frame, a seat belt, a spool that is rotatably supported by the frame and that retracts the seat belt, a lock mechanism that allows rotation of the spool while not in operation and that prevents rotation of the spool in a seat belt withdrawing direction while in operation, an energy absorption mechanism that restricts a load acting on the seat belt and that absorbs energy of an occupant, a drive mechanism that switches energy absorbed by the energy absorption mechanism, a pretensioner mechanism that rotates the spool in a seat belt retracting direction when in an emergency, an occupant information acquisition unit that acquires occupant information, and a controller that determines whether the occupant information acquired by the occupant information acquisition unit satisfies a condition set in advance and that operates the drive mechanism according to a determination result. The controller operates the drive mechanism according to the determination result, before or at a same time as the pretensioner mechanism starts to retract the seat belt.

Furthermore, a seat belt apparatus of the present invention at least includes a seat belt that restricts an occupant, a seat belt retractor that retracts the seat belt while allowing the seat belt to be withdrawn, the seat belt retractor operating in an emergency so as to stop withdrawal of the seat belt, a tongue that is slidably supported by the seat belt that has been withdrawn from the seat belt retractor, and a buckle that is provided on the vehicle body or on the vehicle seat, the tongue being locked to the buckle so as to be capable of being engaged and disengaged, in which the seat belt retractor of the above is used as the seat belt retractor.

Advantageous Effects of Invention

According to a seat belt retractor configured in the above manner, since the seat belt retractor includes a frame, a seat belt, a spool that is rotatably supported by the frame and that retracts the seat belt, a lock mechanism that allows rotation of the spool while not in operation and that prevents rotation of the spool in a seat belt withdrawing direction while in operation, and an energy absorption mechanism that restricts a load acting on the seat belt and that absorbs energy of an occupant, and since the energy absorption mechanism includes a first energy absorption member that absorbs energy through a rotational difference between the spool and the lock mechanism, a first energy transmission member that is attached on one end side of the first energy absorption member, a second energy transmission member that meshes with the first energy transmission member, and a second energy absorption member that absorbs energy through a rotational difference between the second energy transmission member and the spool, a more stable load can be generated when absorbing energy while restricting the load acting on the seat belt.

Furthermore, in a seat belt retractor of the present invention, since the energy absorption mechanism includes a third energy absorption mechanism that absorbs energy through a rotational difference between the second energy transmission member and the spool, the absorption of energy can be performed in three separate stages and control of the EA mechanism matching the occupant can be performed.

Furthermore, in a seat belt retractor of the present invention, since the energy absorption mechanism includes a third energy transmission member that meshes with the first energy transmission member, and a third energy absorption member that is in a parallel relationship with the second energy transmission member and that absorbs energy through a rotational difference between the third energy transmission member and the spool, control of the EA mechanism matching the occupant can be performed.

Furthermore, in a seat belt retractor of the present invention, the energy absorption mechanism includes a moving member that integrally rotates with the spool and that moves, with respect to the spool, to a first position and a second position that is different from the first position, and a cover member that transmits rotation of the moving member to the first energy transmission member when the moving member is in the first position and that becomes separated from the moving member when the moving member is in the second position, the stages of the energy absorption can be appropriately switched.

Furthermore, in a seat belt retractor of the present invention, since the energy absorption mechanism includes a moving member holder that holds the moving member when the moving member is in the first position, the moving member can be held appropriately.

Furthermore, since a seat belt retractor of the present invention includes a drive mechanism that moves the moving member, the moving member can be moved appropriately.

Furthermore, in a seat belt retractor of the present invention, since the drive mechanism includes a drive member, a press member that is driven by the drive member and that moves the moving member to the first position and the second position, and a housing that movably supports the press member and in which the drive member is installed, by driving the press member and moving the moving member with the drive mechanism installed in the rigid housing, each member interact with each other and a further appropriate operation can be performed.

Furthermore, in a seat belt retractor of the present invention, since the housing includes a cam portion against which the press member is capable of abutting, and the press member is separated from the cam portion before the drive member is operated and the press member abuts against the cam portion when the drive member is operated, by moving the moving member through abutment between the press member and the cam portion, a further appropriate operation can be performed.

Furthermore, since a seat belt retractor of the present invention includes an occupant information acquisition unit that acquires occupant information, and a controller that determines whether the occupant information acquired by the occupant information acquisition unit satisfies a condition set in advance and that operates the drive mechanism according to a determination result, control matching the occupant can be performed and a further appropriate operation can be performed.

Furthermore, since a seat belt retractor of the present invention includes a pretensioner mechanism that rotates the spool in a seat belt retracting direction when in an emergency, the seat belt can be retracted in a swift manner in an emergency.

Furthermore, in a seat belt retractor of the present invention, since the controller operates the drive mechanism according to the determination result, after the pretensioner mechanism has completed retracting the seat belt, the seat belt can be appropriately retracted in an emergency.

Furthermore, in a seat belt retractor of the present invention, since the controller operates the drive mechanism according to the determination result, before or at the same time as the pretensioner mechanism starts the retraction of the seat belt, the load when retracting the seat belt can be reduced with the pretensioner mechanism.

Furthermore, since a seat belt retractor of the present invention includes a frame, a seat belt, a spool that is rotatably supported by the frame and that retracts the seat belt, a lock mechanism that allows rotation of the spool while not in operation and that prevents rotation of the spool in a seat belt withdrawing direction while in operation, an energy absorption mechanism that restricts a load acting on the seat belt and that absorbs energy of an occupant, a drive mechanism that switches energy absorbed by the energy absorption mechanism, a pretensioner mechanism that rotates the spool in a seat belt retracting direction when in an emergency, an occupant information acquisition unit that acquires occupant information, and a controller that determines whether the occupant information acquired by the occupant information acquisition unit satisfies a condition set in advance and that operates the drive mechanism according to a determination result. In the seat belt retractor, the controller operates the drive mechanism according to the determination result, after the pretensioner mechanism has completed retracting the seat belt, the seat belt can be appropriately retracted in an emergency.

Furthermore, since a seat belt retractor of the present invention includes a frame, a seat belt, a spool that is rotatably supported by the frame and that retracts the seat belt, a lock mechanism that allows rotation of the spool while not in operation and that prevents rotation of the spool in a seat belt withdrawing direction while in operation, an energy absorption mechanism that restricts a load acting on the seat belt and that absorbs energy of an occupant, a drive mechanism that switches energy absorbed by the energy absorption mechanism, a pretensioner mechanism that rotates the spool in a seat belt retracting direction when in an emergency, an occupant information acquisition unit that acquires occupant information, and a controller that determines whether the occupant information acquired by the occupant information acquisition unit satisfies a condition set in advance and that operates the drive mechanism according to a determination result, and since the controller operates the drive mechanism according to the determination result, before or at the same time as the pretensioner mechanism starts the retraction of the seat belt, the load when retracting the seat belt can be reduced with the pretensioner mechanism.

Furthermore, in a seat belt apparatus of the present invention including at least a seat belt that restricts an occupant, a seat belt retractor that retracts the seat belt while allowing the seat belt to be withdrawn, the seat belt retractor operating in an emergency so as to stop withdrawal of the seat belt, a tongue that is slidably supported by the seat belt that has been withdrawn from the seat belt retractor, and a buckle that is provided on the vehicle body or on the vehicle seat, the tongue being locked to the buckle so as to be capable of being engaged and disengaged, since a seat belt retractor of the above is used as the seat belt retractor, when absorbing energy by restricting the load acting on the seat belt, a further stable load can be generated and the seat belt retractor can be made compact such that the degree of freedom of the disposition of each component of the seat belt apparatus can be increased further.

DESCRIPTION OF EMBODIMENTS

Hereinafter, embodiments of the present invention will be described with reference to the drawings.

Figure 1:
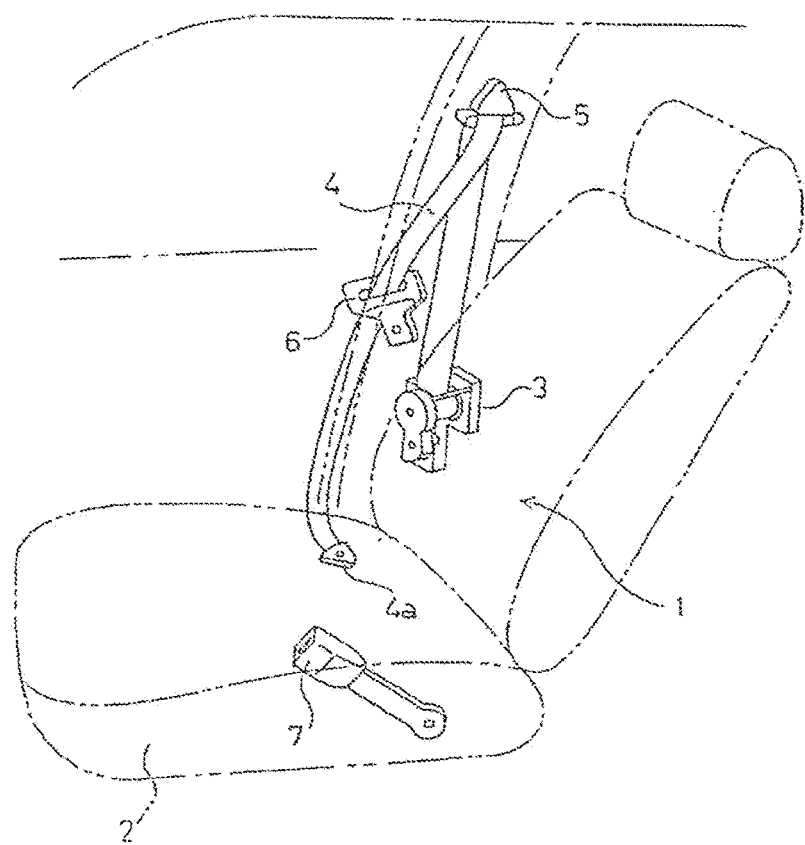
FIG. 1 is a perspective view schematically illustrating a seat belt apparatus provided with an exemplary embodiment of a seat belt retractor according to the present invention.

FIG. 1 is a diagram schematically illustrating a seat belt apparatus provided with an exemplary embodiment of a seat belt retractor according to the present invention.

As illustrated in FIG. 1, a seat belt apparatus 1 of the example is the same as conventionally known three-point seat belt apparatuses. In the drawing, 1 is the seat belt apparatus, 2 is a vehicle seat, 3 is a seat belt retractor disposed in the vicinity of the vehicle seat 2, 4 is a seat belt that is retracted in the seat belt retractor 3 while being allowed to be withdrawn and in which a seat belt anchor 4a at the distal end thereof is fixed to a floor of the vehicle body or to the vehicle seat 2, 5 is a guide anchor that guides the seat belt 4, which has been withdrawn from the seat belt retractor 3, towards a shoulder of an occupant, 6 is a tongue that is slidably supported by the seat belt 4 that has been guided from the guide anchor 5, and 7 is a buckle that is fixed to the floor of the vehicle or to the vehicle seat and in which the tongue 6 is inserted and locked so as to be capable of being engaged and disengaged. The fastening operation and the unfastening operation of the seat belt 4 of the seat belt apparatus 1 are also the same as those of conventionally known seat belt apparatuses.

Figure 2:
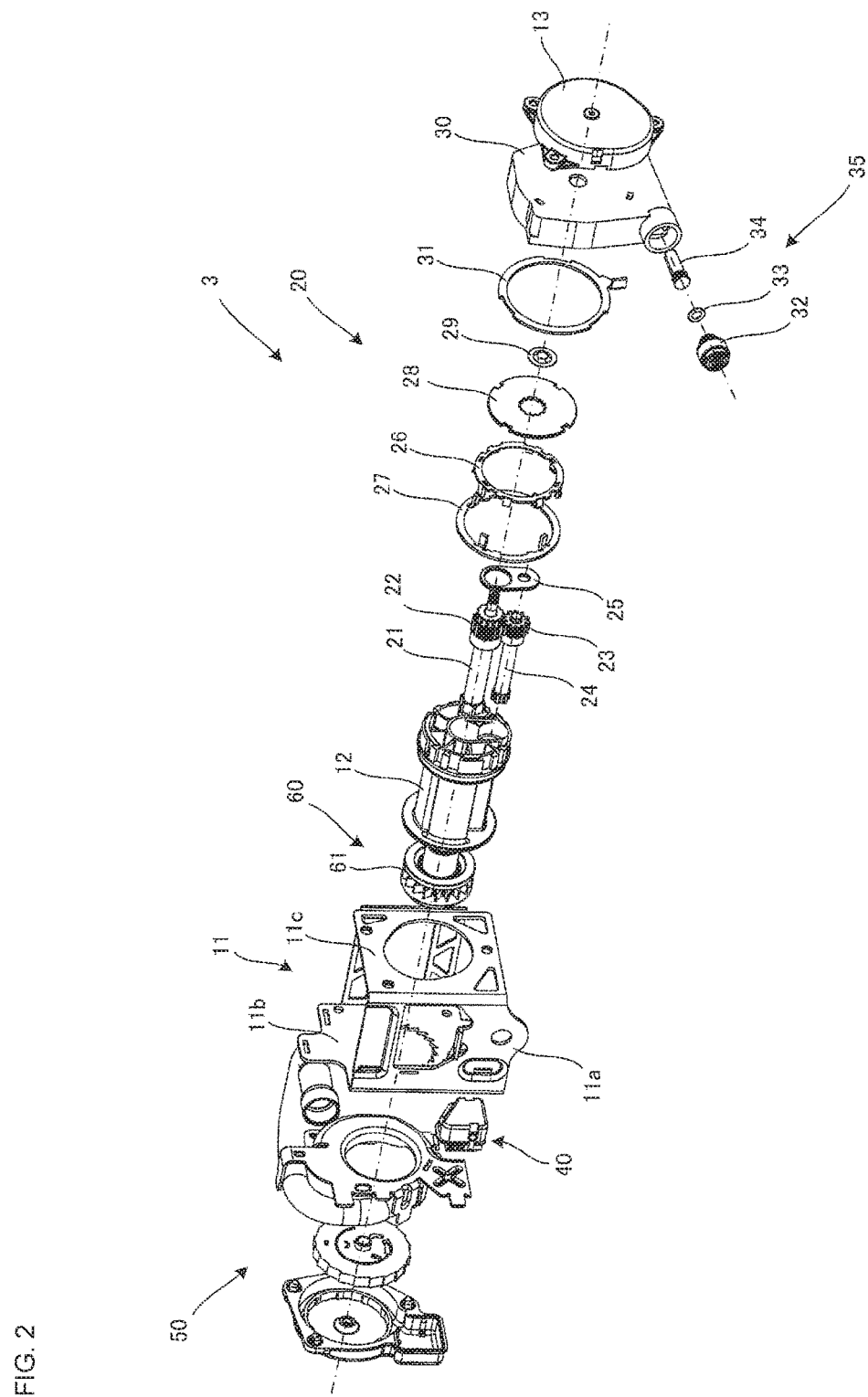
FIG. 2 is an exploded perspective view of a seat belt retractor of a first embodiment.
Figure 3:
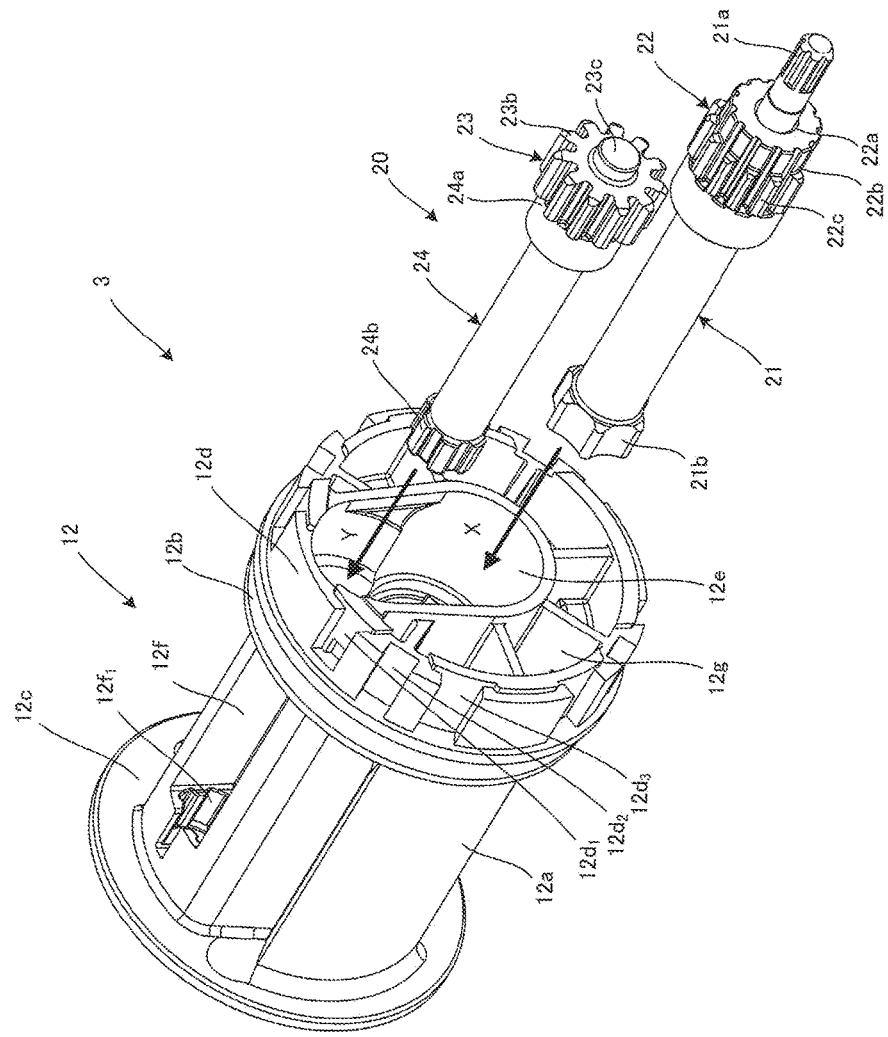
FIG. 3 is a perspective view illustrating an EA mechanism of the seat belt retractor of the first embodiment.
Figure 4:
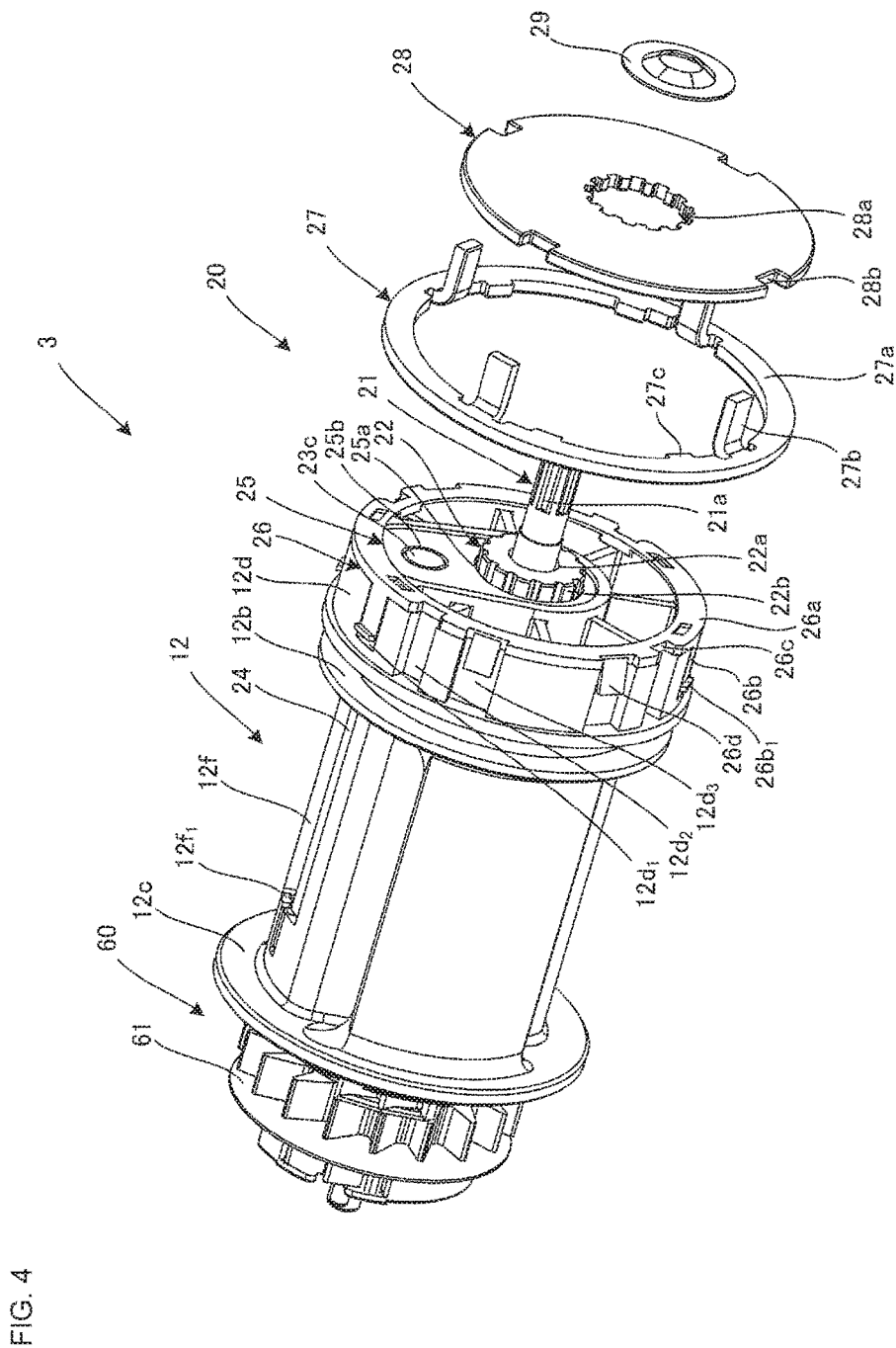
FIG. 4 is a perspective view illustrating the EA mechanism of the seat belt retractor of the first embodiment.
Figure 5:
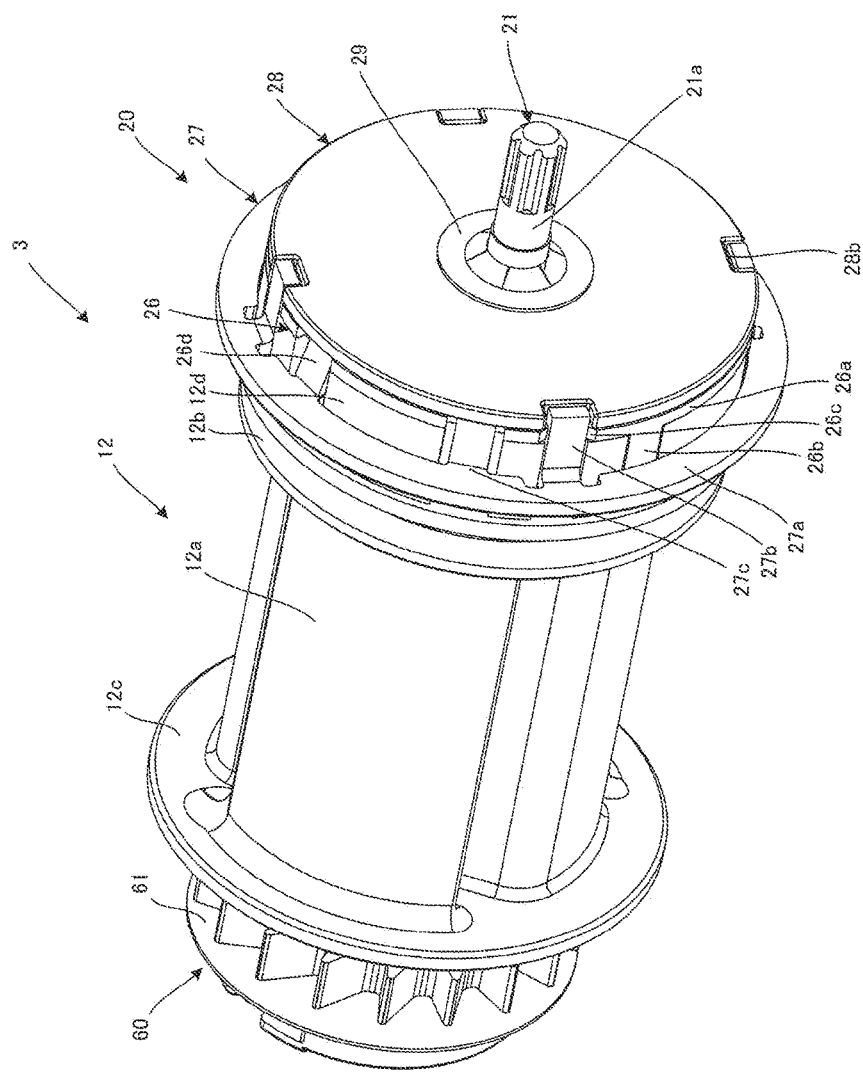
FIG. 5 is a perspective view illustrating the EA mechanism of the seat belt retractor of the first embodiment.
Figure 6:
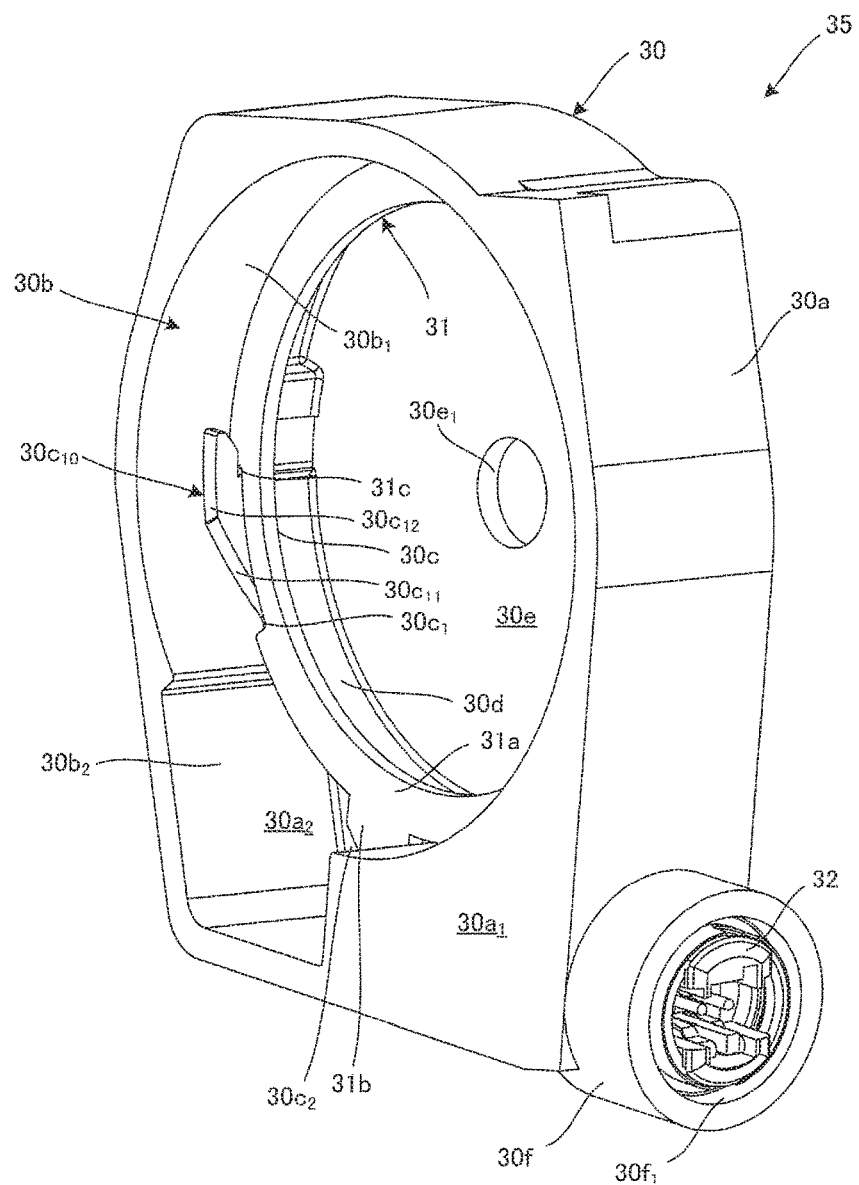
FIG. 6 is a perspective view illustrating a drive mechanism of the seat belt retractor of the first embodiment.
Figure 7:
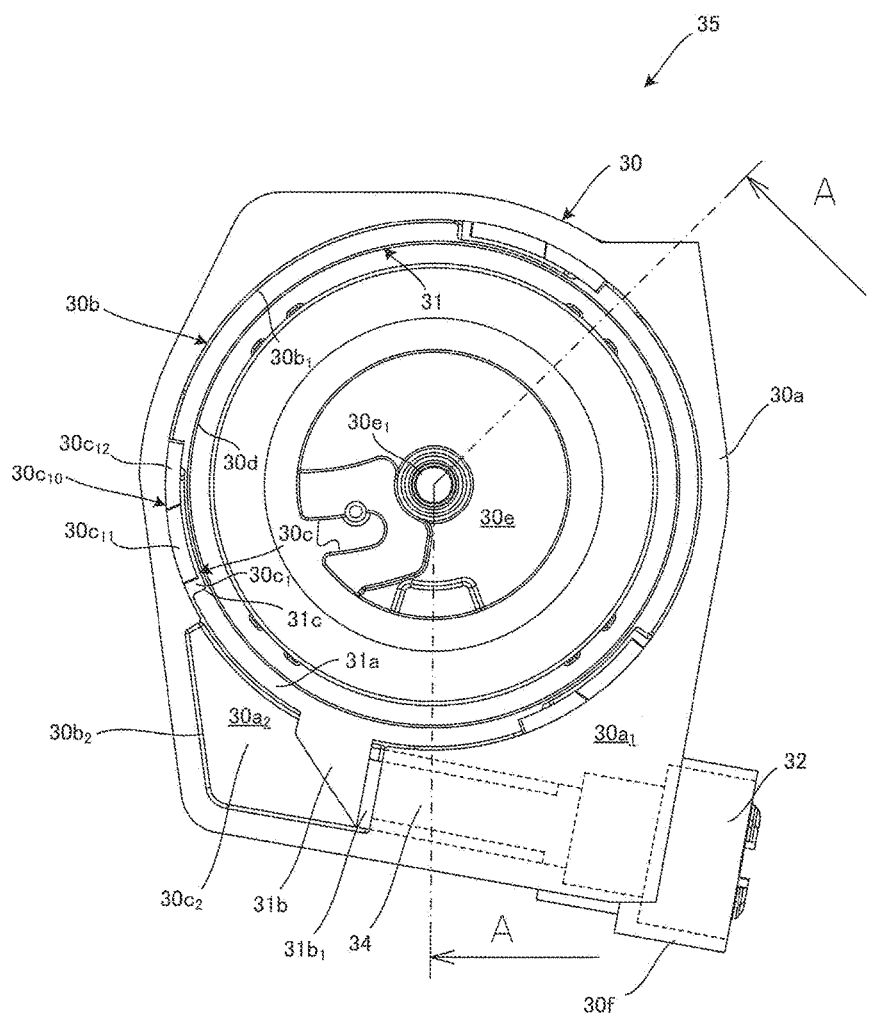
FIG. 7 is a side view illustrating the drive mechanism of the seat belt retractor of the first embodiment.
Figure 8:
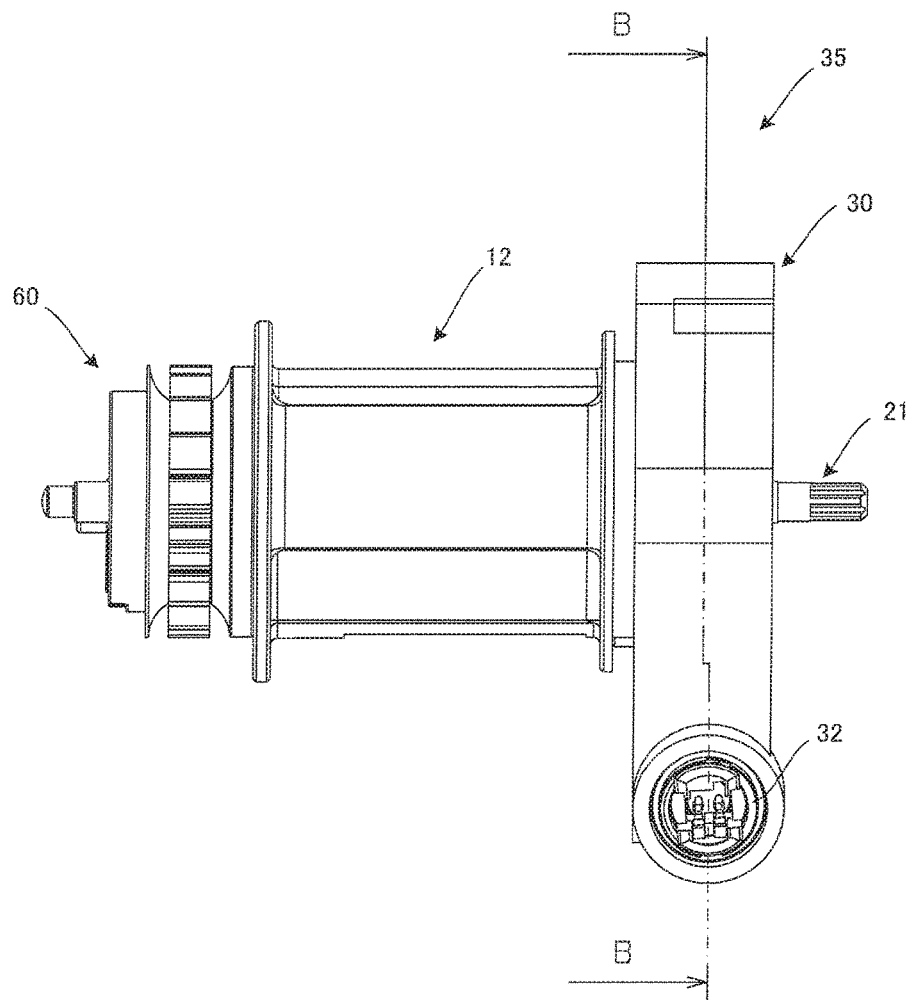
FIG. 8 is a front view illustrating the EA mechanism and the drive mechanism of the seat belt retractor of the first embodiment.
Figure 9:
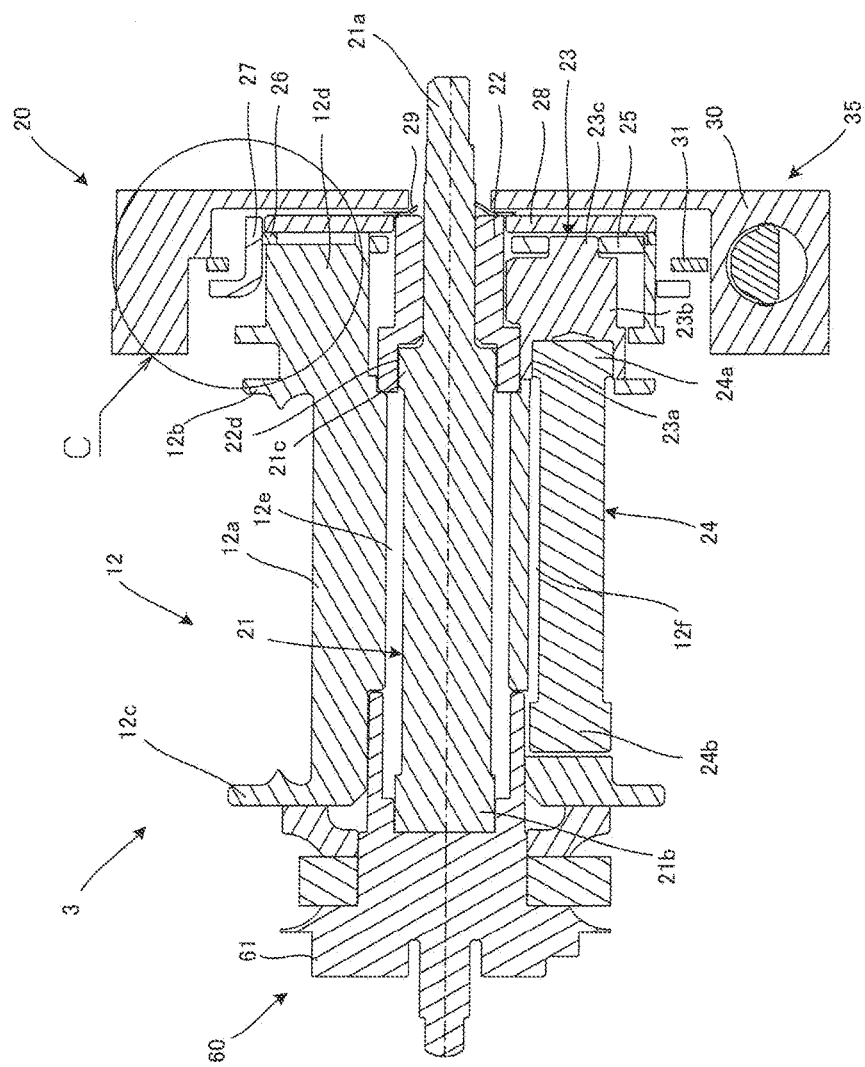
FIG. 9 is a cross-sectional view taken along line A-A in FIG. 7.
Figure 10:
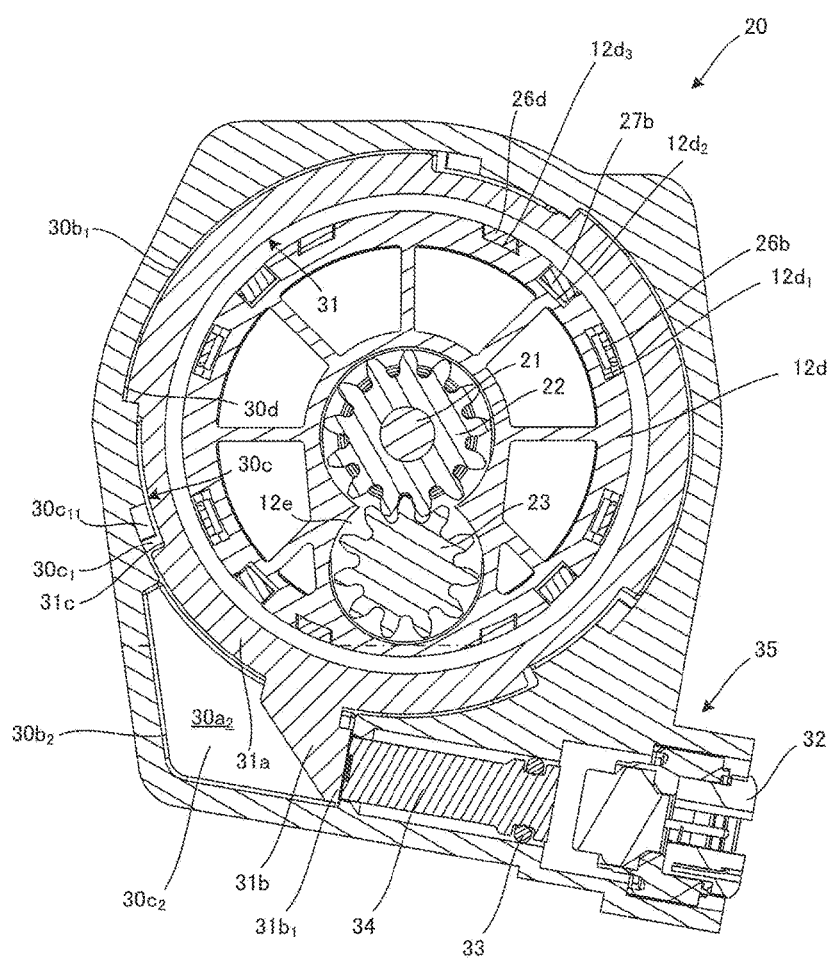
FIG. 10 is a cross-sectional view taken along line B-B in FIG. 8.
Figure 11:
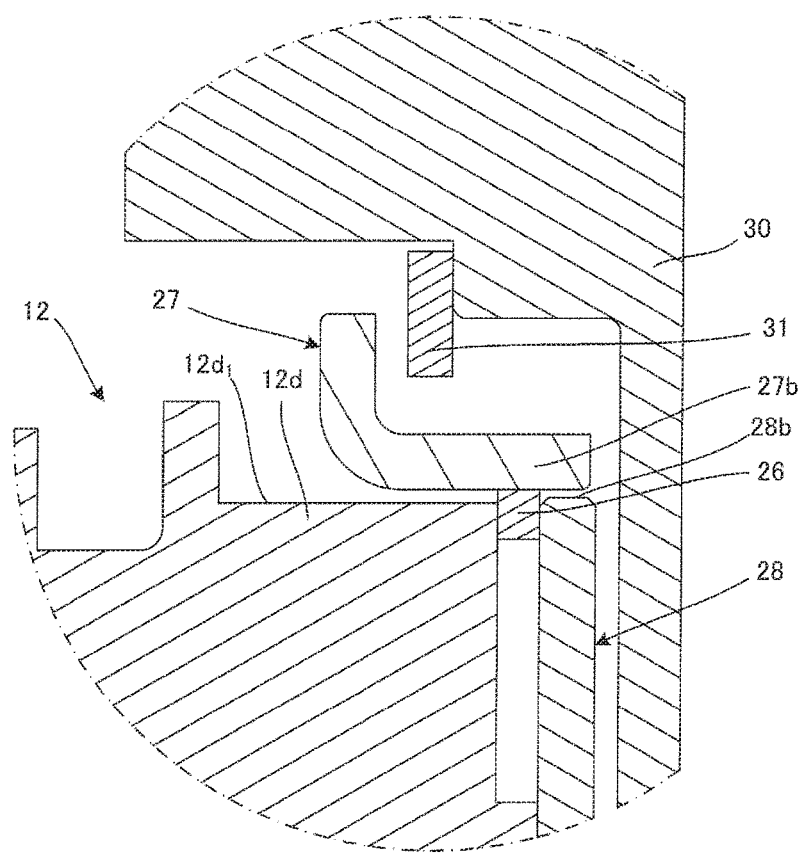
FIG. 11 is an enlarged view of portion C in FIG. 9.
Figure 12:
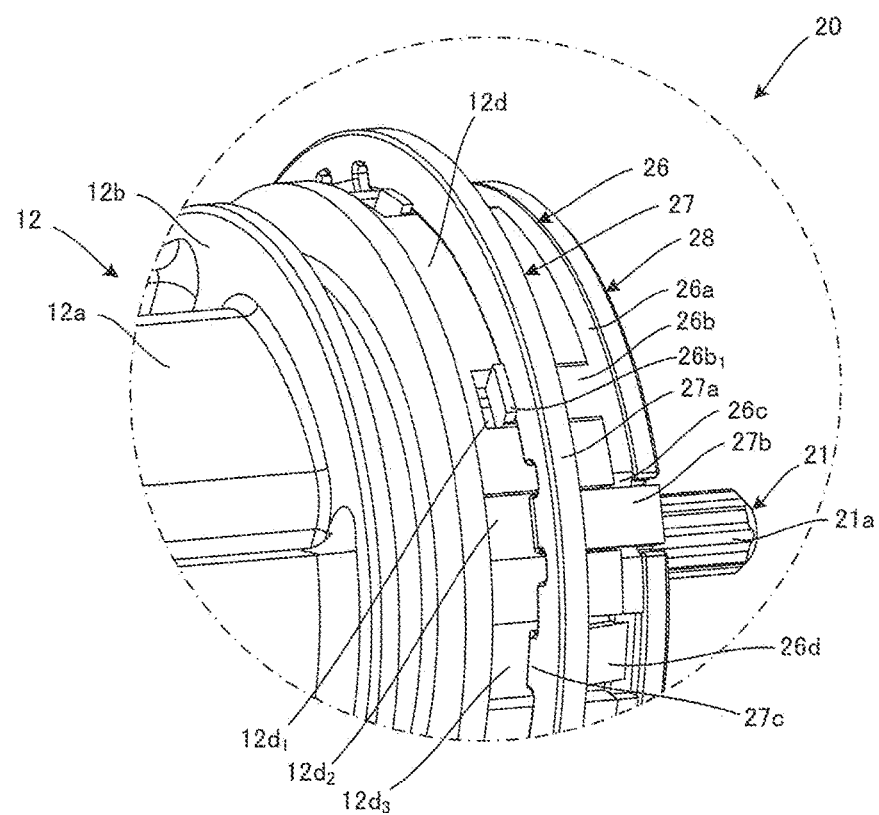
FIG. 12 is an enlarged perspective view illustrating a portion of the EA mechanism of the seat belt retractor of the first embodiment.

FIG. 2 is an exploded perspective view of a seat belt retractor of a first embodiment. FIGS. 3, 4, and 5 are perspective views each illustrating an EA mechanism 20 of the seat belt retractor of the first embodiment. FIG. 6 is a perspective view illustrating a drive mechanism 35 of the seat belt retractor of the first embodiment. FIG. 7 is a side view illustrating the drive mechanism 35 of the seat belt retractor of the first embodiment. FIG. 8 is a front view illustrating the EA mechanism 20 and the drive mechanism 35 of the seat belt retractor of the first embodiment. FIG. 9 is a cross-sectional view taken along line A-A in FIG. 7. FIG. 10 is a cross-sectional view taken along line B-B in FIG. 8. FIG. 11 is an enlarged view of portion C in FIG. 9. FIG. 12 is an enlarged perspective view illustrating a portion of the EA mechanism 20 of the seat belt retractor of the first embodiment.

As illustrated in FIG. 2, the seat belt retractor 3 according to the first embodiment includes a frame 11, a spool 12, a spring portion 13, the EA mechanism 20, the drive mechanism 35, a deceleration detection means 40, a pretensioner mechanism 50, and a lock mechanism 60. Note that the EA mechanism 20 constitutes an energy absorption mechanism.

The frame 11 forming a U-shaped cross-section includes a back plate 11a and two left and right sidewalls 11b and 11c that are provided so as to protrude in an orthogonal direction from two ends of the back plate 11a. A circular opening is formed in each of the left and right sidewalls 11b and 11c of the frame 11.

As illustrated in FIGS. 3 and 9, the spool 12 includes an intermediate portion 12a, a first flange 12b that protrudes towards the outer peripheral side at one end of the intermediate portion 12a, a second flange 12c that protrudes towards the outer peripheral side at the other end of the intermediate portion 12a, and a holding portion 12d that holds a portion of the EA mechanism 20 at the outer side of the first flange 12b.

One end of the seat belt 4 illustrated in FIG. 1 is locked to an outer periphery of the intermediate portion 12a and the seat belt 4 is wounded around the outer periphery. A common hole portion 12e extending in an axial direction is formed about an axial center in the intermediate portion 12a, the first flange 12b, and the second flange 12c, and a groove portion 12f is formed in the axial direction in the outer periphery of the intermediate portion 12a. Portions of the hole portion 12e and the groove portion 12f may be in communication with each other. A spline-shaped engagement portion $12f_1$ that engages with a second torsion bar 24 described later is formed in an end portion of the groove portion 12f on the second flange 12c side.

The long-hole-shaped hole portion 12e that extends from the center towards an outer peripheral side of the holding portion 12d and that is in communication through the first flange 12b is formed in the holding portion 12d as well. First grooves $12d_1$, second grooves $12d_2$, and third grooves $12d_3$ that hold a portion of the EA mechanism 20 described later are formed in an outer periphery of the holding portion 12d. Ribs 12g are formed between the hole portion 12e and the outer periphery of the holding portion 12d.

One end of the spring portion 13 is connected to a first torsion bar 21, which will be described later, constituting a shaft portion of the spool 12 and the other end is connected to a case. The spring portion 13 includes a spring (not shown) that biases the spool 12 in the belt retracting direction.

The EA mechanism 20 includes the first torsion bar 21, a first gear 22, a second gear 23, the second torsion bar 24, a tie plate 25, a release ring holder 26, a release ring 27, a cover 28, and a push nut 29. Furthermore, the drive mechanism 35 includes a housing 30, a lever ring 31, a micro gas generator 32, an O-ring 33, and a piston 34. The release ring holder 26 constitutes a moving member holder, the release ring 27 constitutes a moving member, the cover 28 constitutes a cover member, the lever ring 31 constitutes a press member, and the micro gas generator 32 constitutes a drive member. Furthermore, the first torsion bar 21 constitutes a first energy absorption member, the first gear 22 constitutes a first energy transmission member, the second gear 23 constitutes a second energy transmission member, and the second torsion bar 24 constitutes a second energy absorption member.

The first torsion bar 21 is inserted into the hole portion 12e of the spool 12 in an arrow X direction illustrated in FIG. 3 and penetrates through the spool 12. One end 21a of the first torsion bar 21 penetrates through the first gear 22 and is held by the spring portion 13. Other end 21b of the first torsion bar 21 is held on the second flange 12c side of the spool 12 so as to rotate with a lock base 61 of the lock mechanism 60 described later in an integral manner. Furthermore, a fitting portion 21c that is fitted inside the first gear 22 is formed on the one end 21a side of the first torsion bar 21.

A hole portion 22a through which the first torsion bar 21 penetrates is formed in the first gear 22. First engagement teeth 22b having a small diameter are formed on one side of the outer periphery of the first gear 22 in the axial direction and second engagement teeth 22c having a large diameter are formed on the other side of the outer periphery in the axial direction. The fitting portion 21c of the first torsion bar 21 is fitted into a staggered hole 22d formed on the inner peripheral side of the first gear 22 such that the first engagement teeth 22b is on the one end 21a side of the first torsion bar 21 and the second engagement teeth 22c is on the other end 21b side; accordingly, the first gear 22 and the first torsion bar 21 rotate in an integral manner. The first gear 22 is inserted into the spool 12 together with the first torsion bar 21 and is disposed in a portion of the long-hole-shaped hole portion 12e formed in the holding portion 12d of the spool 12.

A protrusion 23c is formed on one side of the second gear 23 in the axial direction and a hole portion 23a in which the second torsion bar 24 is inserted is formed on the other side thereof. Third engagement teeth 23b are formed on the outer periphery of the second gear 23. The second gear 23 is attached on one end 24a side of the second torsion bar 24 so as to rotate in an integral manner with the second torsion bar 24. The second gear 23 is installed inside a portion of the long-hole-shaped hole portion 12e formed in the holding portion 12d of the spool 12 so as to mesh with the first gear 22.

The second torsion bar 24 is inserted in an arrow Y direction illustrated in FIG. 3 into the groove portion 12f formed in the intermediate portion 12a of the spool 12 through the hole portion 12e of the holding portion 12d and the first flange 12b. The one end 24a of the second torsion bar 24 is inserted into the hole portion 23a of the second gear 23 so as to integrally rotate therewith. Other end 24b of the second torsion bar 24 engages with the engagement portion $12f_1$ formed in a spline shape in the groove portion 12f.

As illustrated in FIG. 4, the tie plate 25 is a plate-shaped member that covers a hole 12e formed in the holding portion 12d of the spool 12. A first hole 25a and a second hole 25b are formed in the tie plate 25. The first hole 25a is disposed so as to surround the first engagement teeth 22b of the first gear 22. The second hole 25b supports the protrusion 23c of the second gear 23.

Formed in the release ring holder 26 are a plate-shaped circular portion 26a, protrusions 26b that protrude from the outer peripheral side of the circular portion 26a towards the first flange 12b side in the axial direction, recesses 26c that are recessed from the outer periphery of the circular portion 26a towards the inner peripheral side, and engagement portions 26d that each protrude towards the first flange 12b side in the axial direction from portions of the circular portion 26a that are recessed from the outer periphery towards the inner peripheral side.

Lock portions $26b_1$ that protrude towards the outer peripheral side are formed in the distal end of the protrusions 26b. The engagement portions 26d are formed so as to incline gradually towards the outer peripheral side as the engagement portions 26d extend away from the circular portion 26a.

Formed in the release ring 27 are a circular portion 27a that has a diameter that is larger than that of the circular portion 26a of the release ring holder 26, protrusions 27b that protrude in the axial direction from the inner periphery side of the circular portion 27a towards the opposite side with respect to the first flange 12b, and projections 27c that protrude in the radial direction from the inner periphery side of the circular portion 27a.

The cover 28 is a disc-shaped member and a spline-shaped hole 28a is formed in the middle portion thereof. Furthermore, recesses 28b that are recessed from the outer periphery towards the inner peripheral side are formed in the cover 28.

The release ring holder 26 and the release ring 27 are installed around the holding portion 12d.

When installing the release ring holder 26, the protrusions 26b are inserted into the first grooves $12d_1$ of the holding portion 12d, the recesses 26c are disposed so that the shapes thereof match the shapes of the second grooves $12d_2$, and the engagement portions 26d are inserted into the third grooves $12d_3$.

When installing the release ring 27, the protrusions 27b are inserted into the recesses 26c of the release ring holder 26 and the second grooves $12d_2$ of the holding portion 12d, and the projections 27c moving over the engagement portions 26d of the release ring holder 26 are inserted into the third grooves $12d_3$ of the holding portion 12d.

In a state in which the release ring holder 26 and the release ring 27 are installed in the holding portion 12d, the movement of the circular portion 27a is restricted by the lock portions $26b_1$ and the movement of the projections 27c are restricted by the engagement portions 26d. Accordingly, the release ring 27 is held by the release ring holder 26.

The hole 28a of the cover 28 is meshed with the first engagement teeth 22b of the first gear 22. The recesses 28b of the cover 28 are fitted into the protrusions 27b of the release ring 27. Furthermore, as illustrated in FIG. 5, the push nut 29 is attached to the one end 21a of the first torsion bar 21 from the outer side of the cover 28. Accordingly, the cover 28 is attached so as to cover the holding portion 12d.

The housing 30 includes a housing body 30a, a wall portion 30b constituting a portion of a lateral side of a recess $30a_2$ formed in a surface $30a_1$ of the housing body 30a, a step portion 30c that protrudes towards the inside of the recess from the wall portion 30b, a tubular wall portion 30d constituting a portion of the lateral side of the recess $30a_2$ from the step portion 30c to the bottom surface, a plate portion 30e constituting the bottom surface of the recess $30a_2$, and a protrusion 30f protruding towards the outside from the lateral side of the housing body 30a.

The recess $30a_2$ is formed in the surface $30a_1$ of the housing body 30a. The recess $30a_2$ includes the wall portion 30b, the step portion 30c, the tubular wall portion 30d, and the plate portion 30e. The tubular wall portion 30d is provided so as to stand at the plate portion 30e, the step portion 30c includes surfaces that extend from the upper end of the tubular wall portion 30d towards the outside, and the wall portion 30b is provided so as to stand from the step portion 30c to the surface $30a_1$.

The step portion 30c includes an annular first step portion $30c_1$, and a second step portion $30c_2$ that is formed of a substantially quadrangular surface that extends further towards the outside from a portion of the first step portion $30c_1$. The wall portion 30b provided so as to stand at the first step portion $30c_1$ is referred to as a first wall portion $30b_1$, and the wall portion $30b$ provided so as to stand at the second step portion $30c_2$ is referred to as a second wall portion $30b_2$. Formed on the first wall portion $30b_1$ side of the first step portion $30c_1$ are a plurality of cam portions $30c_{10}$ including inclined surfaces $30c_{11}$ formed in the circumferential direction and top surfaces $30c_{12}$ formed at the highest positions of the inclined surfaces $30c_{11}$.

A gas generator attachment portion $30f$ is provided on the outer lateral side of the housing body $30a$. The gas generator attachment portion $30f$ is a cylindrical portion and a communication hole $30f_1$ formed in the gas generator attachment portion $30f$ is in communication with the second wall portion $30b_2$ provided so as to stand at the second step portion $30c_2$. As illustrated in FIG. 2, the micro gas generator 32, the O-ring 33, and the piston 34 are attached to the communication hole $30f_1$.

The lever ring 31 includes a ring portion $31a$, a lever portion $31b$, and notches $31c$. The ring portion $31a$ is an annular portion and is mounted on the first step portion $30c_1$ of the housing 30. The lever portion $31b$ protrudes in the radial direction from the outer periphery of the ring portion $31a$ and is mounted on the second step portion $30c_2$ of the housing 30. As illustrated in FIG. 7, a receiving member $31b_1$ that is pressed by the piston 34 of the micro gas generator 32 is formed in the lever portion $31b$. The notches $31c$ are formed so as to correspond to the cam portions $30c_{10}$ of the first step portion $30c_1$ at the outer periphery of the ring portion $31a$.

The micro gas generator 32 is equipped with the piston 34 and is attached to the communication hole $30f_1$ through the O-ring 33.

Furthermore, the seat belt retractor 3 includes the deceleration detection means 40, the pretensioner mechanism 50, and the lock mechanism 60. The above may each have a known and normal configuration.

The lock mechanism 60 includes a lock pawl (not shown) and a locking base 61. The lock pawl is installed in the locking base 61 in a rotatable manner. As illustrated in FIG. 9, the locking base 61 is joined together with the other end $21b$ of the first torsion bar 21. In other words, the locking base 61 and the first torsion bar 21 integrally rotate. Furthermore, by rotating about a shaft attached to the locking base 61, the lock pawl meshes with the teeth formed in the opening of the sidewall $11b$ of the frame 11 and locks the rotation of the locking base 61 and the first torsion bar 21.

An operation of the seat belt retractor 3 of the first embodiment will be described next.

In the seat belt retractor 3 of the first embodiment, first, when the deceleration detection means 40 detects a rapid deceleration of the vehicle, which occurs when in an emergency, the operation of the pretensioner mechanism 50 and that of the lock mechanism 60 are started.

Then, the EA mechanism 20 is operated. Note that the EA mechanism 20 of the first embodiment is operated in two ways, namely, a drive mechanism non-operating state and a drive mechanism operating state.

The drive mechanism non-operating state, in which the micro gas generator 32 of the drive mechanism 35 is not operated, will be described first.

In the drive mechanism non-operating state, since the micro gas generator 32 is not operated, the EA mechanism 20 and the drive mechanism 35 are in a state illustrated in FIGS. 5 to 12. After the pretensioner mechanism 50 illustrated in FIG. 2 is operated and the spool 12 is rotated in the retracting direction, the seat belt 4 illustrated in FIG. 1 being withdrawn by inertia of the occupant rotates the spool 12 in the belt withdrawing direction.

In the drive mechanism non-operating state, the release ring 27 is in a first position in which the protrusions $27b$ are meshed with the recesses $28b$ of the cover 28. Accordingly, when the spool 12 rotates, torque is transmitted from the second grooves $12d_2$ and the third grooves $12d_3$ of the holding portion $12d$ to the protrusions $27b$ and the projections $27c$ of the release ring 27, and the release ring 27 rotates.

Then, torque is transmitted from the protrusions $27b$ of the release ring 27 to the recesses $28b$ of the cover 28, and the cover 28 rotates. Since the hole $28a$ of the cover 28 is meshed with the first engagement teeth $22b$ of the first gear 22, when the cover 28 rotates, the first gear 22 rotates. Since the first gear 22 is integral with the first torsion bar 21, when the first gear 22 rotates, torque is transmitted to the first torsion bar 21.

However, since the other end $21b$ of the first torsion bar 21 is held by the locking base 61, the first torsion bar 21 cannot rotate. Accordingly, torsion occurs in the first torsion bar 21. In other words, under the action of the force limiter load, the first torsion bar 21 permits a predetermined withdrawal of the seat belt 4 illustrated in FIG. 1 and absorbs energy.

At this time, since the third engagement teeth $23d$ are meshed with the second engagement teeth $22c$ of the first gear 22, the second gear 23 rotates together with the spool 12 and rotates around the first gear 22. Accordingly, the second torsion bar 24, the one end $24a$ of which is integrally attached to the second gear 23 and the other end $24b$ of which is engaged with the engagement portion $12f_1$ formed in the groove portion $12f$ of the spool 12, rotates together with the spool 12. In other words, no torsion occurs in the second torsion bar 24.

In other words, in the drive mechanism non-operating state in which the micro gas generator 32 of the seat belt retractor 3 of the first embodiment is not operated, only the first torsion bar 21 operates to absorb energy.

The drive mechanism operating state, in which the micro gas generator 32 is operated, will be described next.

Figure 13:
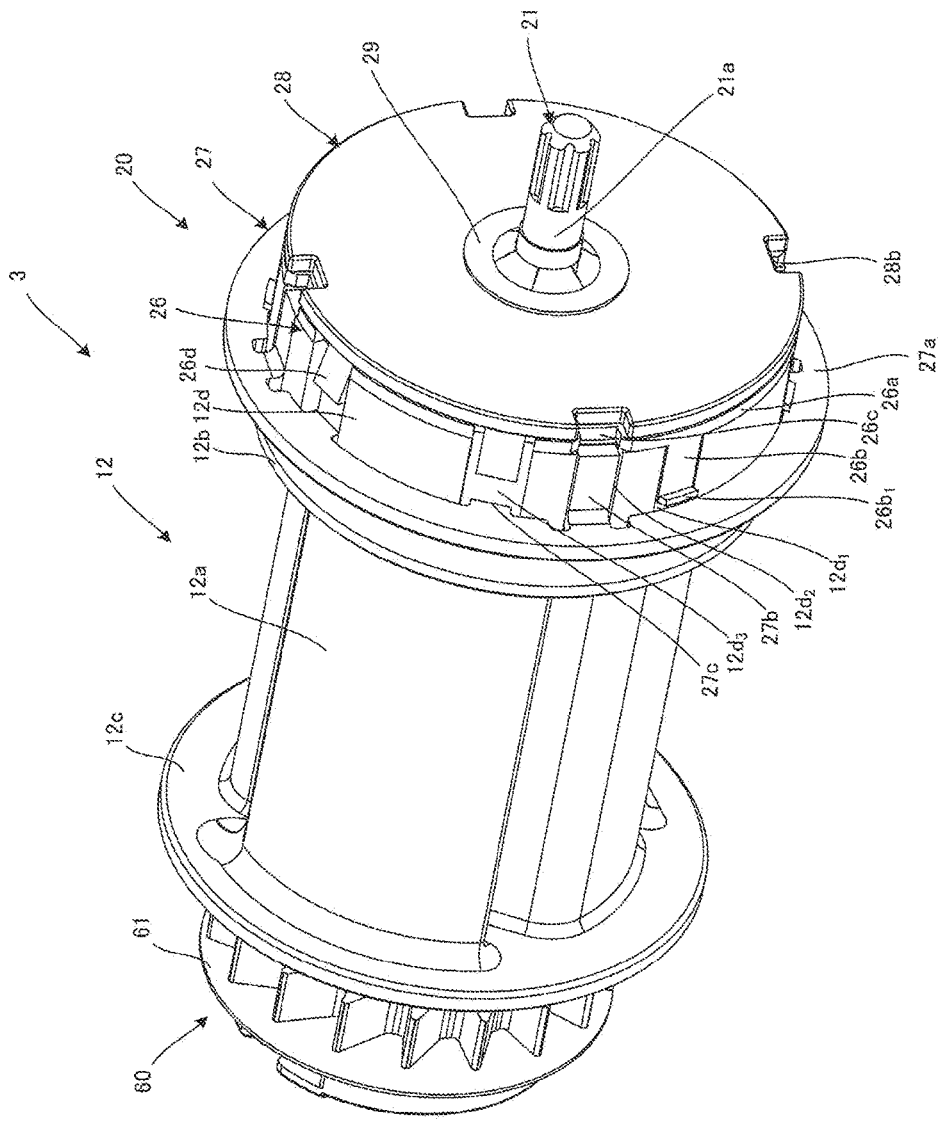
FIG. 13 is a perspective view illustrating the drive mechanism operating state of the EA mechanism of the seat belt retractor of the first embodiment.
Figure 14:
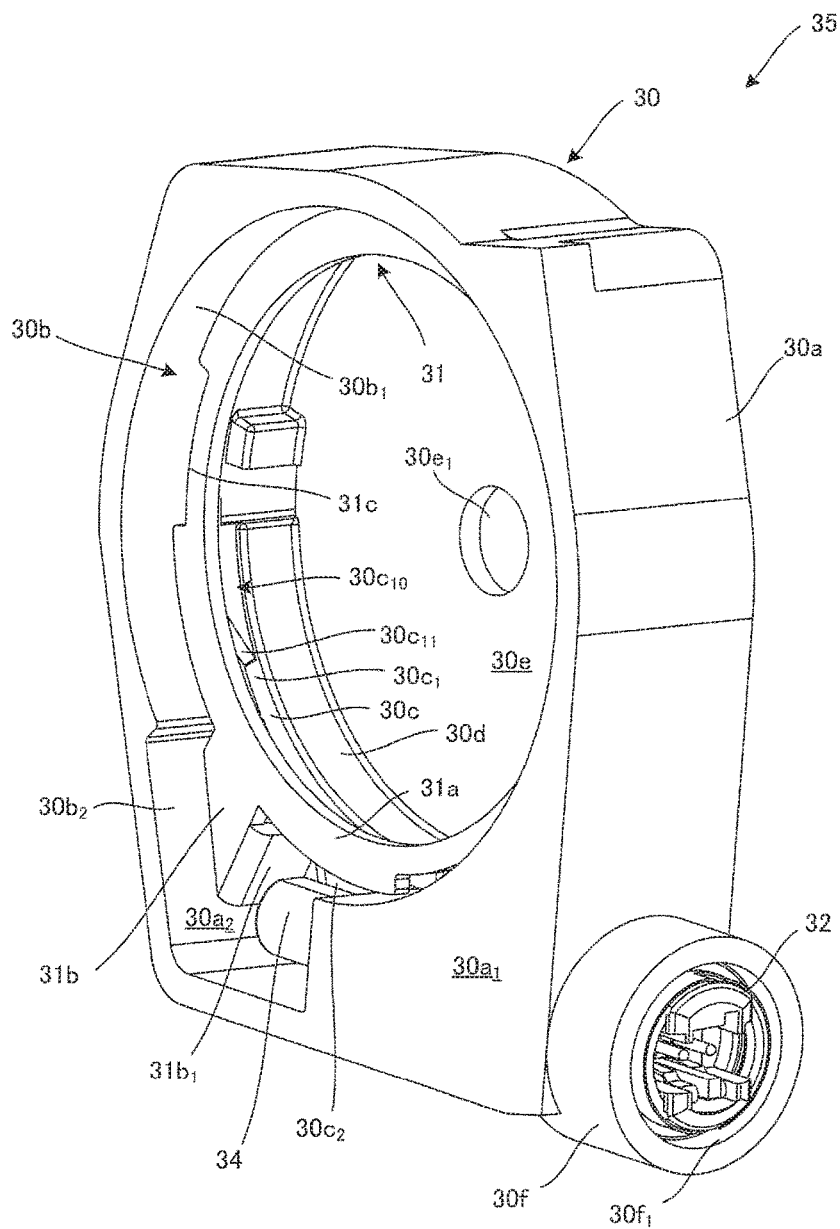
FIG. 14 is a perspective view illustrating the drive mechanism after a micro gas generator of the seat belt retractor of the first embodiment has been operated.
Figure 15:
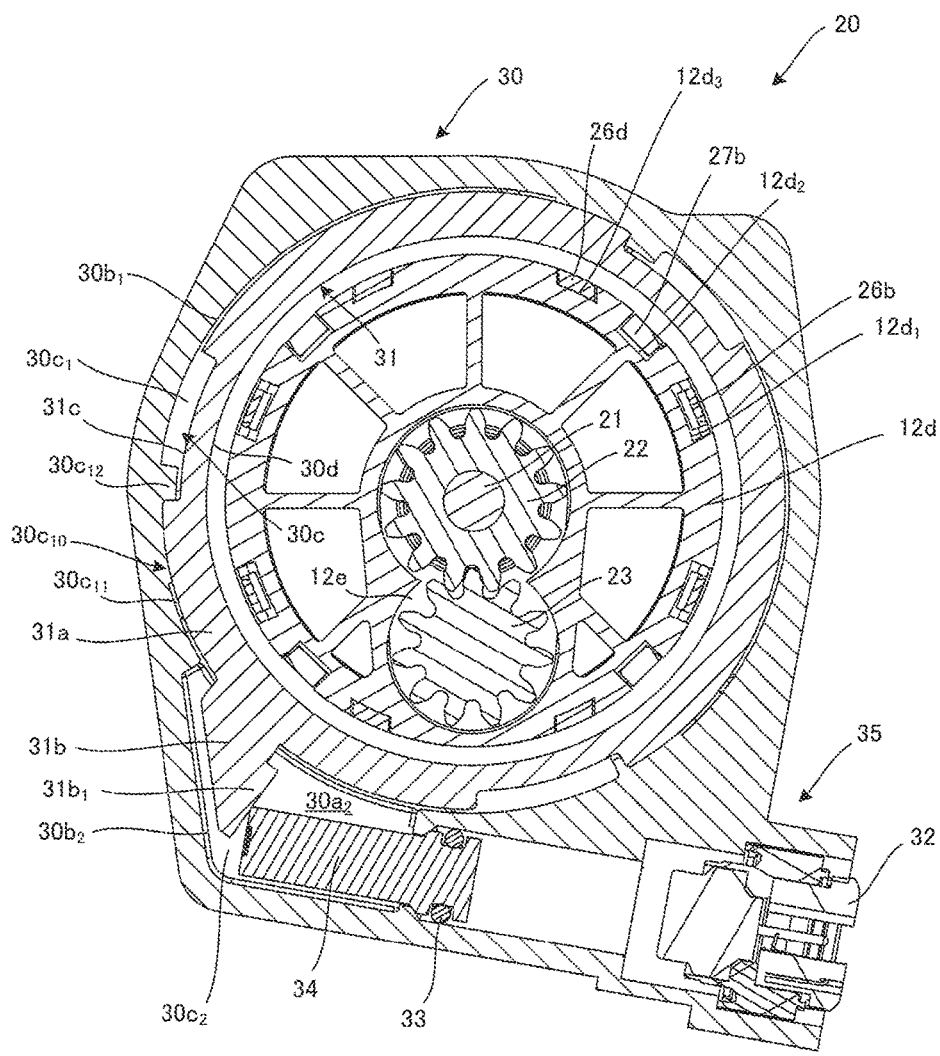
FIG. 15 is a cross-sectional view of the micro gas generator after being operated taken along line B-B in FIG. 8.
Figure 16:
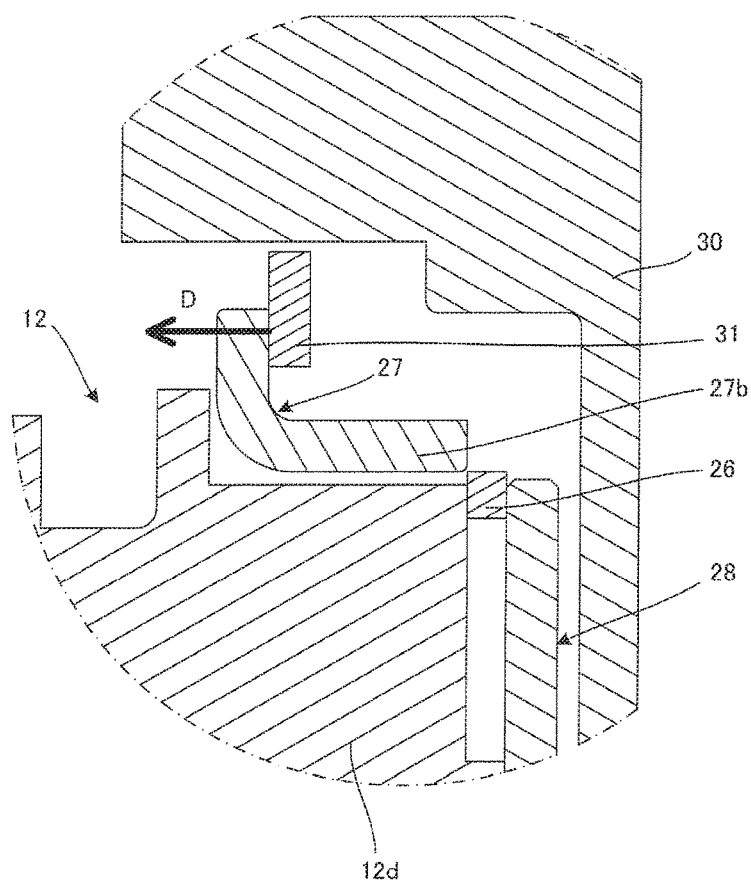
FIG. 16 is an enlarged view of portion C in FIG. 9 of the micro gas generator after being operated.

FIG. 13 is a perspective view illustrating the drive mechanism operating state of the EA mechanism 20 of the seat belt retractor of the first embodiment. FIG. 14 is a perspective view illustrating the micro gas generator of the seat belt retractor of the first embodiment after being operated. FIG. 15 is a cross-sectional view of the micro gas generator after being operated taken along line B-B in FIG. 8. FIG. 16 is an enlarged view of portion C in FIG. 9 of the micro gas generator after being operated.

In the drive mechanism operating state, since the micro gas generator 32 is operated, the EA mechanism 20 and the drive mechanism 35 are in a state illustrated in FIGS. 13 to 16. After the pretensioner mechanism 50 illustrated in FIG. 2 is operated and the spool 12 is rotated in the retracting direction, the seat belt 4 illustrated in FIG. 1 being withdrawn by inertia of the occupant rotates the spool 12 in the belt withdrawing direction.

In the drive mechanism operating state, as illustrated in FIGS. 14 and 15, the micro gas generator 32 is operated and the piston 34 is projected. The piston 34 presses the receiving member $31b_1$ of the lever portion $31b$ of the lever ring 31. Subsequently, the lever ring 31, the lever portion $31b$ of which has been pressed, starts rotating. Then, the ring portion $31a$ of the lever ring 31 moves along the inclined surfaces $30c_{11}$ of the cam portions $30c_{10}$ formed in the first step portion $30c_1$ of the housing 30, which are disposed in the notches 31c, and moves onto the top surfaces $30c_{12}$.

At this time, as illustrated in FIG. 16, the lever ring 31 that has been moved presses the release ring 27 in an arrow D direction. As illustrated in FIG. 13, the release ring 27 moves the second grooves $12d_2$ and the third grooves $12d_3$ of the holding portion 12d towards the first flange 12b side, shears the lock portions $26b_1$, and moves to a second position. Then, the protrusions 27b of the release ring 27 become separated from the recesses 28b of the cover 28 and the recess 26c of the release ring holder 26. Since the other end 21b of the first torsion bar 21 is held by the locking base 61, the cover 28 is fixed together with the first torsion bar 21.

In the above state, when the spool 12 rotates, the second gear 23 rotates around the first gear 22. Accordingly, the second gear 23 rotates about the second torsion bar 24. However, while the other end 24b of the second torsion bar 24 rotates together with the spool 12, the other end 24b does not rotate about the second torsion bar 24. Accordingly, torsion occurs in the second torsion bar 24. In other words, under the action of the force limiter load, the second torsion bar 24 permits a predetermined withdrawal of the seat belt 4 illustrated in FIG. 1 and absorbs energy.

In other words, in the drive mechanism operating state in which the micro gas generator 32 of the drive mechanism 35 of the seat belt retractor 3 of the first embodiment is operated, only the second torsion bar 24 operates to absorb energy.

A control of the seat belt retractor of the first embodiment will be described next.

Figure 17:
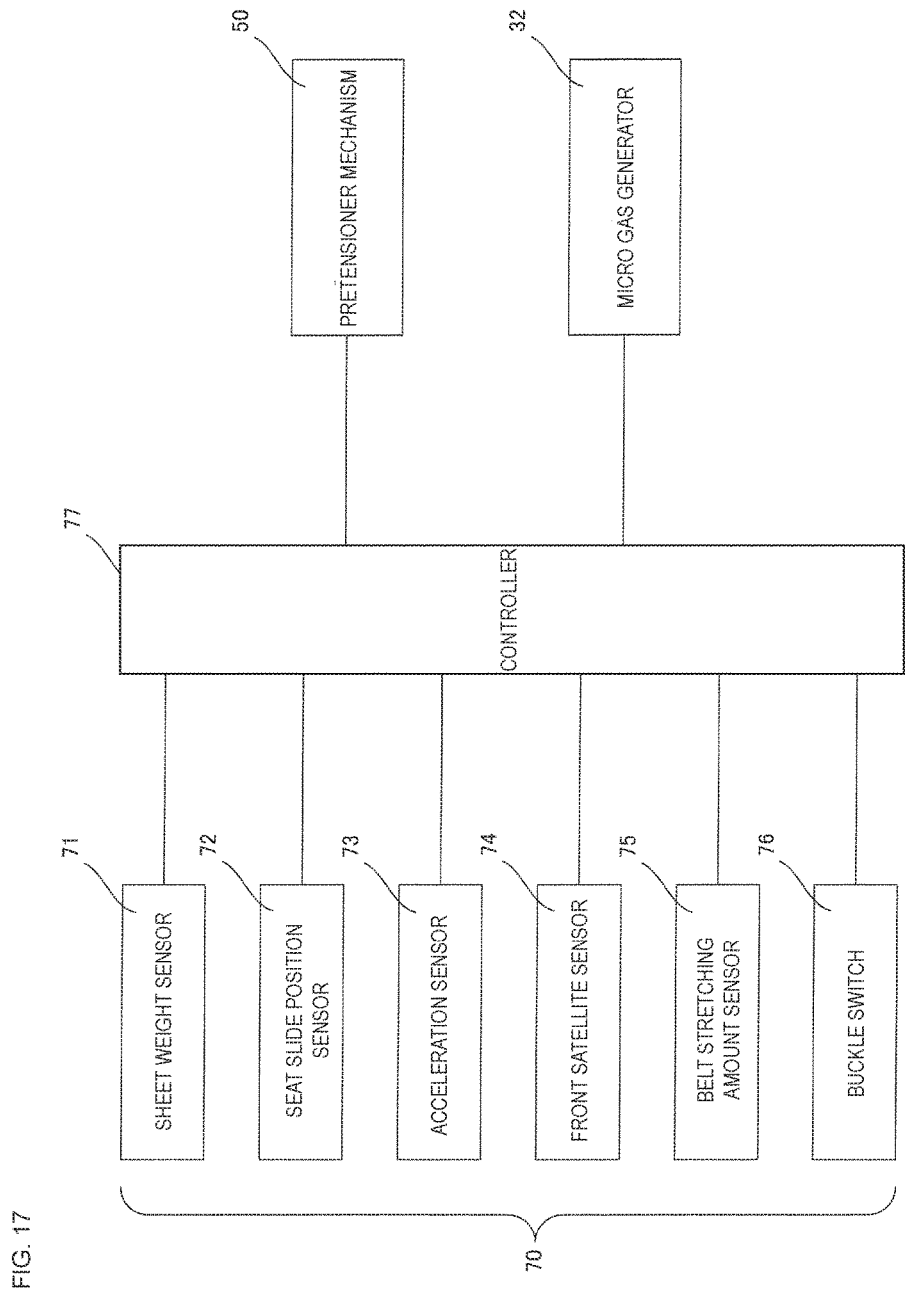
FIG. 17 is a system chart of the EA mechanism of the seat belt retractor of the first embodiment.

FIG. 17 is a system chart of the EA mechanism of the seat belt retractor of the first embodiment.

As illustrated in FIG. 17, in the seat belt retractor of the above example, operation of the pretensioner mechanism 50 and that of the micro gas generator 32 are controlled according to the state of the emergency on the basis of the output signals of an occupant information acquisition unit 70 such as a controller 77, a seat weight sensor 71, a seat slide position detection sensor 72, an acceleration sensor 73, a front satellite sensor 74, a belt stretching amount sensor 75, and a buckle switch 76. The controller 77 is constituted by a CPU and the like.

Figure 18:
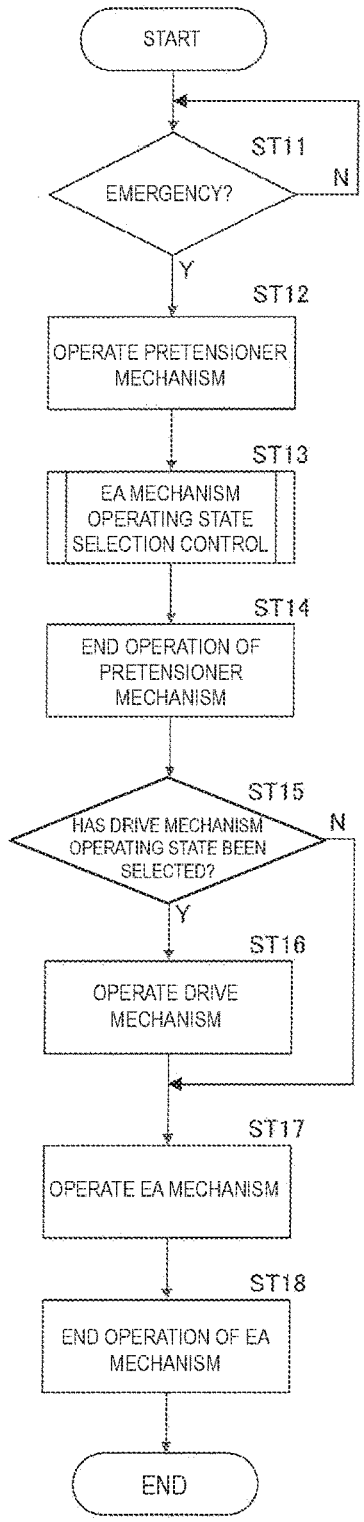
FIG. 18 is a diagram illustrating a control flow chart of the seat belt retractor of the first embodiment.
Figure 19:
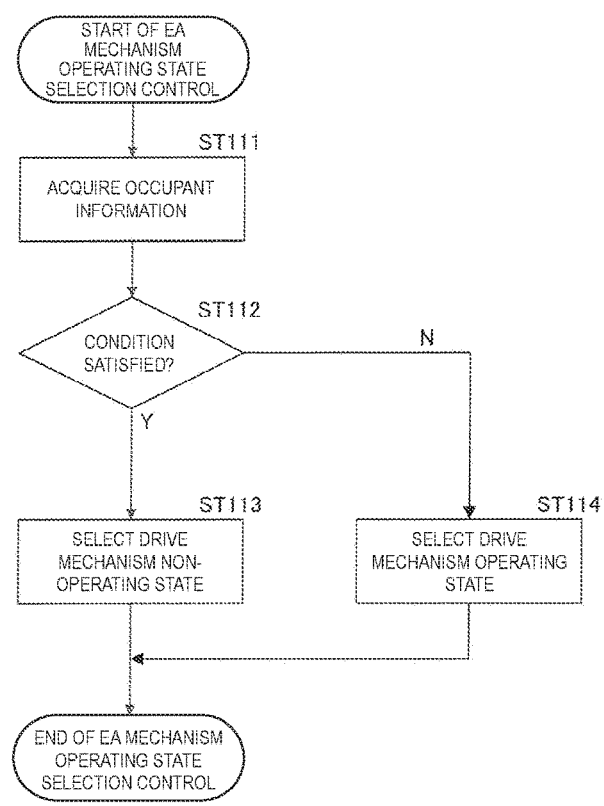
FIG. 19 is a diagram illustrating a control flow chart of the EA mechanism of the seat belt retractor of the first embodiment.

FIG. 18 is a diagram illustrating a control flow chart of the seat belt retractor of the first embodiment. FIG. 19 is a diagram illustrating a control flow chart of the EA mechanism of the seat belt retractor of the first embodiment.

First, in step 11, it is determined whether it is an emergency (ST11). Whether it is an emergency is determined by whether a rapid deceleration, due to a collision or the like, exceeding a predetermined amount that has been set in advance has been detected by the acceleration sensor 73. In step 11, when it is determined that it is not an emergency, the process returns to step 11.

In step 11, when it is determined that it is an emergency, in step 12, the pretensioner mechanism 50 is operated (ST12).

Subsequently, in step 13, EA mechanism operating state selection control is executed (ST13). Note that step 13 may be executed before at least one of step 11 and step 12.

In the EA mechanism operating state selection control, first, in step 111, occupant information is acquired (ST111). The occupant information is acquired from each of the sensors and the like illustrated in FIG. 17.

Subsequently, in step 112, it is determined whether the occupant information acquired in step 111 satisfies a predetermined condition set in advance (ST112). For example, it is determined whether a load acquired by the seat weight sensor 71 is equivalent to or larger than a predetermined value set in advance or is smaller than the predetermined value.

In step 112, when the condition is satisfied, in step 113, drive mechanism non-operating state in which the micro gas generator 32 is not operated is selected (ST113). In step 32, when the condition is not satisfied, in step 114, drive mechanism operating state in which the micro gas generator 32 is operated is selected (ST114). After performing the process of selecting the operation state of the EA mechanism, the EA mechanism operation state selection control is ended.

For example, when the load acquired by the seat weight sensor 71 is equivalent to or larger than the predetermined value set in advance, the first operation state is selected, and when the load acquired by the seat weight sensor 71 is smaller than the predetermined value set in advance, the drive mechanism operating state is selected.

Subsequently, in step 14, the operation of the pretensioner mechanism 50 is ended (ST14).

Subsequently, in step 15, it is determined whether the drive mechanism operating state has been selected in the EA mechanism operation state selection control in step 13 (ST15).

In step 15, when determined to be the drive mechanism operating state, in step 16, the micro gas generator 32 serving as the drive mechanism is operated (ST16). In step 15, when determined not to be the drive mechanism operating state, in other words, when it is determined to be the drive mechanism non-operating state, the process proceeds to step 17.

Subsequently, in step 17, energy is absorbed with the EA mechanism 20 (ST17).

Subsequently, in step 18, absorption of energy with the EA mechanism 20 is ended (ST18).

Figure 20:
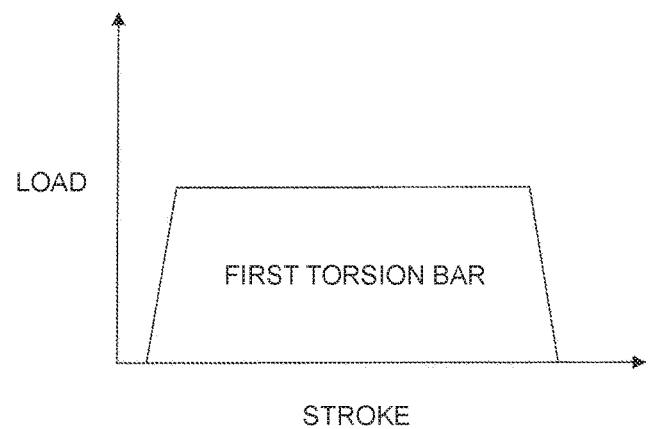
FIG. 20 is a diagram illustrating a load against a stroke of the EA mechanism of the seat belt retractor of the first embodiment when in a first operating state.
Figure 21:
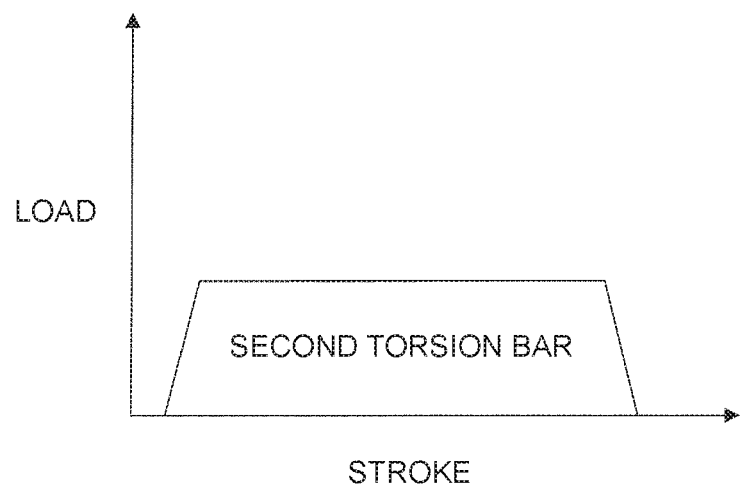
FIG. 21 is a diagram illustrating a load against a stroke of the EA mechanism of the seat belt retractor of the first embodiment when in a second operating state.

FIG. 20 is a diagram illustrating a load against a stroke of the EA mechanism of the seat belt retractor of the first embodiment when in the drive mechanism non-operating state. FIG. 21 is a diagram illustrating a load against a stroke of the EA mechanism of the seat belt retractor of the first embodiment when in the drive mechanism operating state.

As above, when in an emergency, on the basis of information on the state of the emergency, such as information that can be pre-obtained beforehand (information on the weight of the occupant, information on the seat slid position, for example), the collision prediction information that predicts the collision, and information on the severeness of the collision (information on the collision speed, information on the acceleration/deceleration speed of the collision, and the manner of the collision, for example), the seat belt retractor 3 of the above example changes the limit load of the seat belt 4 with the first torsion bar 21 and the second torsion bar 24 that switch between operation and non-operation.

In other words, when the rotation of the first gear 22 in the seat belt withdrawing direction is stopped and the spool 12, with respect to the first gear 22, relatively rotates in the seat belt withdrawing direction, the load on the seat belt 4 is limited with only the first torsion bar 21 or the load on the seat belt 4 is limited with only the second torsion bar 24.

Accordingly, when in an emergency such as in a collision, the limit load of the seat belt can be set according to the information on the emergency, such as information on the state of the emergency, the size of the body of the occupant, and the like. With the above, the occupant can be restricted in a more effective and more adequate manner when in an emergency.

Furthermore, since the second torsion bar 24 is provided inside the spool 12, the seat belt retractor 3 can be formed in a small and compact manner in the up-down direction. With the above, the effective space inside the vehicle chamber can be larger accordingly.

Note that in the example described above, while the micro gas generator 32 is used as the drive member pressing the lever portion 31b of the lever ring 31, the present invention is not limited to the above and, as the drive member, the lever portion 31b may be pressed by a driving force of another means that presses the lever portion 31b such as an electromagnetic force of an electromagnetic solenoid, for example. In such a case, the electromagnetic solenoid may be, in a similar manner to the example described above, driven and controlled by the controller 77.

Transmission of the load will be described now.

Figure 22:
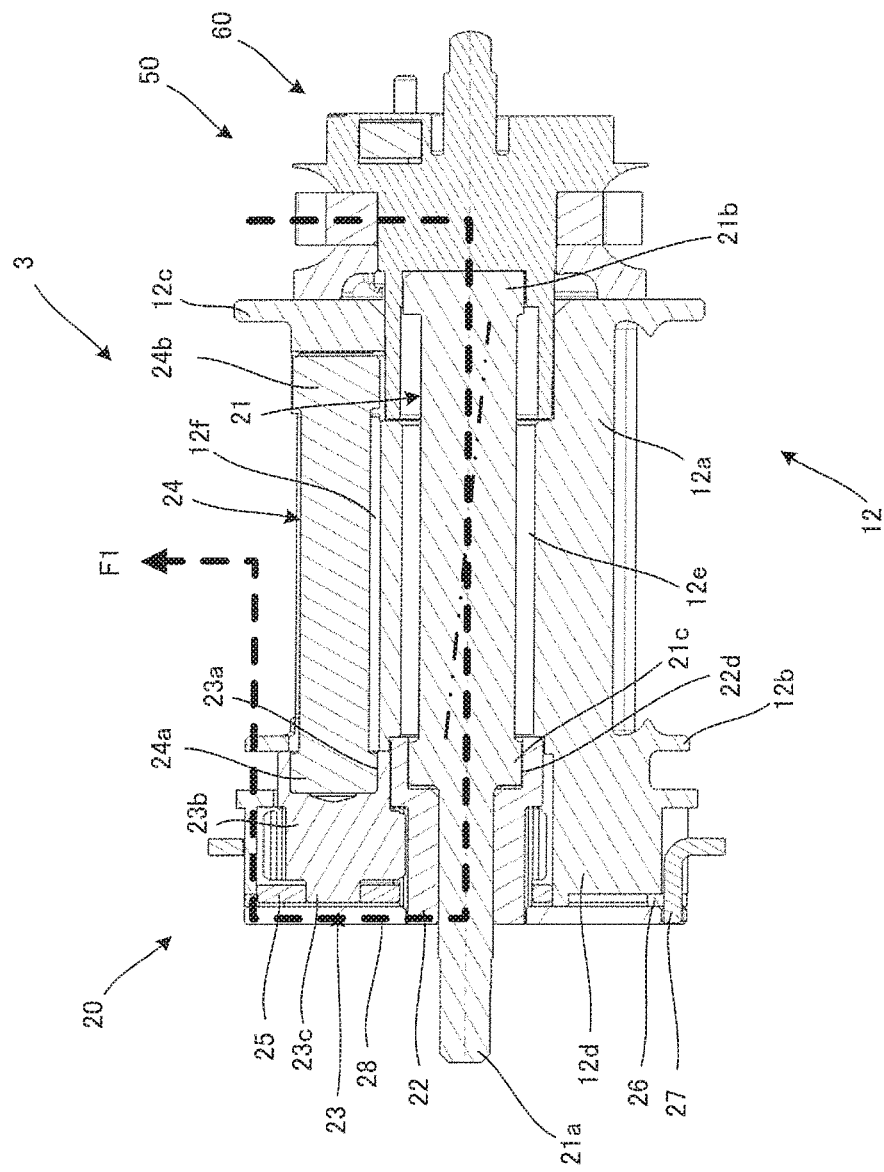
FIG. 22 is a cross-sectional view illustrating transmission of torque of the pretensioner mechanism when the EA mechanism of the seat belt retractor of the first embodiment is in the drive mechanism non-operating state.

FIG. 22 is a cross-sectional view illustrating transmission of torque of the pretensioner mechanism when the EA mechanism of the seat belt retractor of the first embodiment is in the drive mechanism non-operating state.

In a state in which the pretensioner mechanism 50 is operated, the first torsion bar 21, the first gear 22, the second gear 23, the second torsion bar 24, and the spool 12 rotate in an integral manner and torque F1 generated when retracting with the pretensioner mechanism 50 acts on the seat belt 4 (not shown).

Figure 23:
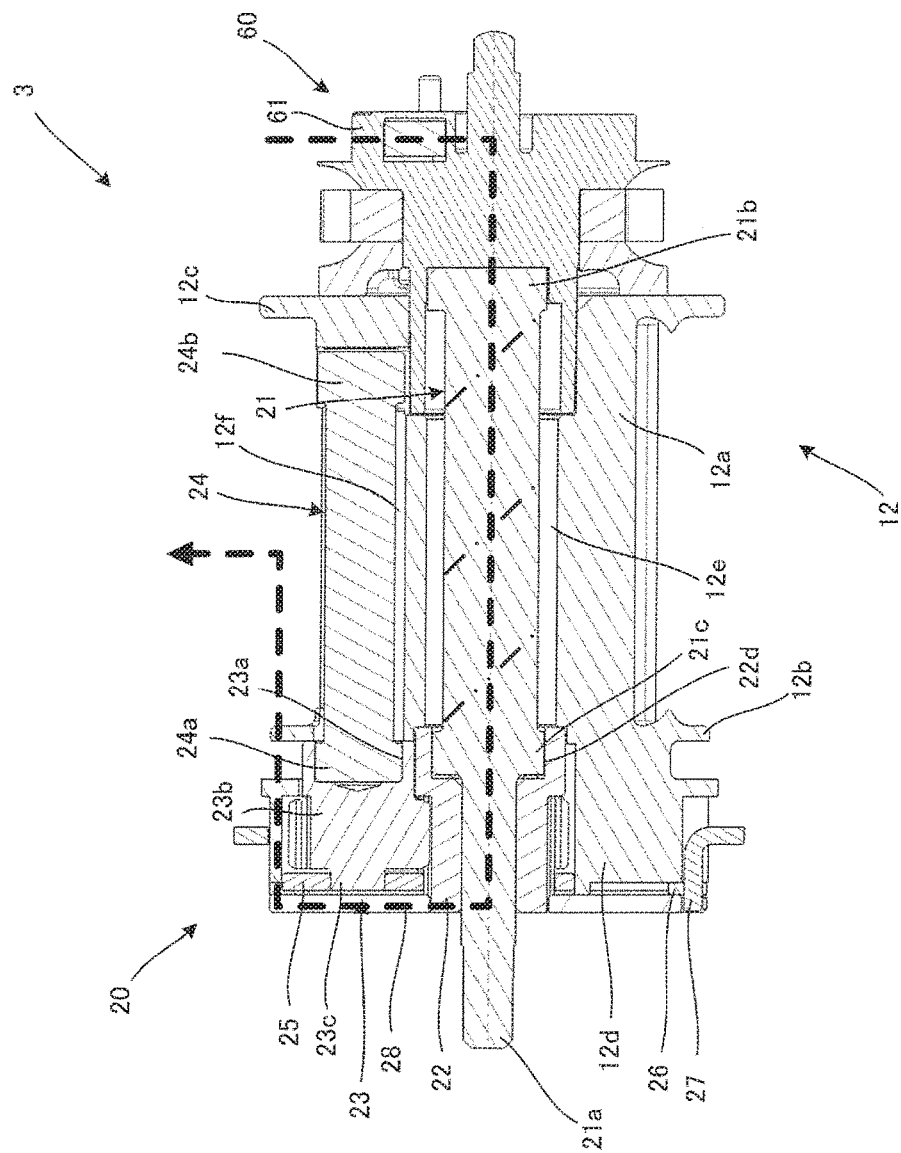
FIG. 23 is a cross-sectional view illustrating transmission of a load when the EA mechanism of the seat belt retractor of the first embodiment is in the drive mechanism non-operating state.

FIG. 23 is a cross-sectional view illustrating transmission of torque when the EA mechanism of the seat belt retractor of the first embodiment is in the drive mechanism non-operating state. Note that in the drawing, the two-dot chain line schematically illustrates the torsion state.

After the pretensioner mechanism 50 is operated and the spool 12 is rotated in the retracting direction, by inertia of the occupant, the spool 12 rotates in the belt withdrawing direction.

In the drive mechanism non-operating state, the release ring 27 is meshed with the cover 28 and is in the first position. Accordingly, when the spool 12 rotates, the load is transmitted in a sequential manner to the release ring 27, the cover 28, the first gear 22, and the first torsion bar 21.

However, since the first torsion bar 21 is held by the locking base 61, the first torsion bar 21 cannot rotate. Accordingly, torsion occurs in the first torsion bar 21. In other words, under the action of the force limiter load, the first torsion bar 21 absorbs energy.

Figure 24:
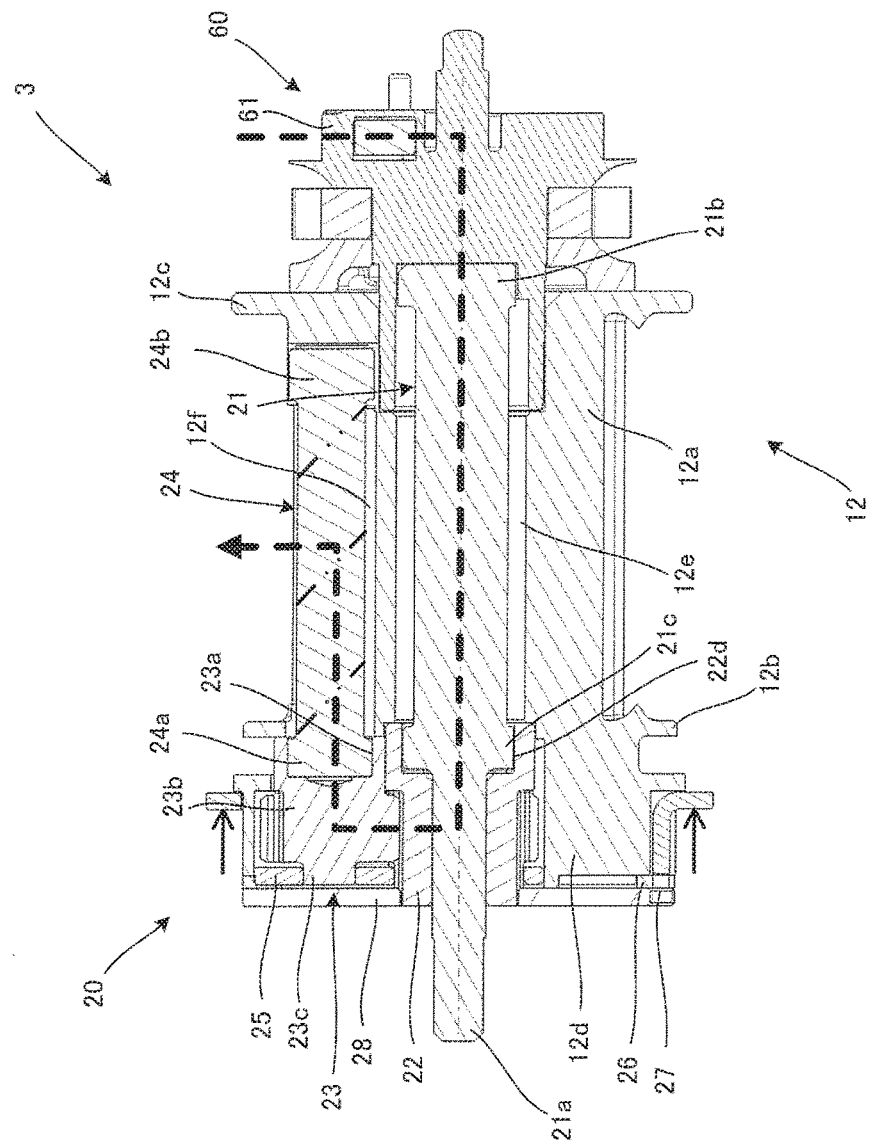
FIG. 24 is a cross-sectional view illustrating transmission of a load when the EA mechanism of the seat belt retractor of the first embodiment is in the drive mechanism operating state.

FIG. 24 is a cross-sectional view illustrating transmission of a load when the EA mechanism of the seat belt retractor of the first embodiment is in the drive mechanism operating state. Note that in the drawing, the two-dot chain line schematically illustrates the torsion state.

In the drive mechanism operating state, the micro gas generator 32 illustrated in FIG. 14 is operated and the release ring 27 is separated from the cover 28 and the release ring holder 26. Since the first torsion bar 21 is held by the locking base 61, the cover 28 and the first gear 22 are fixed together with the first torsion bar 21.

In the above state, when the spool 12 rotates, while the second gear 23 rotates around the first gear 22, the second torsion bar 24 itself does not rotate; accordingly, torsion occurs in the second torsion bar 24. In other words, under the action of the force limiter load, the second torsion bar 24 absorbs energy.

In other words, in the drive mechanism operating state in which the micro gas generator 32 of the seat belt retractor 3 of the first embodiment is operated, only the second torsion bar 24 operates to absorb energy.

Figure 25:
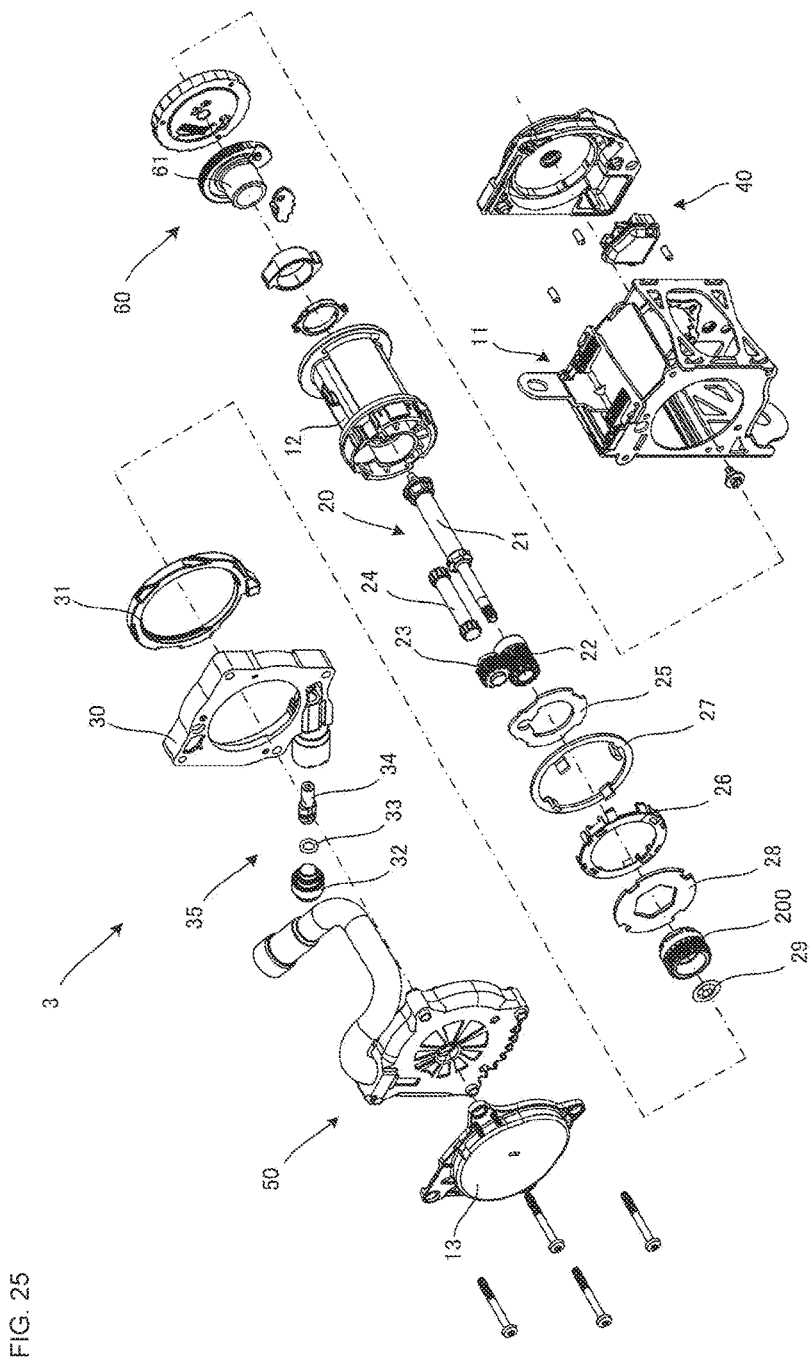
FIG. 25 is an exploded perspective view of a seat belt retractor of a second embodiment.
Figure 26:
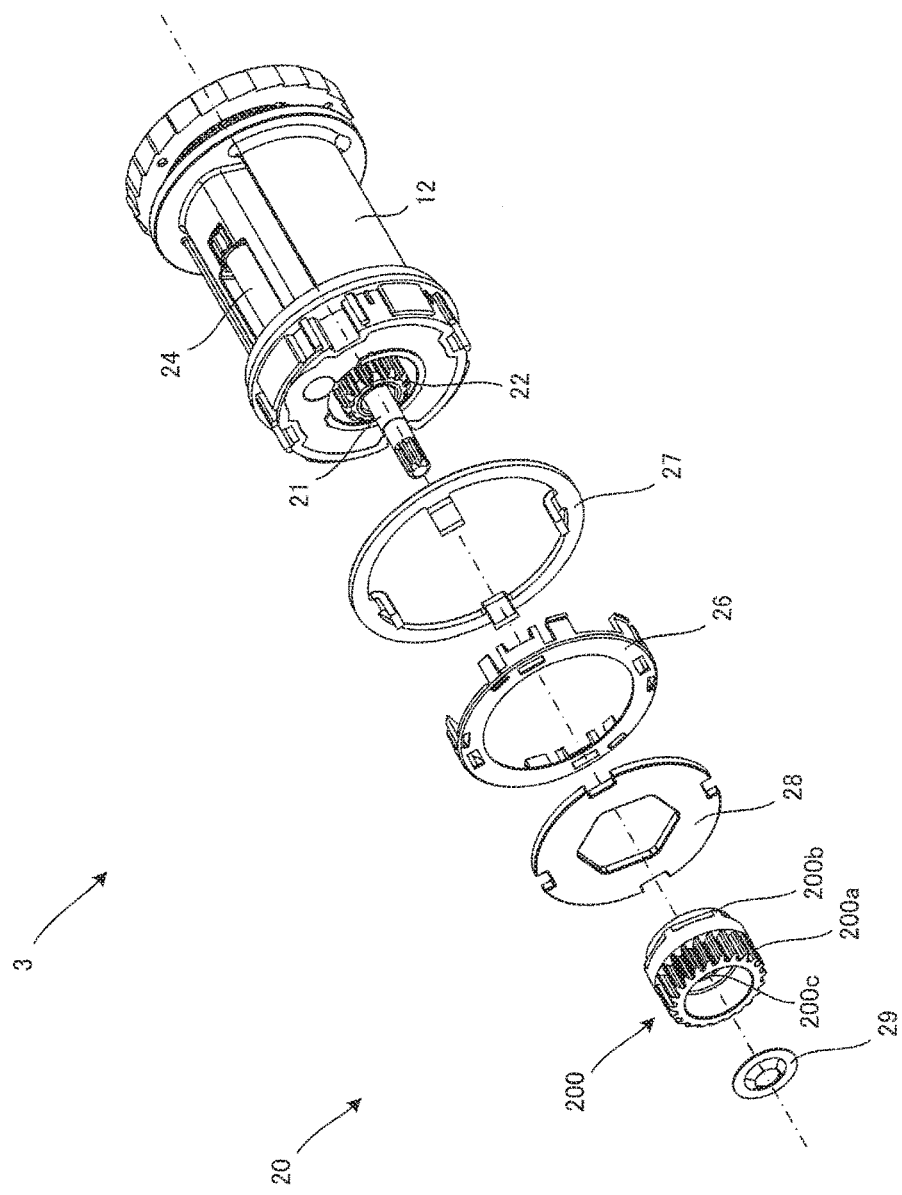
FIG. 26 is an exploded perspective view illustrating an EA mechanism of the seat belt retractor of the second embodiment.

FIG. 25 is an exploded perspective view of a seat belt retractor of a second embodiment. FIG. 26 is an exploded perspective view illustrating an EA mechanism of the seat belt retractor of the second embodiment.

As illustrated in FIG. 25, similar to the first embodiment, the seat belt retractor 3 of the second embodiment includes the frame 11, the spool 12, the spring portion 13, the EA mechanism 20, the drive mechanism 35, the deceleration detection means 40, the pretensioner mechanism 50, and the lock mechanism 60.

The seat belt retractor 3 of the second embodiment includes a pinion 200 that rotates together with the first gear 22 and the cover 28 and has a structure in which the pinion 200 is rotated when the pretensioner mechanism 50 is operated. Note that the structure other than the above is substantially the same as that of the first embodiment, and description thereof is omitted.

As illustrated in FIG. 26, a first teeth portion 200a is formed on the outer periphery of the pinion 200 on the side opposite the spool 12. The first teeth portion 200a is installed so as to be capable of being meshed with a portion of the pretensioner mechanism 50.

A fitting portion 200b is formed on the outer periphery of the pinion 200 on the spool 12 side. The fitting portion 200b is fitted into the inner periphery of the cover 28. Accordingly, the pinion 200 rotates together with the cover 28.

A second teeth portion 200c is formed on the inner periphery of the pinion 200 on the spool 12 side. The second teeth portion 200c meshes with the first gear 22. Accordingly, the pinion 200 rotates together with the first gear 22.

An operation of the seat belt retractor 3 of the second embodiment will be described next.

In the seat belt retractor 3 of the second embodiment, first, when the deceleration detection means 40 illustrated in FIG. 25 detects a rapid deceleration of the vehicle, which occurs when in an emergency, the operation of the pretensioner mechanism 50 and that of the lock mechanism 60 are started.

Figure 27:
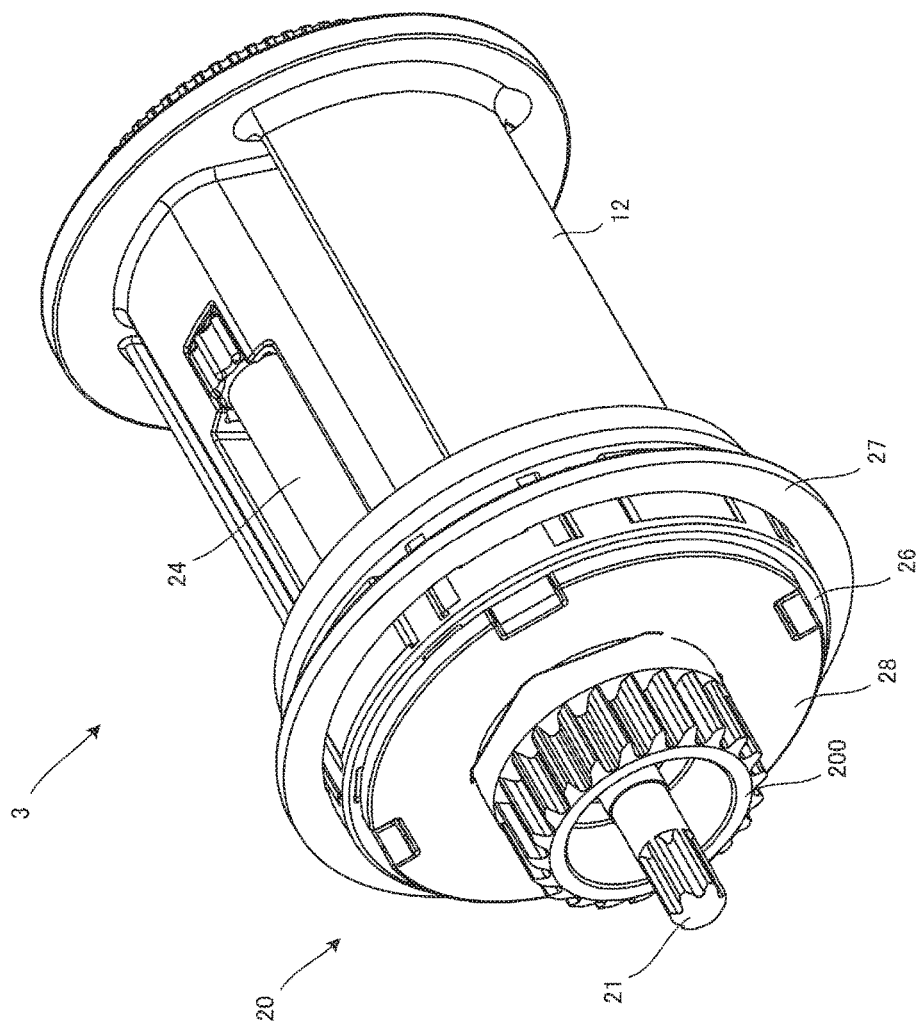
FIG. 27 is a perspective view illustrating the EA mechanism of the seat belt retractor of the second embodiment.
Figure 28:
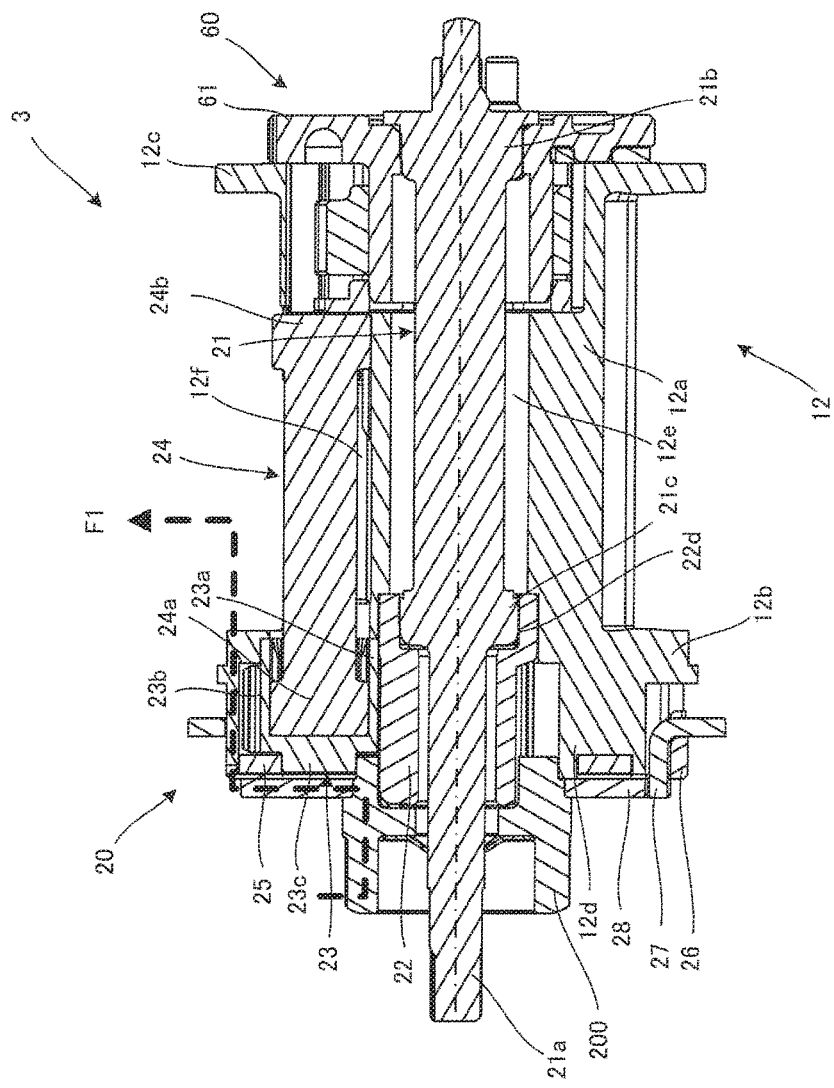
FIG. 28 is a cross-sectional view illustrating transmission of torque of the pretensioner mechanism when the EA mechanism of the seat belt retractor of the second embodiment is in the drive mechanism non-operating state.

FIG. 27 is a perspective view illustrating the EA mechanism of the seat belt retractor of the second embodiment. FIG. 28 is a cross-sectional view illustrating transmission of torque of the pretensioner mechanism when the EA mechanism of the seat belt retractor of the second embodiment is in the drive mechanism non-operating state.

In a state in which the pretensioner mechanism 50 is operated, the pinion 200, the cover 28, the release ring 27, and the spool 12 rotate in an integral manner and torque F1 generated when retracting with the pretensioner mechanism 50 acts on the seat belt 4 (not shown). Accordingly, since the spool 12 can be rotated without through the first torsion bar 21 and the second torsion bar 24, no torsion will occur in the first torsion bar 21 and the second torsion bar 24 and the load can be transmitted in a swift and appropriate manner.

Then, the EA mechanism 20 is operated. Note that the EA mechanism 20 of the second embodiment is operated in two ways, namely, the drive mechanism non-operating state and the drive mechanism operating state.

Figure 29:
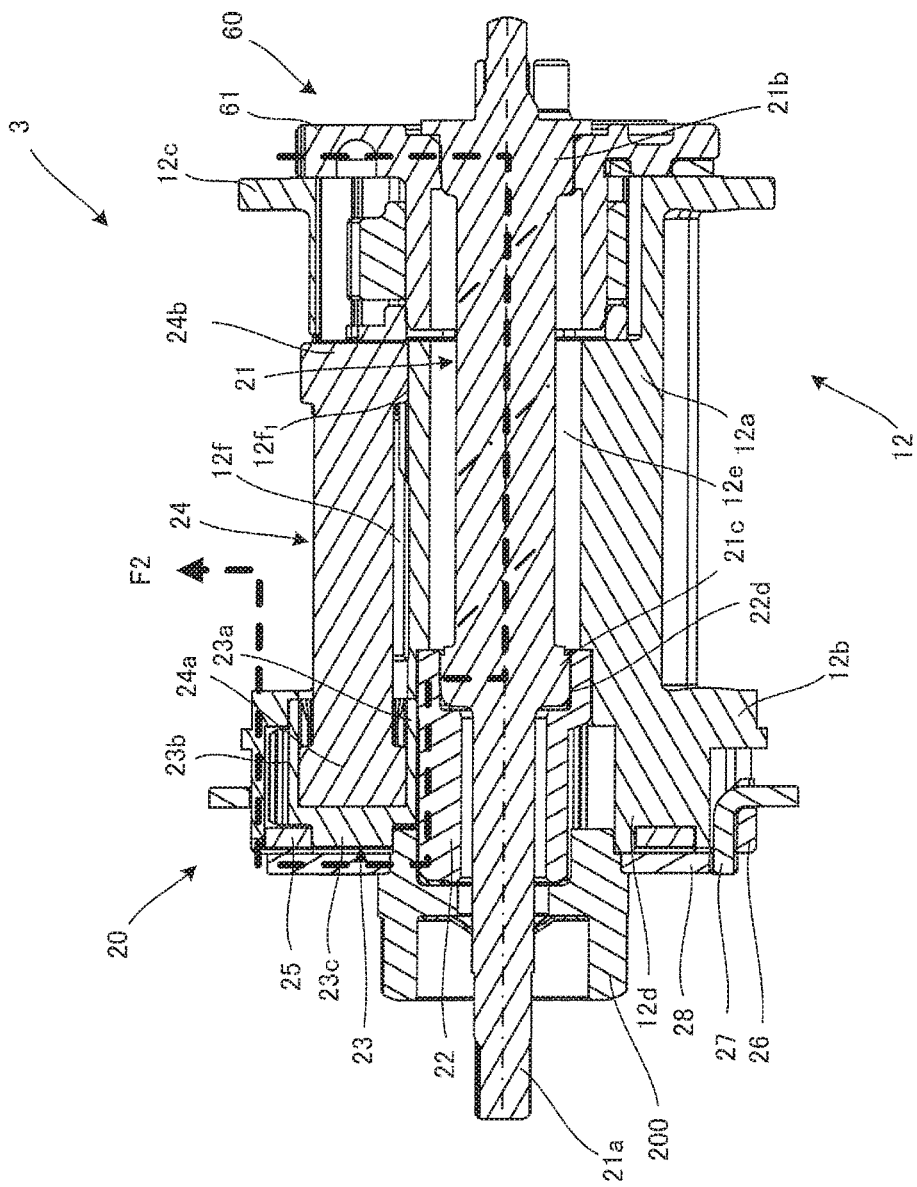
FIG. 29 is a cross-sectional view illustrating transmission of a load when the EA mechanism of the seat belt retractor of the second embodiment is in the drive mechanism non-operating state.

FIG. 29 is a cross-sectional view illustrating transmission of a load when the EA mechanism of the seat belt retractor of the second embodiment is in the drive mechanism non-operating state. Note that in the drawing, the two-dot chain line schematically illustrates the torsion state.

After the pretensioner mechanism 50 is operated and the spool 12 is rotated in the retracting direction, by inertia of the occupant, the spool 12 rotates in the belt withdrawing direction.

In the drive mechanism non-operating state, the release ring 27 is meshed with the cover 28 and is in the first position. Accordingly, when the spool 12 rotates, load F2 is transmitted in a sequential manner to the release ring 27, the cover 28, the pinion 200, the first gear 22, and the first torsion bar 21.

However, since the first torsion bar 21 is held by the locking base 61, the first torsion bar 21 cannot rotate. Accordingly, torsion occurs in the first torsion bar 21. In other words, under the action of the force limiter load, the first torsion bar 21 absorbs energy.

Figure 30:
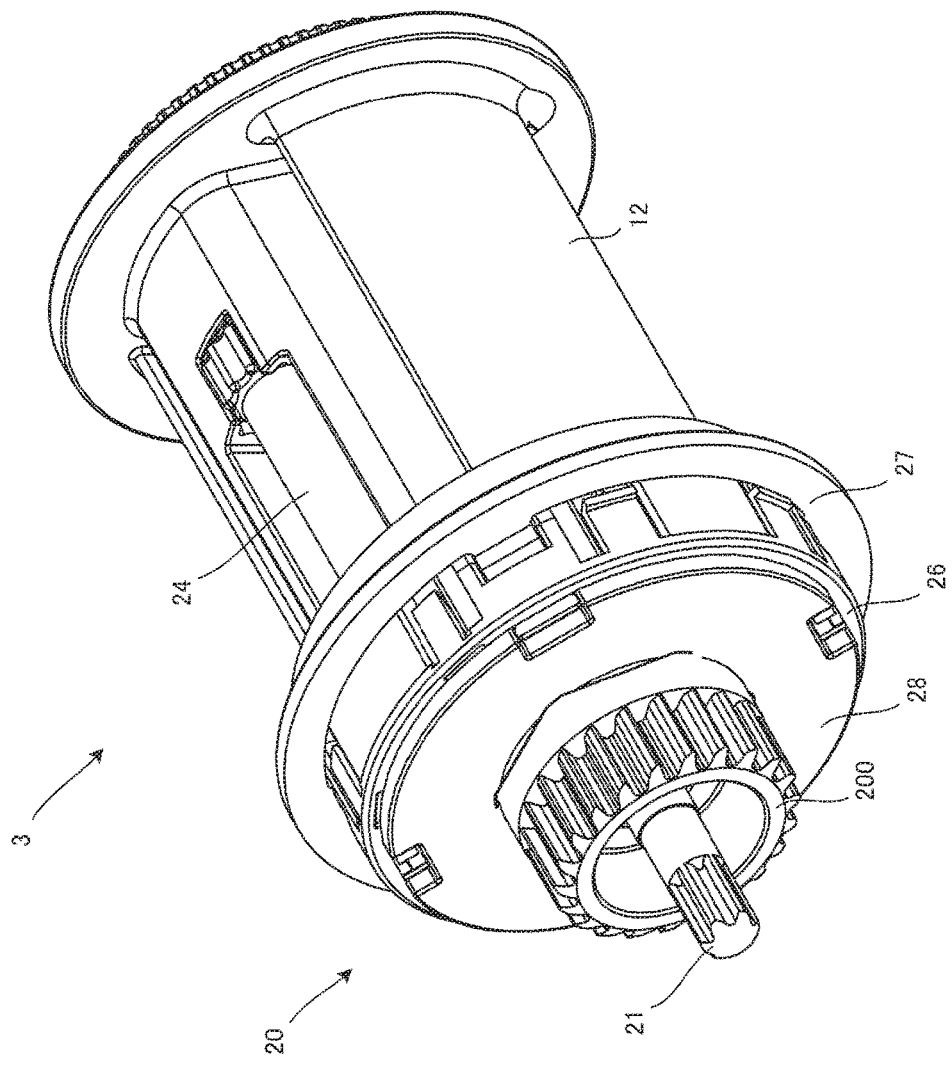
FIG. 30 is a perspective view illustrating the drive mechanism operating state of the EA mechanism of the seat belt retractor of the second embodiment.
Figure 31:
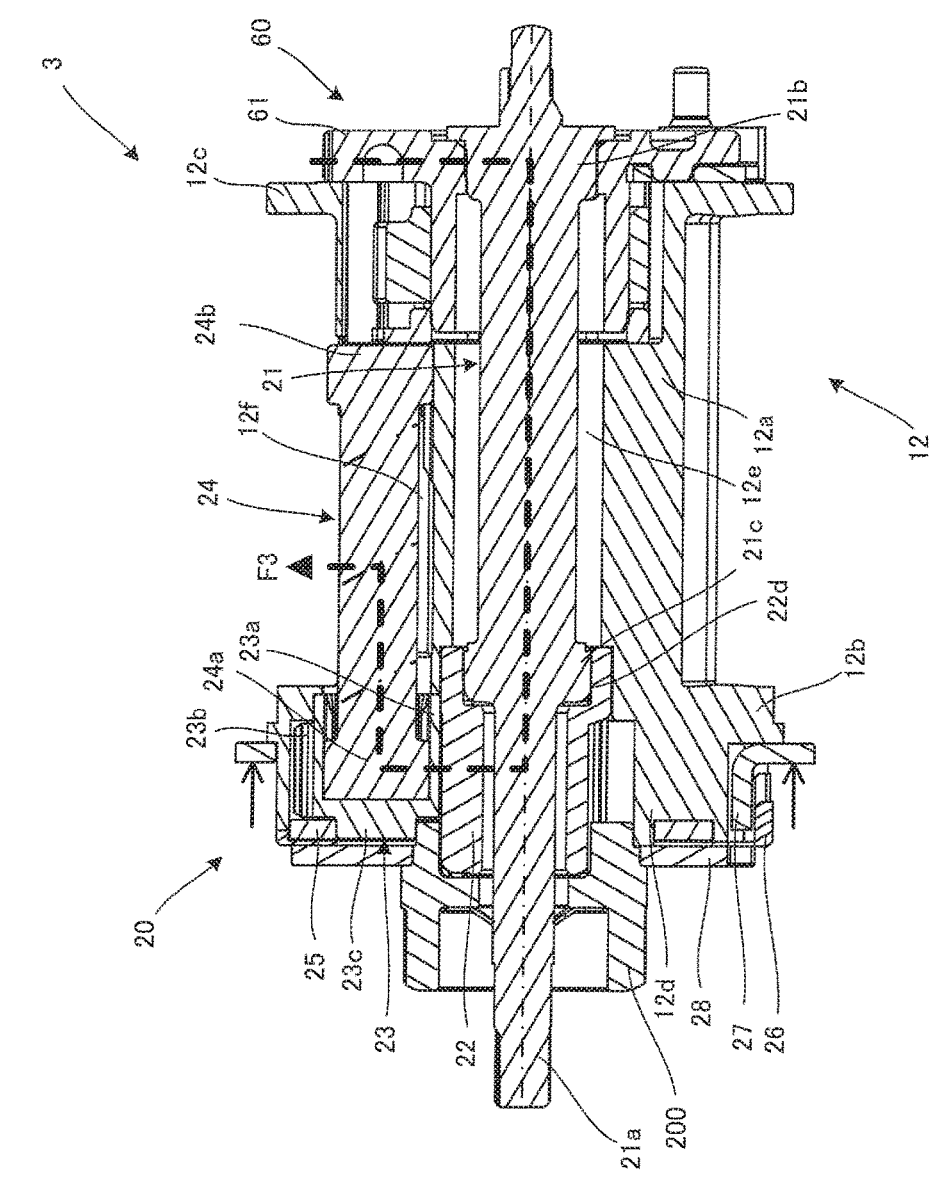
FIG. 31 is a cross-sectional view illustrating transmission of a load in the drive mechanism operating state illustrated in FIG. 30.

FIG. 30 is a perspective view illustrating the drive mechanism operating state of the EA mechanism of the seat belt retractor of the second embodiment. FIG. 31 is a cross-sectional view illustrating transmission of a load in the drive mechanism operating state illustrated in FIG. 30. Note that in the drawing, the two-dot chain line schematically illustrates the torsion state.

In the drive mechanism operating state, the micro gas generator 32 illustrated in FIG. 25 is operated and the release ring 27 is separated from the cover 28 and the release ring holder 26. Since the first torsion bar 21 is held by the locking base 61, the cover 28, the pinion 200, and the first gear 22 are fixed together with the first torsion bar 21.

In the above state, when the spool 12 rotates, while the second gear 23 rotates around the first gear 22, the second torsion bar 24 itself does not rotate; accordingly, torsion occurs in the second torsion bar 24. In other words, under the action of a force limiter load F3, the second torsion bar 24 absorbs energy.

In other words, in the drive mechanism operating state in which the micro gas generator 32 of the seat belt retractor 3 of the second embodiment is operated, only the second torsion bar 24 operates to absorb energy.

Figure 32:
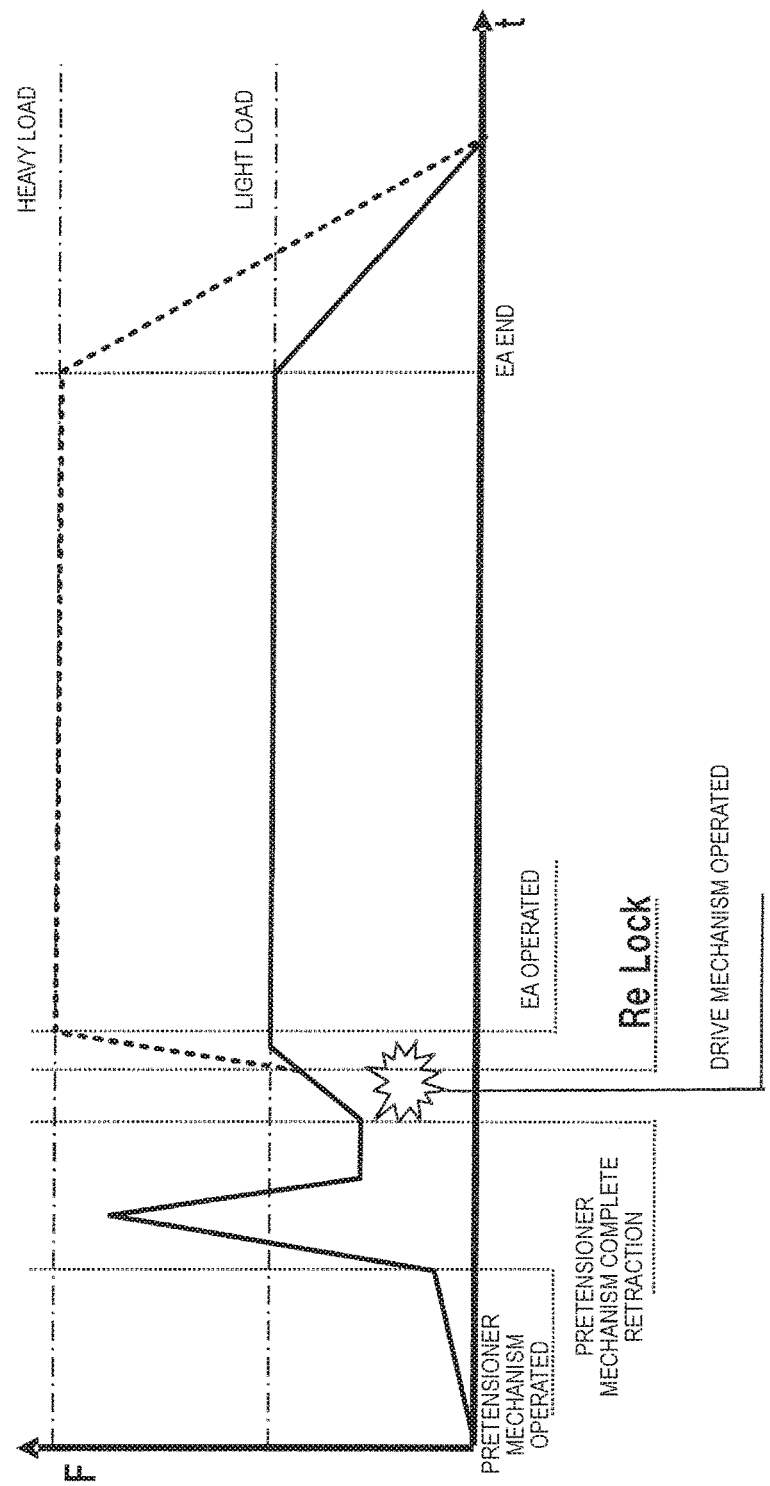
FIG. 32 illustrates a timing of the operation of the drive mechanism of the seat belt retractor of the second embodiment, a timing of the operation of the pretensioner mechanism, and a timing of the operation of the EA mechanism.

FIG. 32 illustrates the first timing of the operation of the drive mechanism, the operation of the pretensioner mechanism, and the EA mechanism of the seat belt retractor of the second embodiment.

In the seat belt retractor 3 of the second embodiment, after the pretensioner mechanism 50 has started to operate and the retraction of the seat belt 4 with the pretensioner mechanism 50 has been completed, when the load acquired by the seat weight sensor 71 is smaller than a predetermined value set in advance, the micro gas generator 32 is operated. Note that the timings may be similar to those of the operation of the pretensioner mechanism and the operation of the EA mechanism of the seat belt retractor of the first embodiment illustrated in FIG. 18.

As above, by operating the drive mechanism 35 after the operation of the pretensioner mechanism 50 has ended, the performance of retracting the seat belt 4 with the pretensioner mechanism 50 can be maintained.

The second operation timing of the drive mechanism 35 of the seat belt retractor will be described next.

Figure 33:
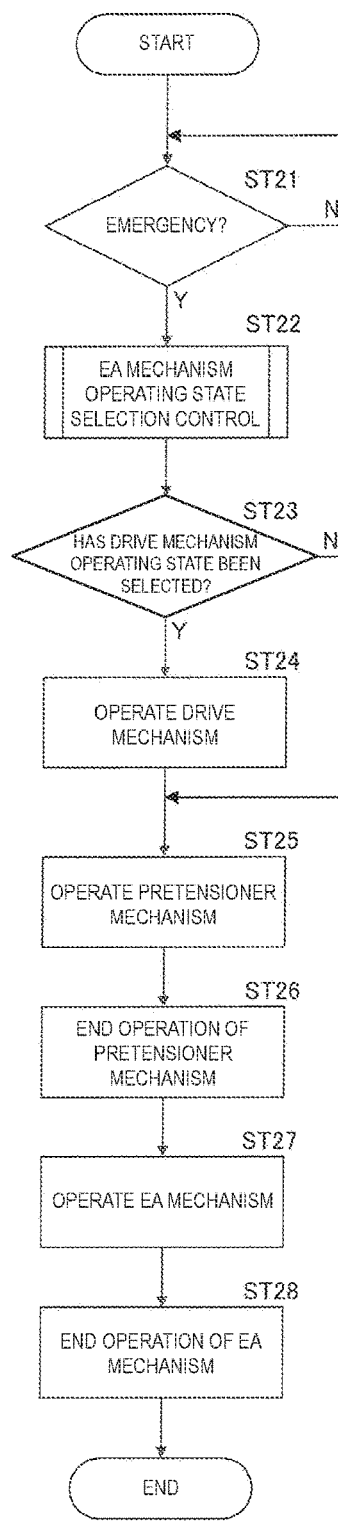
FIG. 33 is a diagram illustrating a control flow chart of the seat belt retractor of the second embodiment.

FIG. 33 is a diagram illustrating a control flow chart of the seat belt retractor of the second embodiment.

First, in step 21, it is determined whether it is an emergency (ST21). Whether it is an emergency is determined by whether a rapid deceleration, due to a collision or the like, exceeding a predetermined amount that has been set in advance has been detected by the acceleration sensor 73. In step 21, when it is determined that it is not an emergency, the process returns to step 21.

In step 21, when it is determined that it is an emergency, in step 22, the EA mechanism operation state selection control is executed (ST22). The EA mechanism operation state selection control performs control in a similar manner to the control in the flow chart illustrated in FIG. 19. Note that the EA mechanism operation state selection control in step 22 may be executed before step 21.

Subsequently, in step 23, it is determined whether the drive mechanism operating state has been selected in the EA mechanism operation state selection control in step 22 (ST23).

In step 23, when it is determined to be the drive mechanism operating state, in step 24, the micro gas generator 32 serving as the drive mechanism is operated (ST24). In step 23, when determined not to be the drive mechanism operating state, in other words, when determined to be the drive mechanism non-operating state, the process proceeds to step 25.

Subsequently, in step 25, the pretensioner mechanism 50 is operated (ST25).

Subsequently, in step 26, the operation of the pretensioner mechanism 50 is ended (ST26).

Subsequently, in step 27, the EA mechanism 20 is operated (ST27).

Subsequently, in step 28, the operation of the EA mechanism 20 is ended (ST28).

Transmission of a load of the second embodiment will be described next.

When the EA mechanism 20 of the seat belt retractor of the second embodiment is in the drive mechanism non-operating state, the transmission of torque of the pretensioner mechanism 50 is similar to that in FIG. 28. The transmission of a load when the EA mechanism 20 of the seat belt retractor of the second embodiment is in the drive mechanism non-operating state is similar to that in FIG. 29. Furthermore, the transmission of a load when the EA mechanism 20 of the seat belt retractor of the second embodiment is in the drive mechanism non-operating state is similar to that in FIG. 31.

Figure 34:
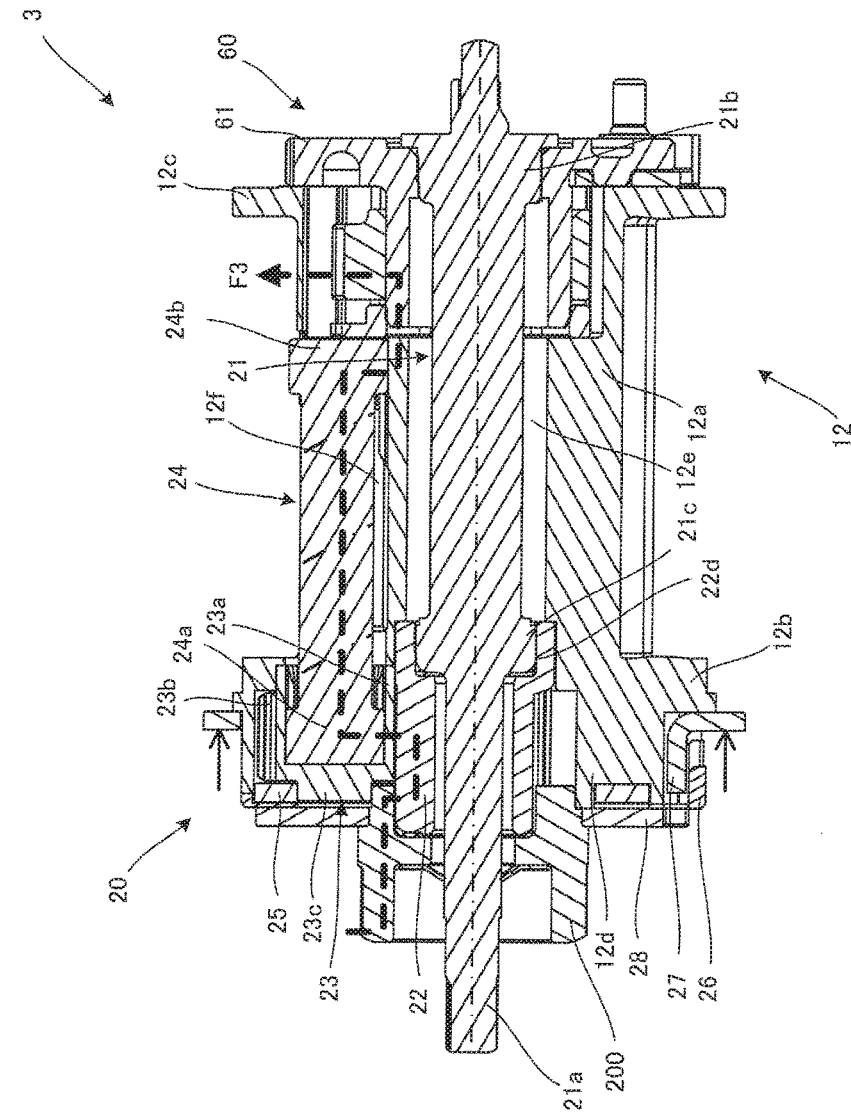
FIG. 34 is a cross-sectional view illustrating transmission of torque of the pretensioner mechanism when the EA mechanism of the seat belt retractor of the second embodiment is in the drive mechanism operating state.

FIG. 34 is a cross-sectional view illustrating transmission of torque of the pretensioner mechanism 50 when the EA mechanism of the seat belt retractor of the second embodiment is in the drive mechanism operating state. Note that in the drawing, the two-dot chain line schematically illustrates the torsion state.

When the micro gas generator 32 is operated before the operation of the pretensioner mechanism 50, the release ring 27 becomes separated from the cover 28 and the release ring holder 26. Since the first torsion bar 21 is held by the locking base 61, the cover 28 is fixed together with the first torsion bar 21.

In the above state, the torque of the pretensioner mechanism 50 is transmitted to the spool 12 through the pinion 200, the first gear 22, the second gear 23, and the second torsion bar 24. However, since the torque of the pretensioner mechanism 50 is larger than the torsion force of the second torsion bar 24, torsion occurs in the second torsion bar 24. In other words, the load when the spool 12 is retracted can be reduced.

Figure 35:
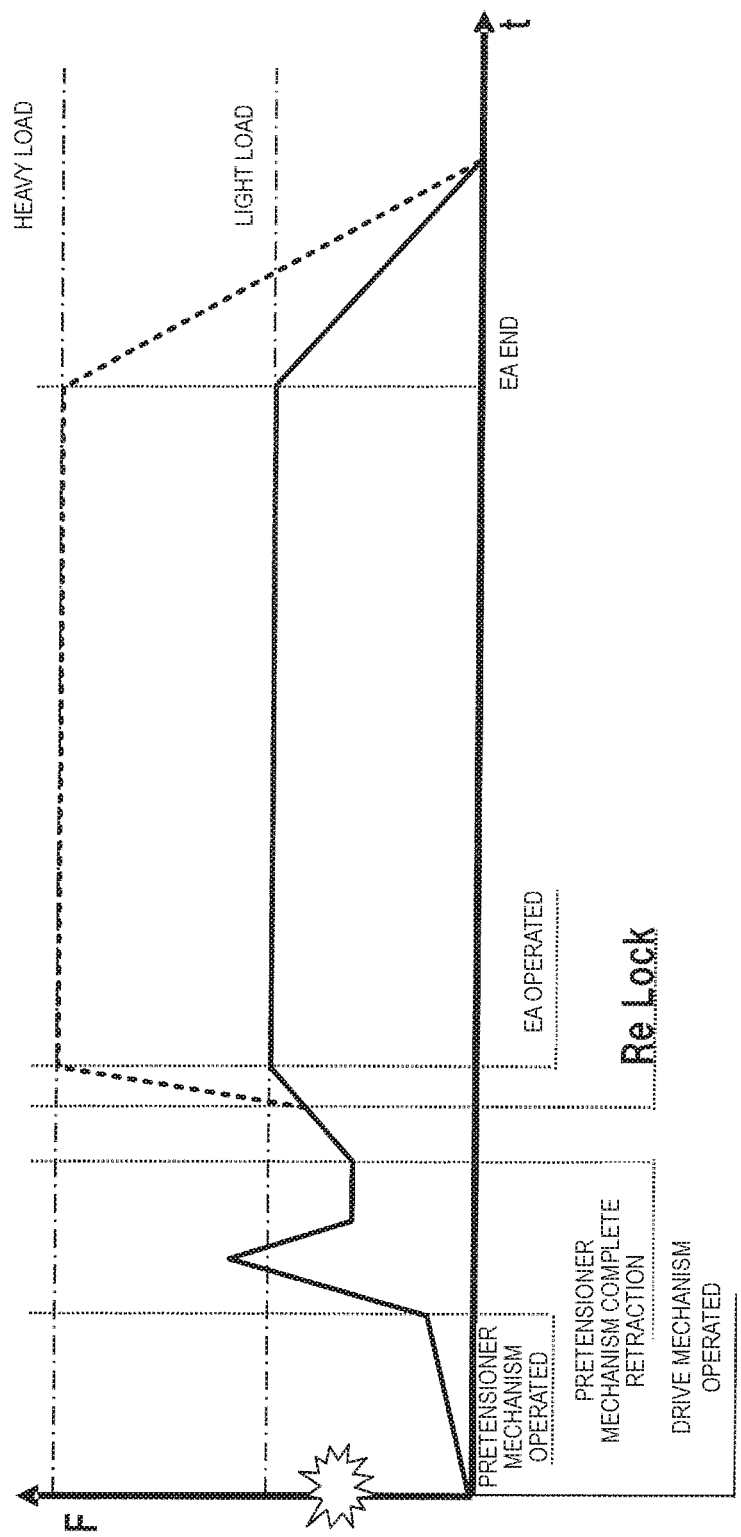
FIG. 35 illustrates a timing of the operation of the drive mechanism of the seat belt retractor of the second embodiment, a timing of the operation of the pretensioner mechanism, and a timing of the operation of the EA mechanism.

FIG. 35 illustrates the timing of the operation of the drive mechanism, the timing of the operation of the pretensioner mechanism, and the timing of the operation of the EA mechanism of the seat belt retractor of the second embodiment.

In the seat belt retractor 3 of the second embodiment, before the pretensioner mechanism 50 is operated or at the same time as the pretensioner mechanism 50 is operated, when the load acquired by the seat weight sensor 71 is smaller than a predetermined value set in advance, the micro gas generator 32 is operated.

By operating the micro generator 32 before the pretensioner mechanism 50 is operated or at the same time as the pretensioner mechanism 50 is operated, it is possible to appropriately switch the torque of a single pretensioner mechanism 50 according to the difference in the weight of the occupant.

For example, in a case of an occupant having a light load, torque of the pretensioner mechanism 50 may be reduced by operating the micro generator 32 and creating torsion in the second torsion bar 24; accordingly, torque of the pretensioner mechanism 50 may be set so as to match an occupant having a high load while obtaining sufficient retraction performance.

Figure 36:
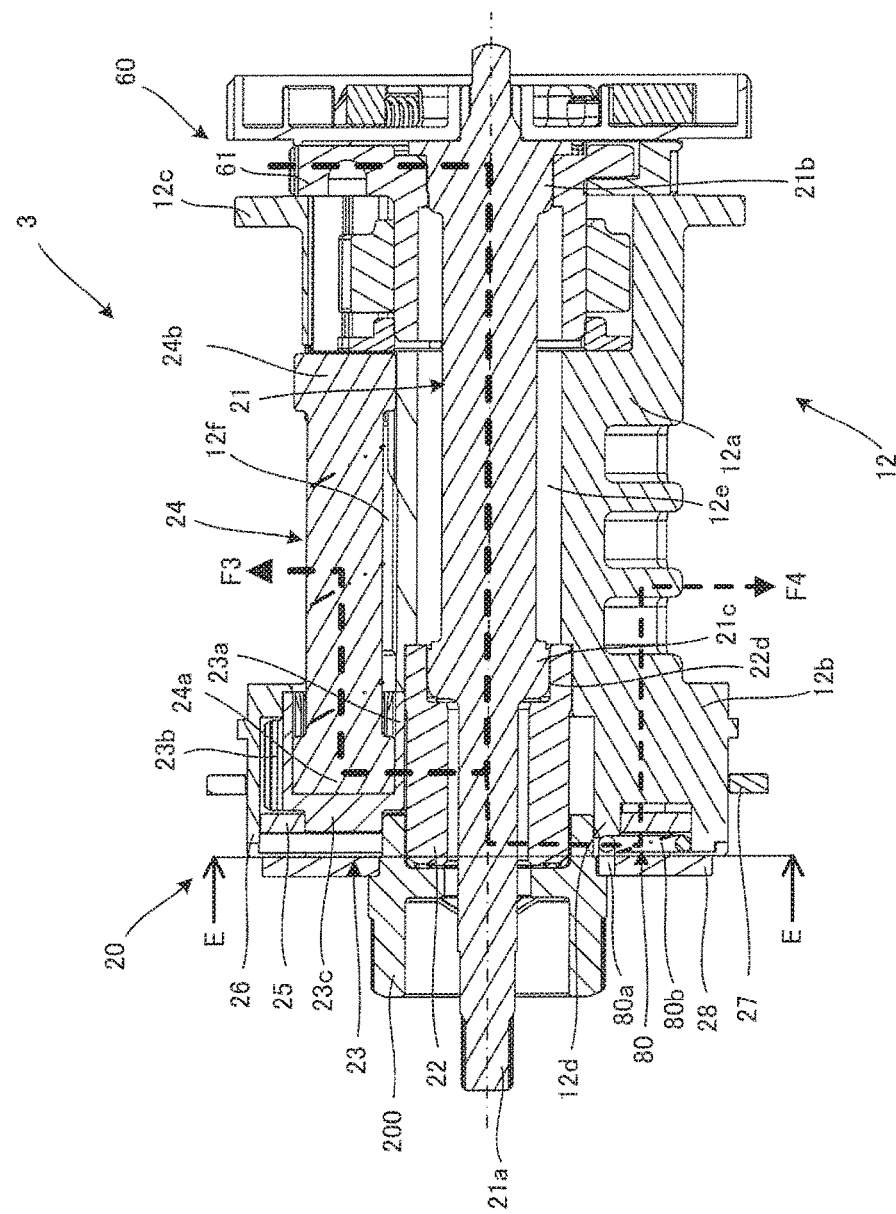
FIG. 36 is a cross-sectional view of a seat belt retractor of a third embodiment.
Figure 37:
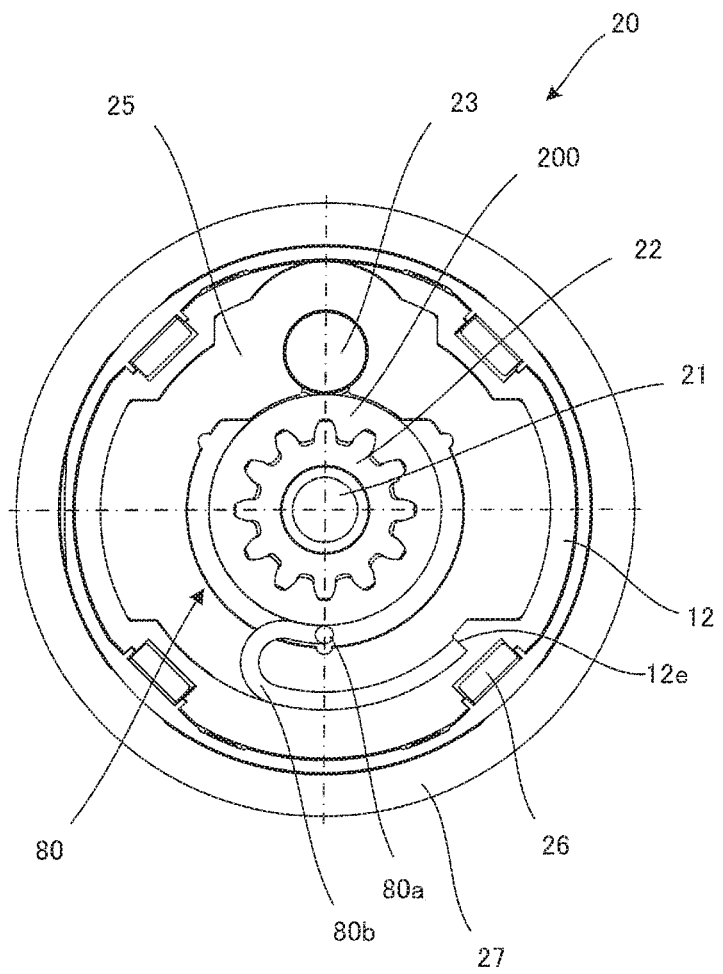
FIG. 37 is a cross-sectional view taken along line E-E in FIG. 36 and viewed in the arrow direction.

FIG. 36 is a cross-sectional view of a seat belt retractor of a third embodiment. FIG. 37 is a cross-sectional view taken along line E-E in FIG. 36 and viewed in the arrow direction.

In the seat belt retractor 3 of the third embodiment, in addition to the first torsion bar 21 and the second torsion bar 24, the EA mechanism 20 includes an elastic member 80 that constitutes a third energy absorption member. Note that the other points of the seat belt retractor 3 of the third embodiment have similar configurations to those of the retractor 3 of the second embodiment; accordingly, description thereof is omitted.

The elastic member 80 is a member having elasticity and includes a support portion 80a and a deforming portion 80b. The support portion 80a is secured to the outer periphery of the fitting portion 200b of the pinion 200 illustrated in FIG. 26. In the deforming portion 80b, one end is fixed to the support portion 80a, an intermediate portion is bent, and the other end is hooked to a hooking portion 12e of the spool 12. Note that the elastic member 80 is a strip-like metal plate and, up until a predetermined degree of deformation, returns to the original shape by elastic force; however, when exceeding the predetermined degree of deformation, the elastic member 80 becomes plastically deformed.

An operation of the seat belt retractor 3 of the third embodiment will be described next.

The EA mechanism 20 of the third embodiment is operated in two ways, namely, the drive mechanism non-operating state and the drive mechanism operating state. The drive mechanism operating state operates at a first operation timing or at a second operation timing.

In the first operation timing, after the pretensioner mechanism 50 is operated and the retraction of the seat belt 4 with the pretensioner mechanism 50 has been completed, when the load acquired by the seat weight sensor 71 and the like is smaller than a predetermined value set in advance, the micro gas generator 32 is operated.

In the second operation timing, before the pretensioner mechanism 50 is operated or at the same time as the pretensioner mechanism 50 is operated, when the load acquired by the seat weight sensor 71 is smaller than a predetermined value set in advance, the micro gas generator 32 is operated.

The drive mechanism non-operating state of the third embodiment operates while in a state in which the micro gas generator 32 does not operate and operates in a similar manner to that of the second embodiment; accordingly, description thereof is omitted.

An operation of the elastic member 80 used in the seat belt retractor 3 of the third embodiment will be described next.

Figure 38:
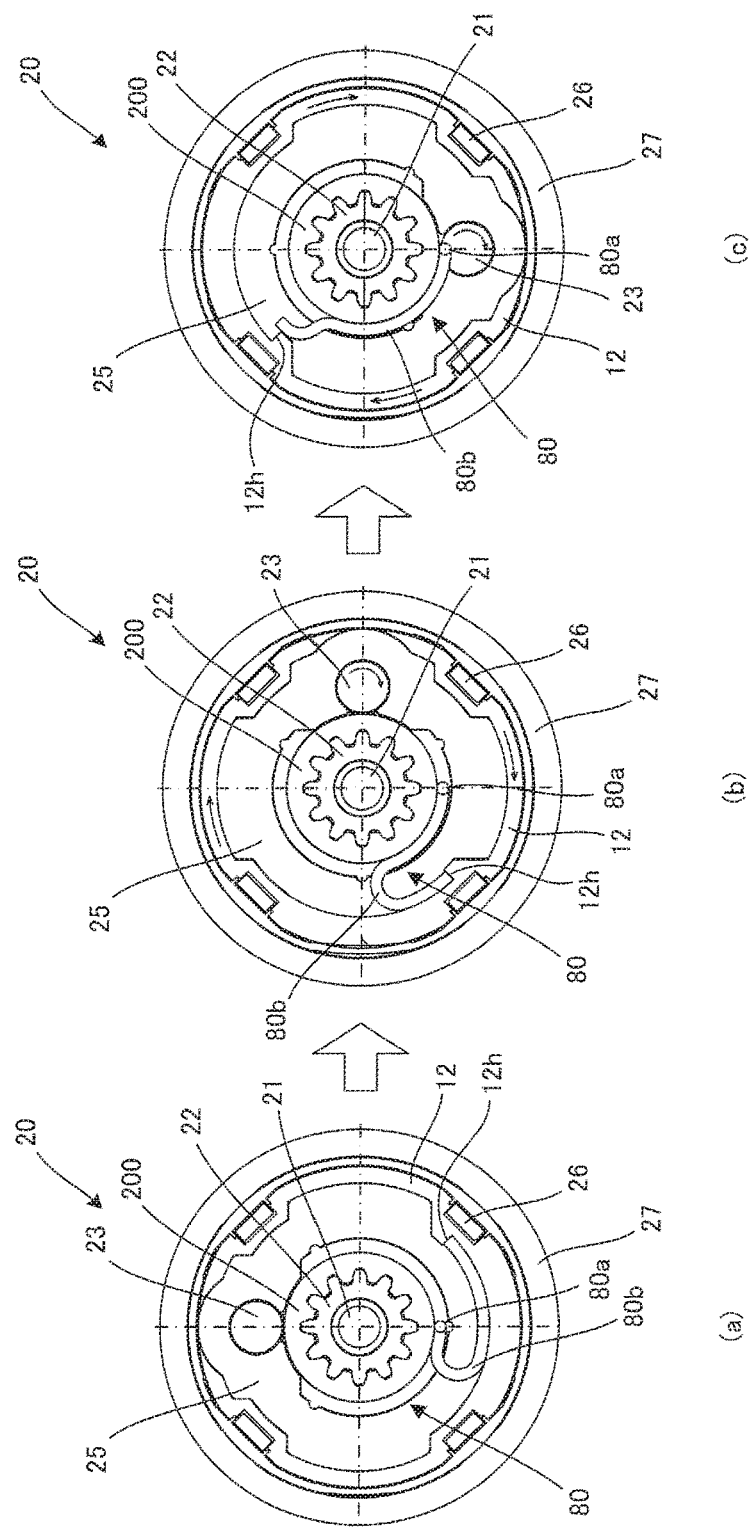
FIG. 38 illustrates cross-sectional views illustrating the elastic member operating at a first operation timing of the EA mechanism of the seat belt retractor of the third embodiment.

FIG. 38 illustrates cross-sectional views illustrating the elastic member operating at the first operation timing of the EA mechanism of the seat belt retractor of the third embodiment.

In the first operation timing, the micro gas generator 32 illustrated in FIG. 25 operates after the retraction of the seat belt 4 is completed by the pretensioner mechanism 50.

The micro gas generator 32 is operated, and similar to the second embodiment illustrated in FIG. 31, the release ring 27 becomes separated from the cover 28 and the release ring holder 26. Since the first torsion bar 21 is held by the locking base 61, the cover 28, the pinion 200, and the first gear 22 are fixed together with the first torsion bar 21.

In the above state, when the spool 12 rotates, while the second gear 23 rotates around the first gear 22, the second torsion bar 24 itself does not rotate; accordingly, torsion occurs in the second torsion bar 24. In other words, under the action of the force limiter load F3 illustrated in FIG. 36, the second torsion bar 24 absorbs energy.

Furthermore, since the pinion 200 is fixed, when the spool 12 rotates, from the state of FIG. 38(a), as illustrated in FIG. 38(b), the bent position of the deforming portion 80b of the elastic member 80 moves. In other words, under the action of a force limiter load F4 illustrated in FIG. 36, the deforming portion 80b of the elastic member 80 absorbs energy. Subsequently, when the spool 12 rotates further, as illustrated in FIG. 38(c), the other end of the deforming portion 80b becomes detached from the hooking portion 12e of the spool 12 and the force limiter load F4 cease to act.

In other words, after the retraction of the seat belt 4 is completed with the pretensioner mechanism 50 of the seat belt retractor 3 of the third embodiment, in the first operation timing in which the micro gas generator 32 operates, when the drive mechanism operates, the second torsion bar 24 and the elastic member 80 initially operate to absorb energy. Subsequently, the second torsion bar 24 alone operates to absorb energy.

Figure 39:
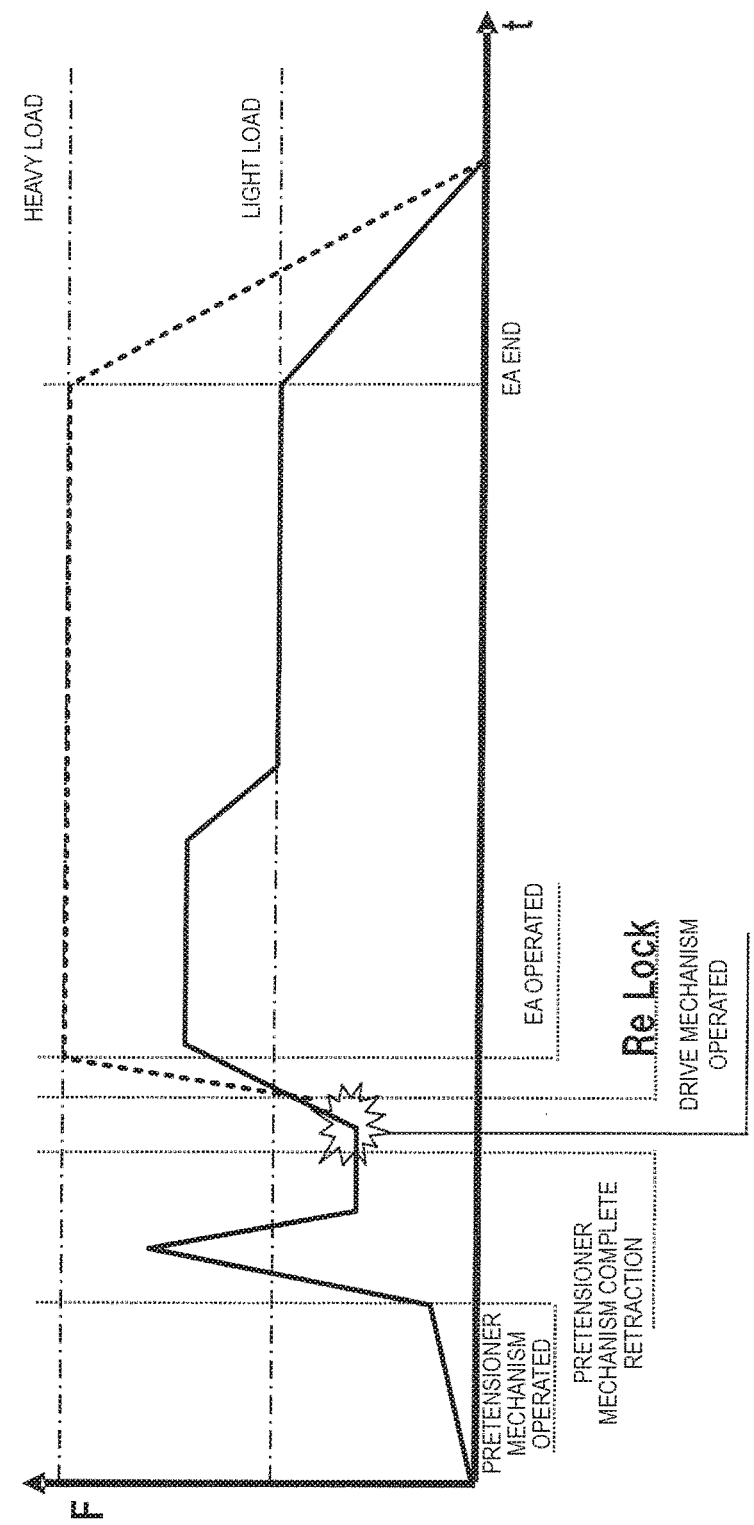
FIG. 39 illustrates the first operation timing of the seat belt retractor of the third embodiment.

FIG. 39 illustrates the first operation timing of the seat belt retractor of the third embodiment.

In the first operation timing, in the seat belt retractor 3 of the third embodiment, after the pretensioner mechanism 50 has started to operate and the retraction of the seat belt 4 with the pretensioner mechanism 50 has been completed, when the load acquired by the seat weight sensor 71 and the like is smaller than a predetermined value set in advance, the micro gas generator 32 is operated.

As described above, after the operation of the pretensioner mechanism 50 has ended, by operating the EA mechanism 20, the performance of retracting the seat belt 4 with the pretensioner mechanism 50 can be maintained.

Furthermore, when the drive mechanism of the seat belt retractor of the third embodiment is operated at the first operation timing, the second torsion bar 24 and the elastic member 80 are initially operated to absorb energy. Subsequently, since only the second torsion bar 24 operates to absorb energy, it is possible to absorb energy that is smaller than the energy absorbed by the first torsion bar 21 in the drive mechanism non-operating state and that is larger than the energy absorbed only by the second torsion bar 24 at the second operation timing in the drive mechanism operating state; accordingly, the absorption of energy can be performed in three separate stages. Accordingly, control of the EA mechanism can be performed so as to match the occupant.

Figure 40:
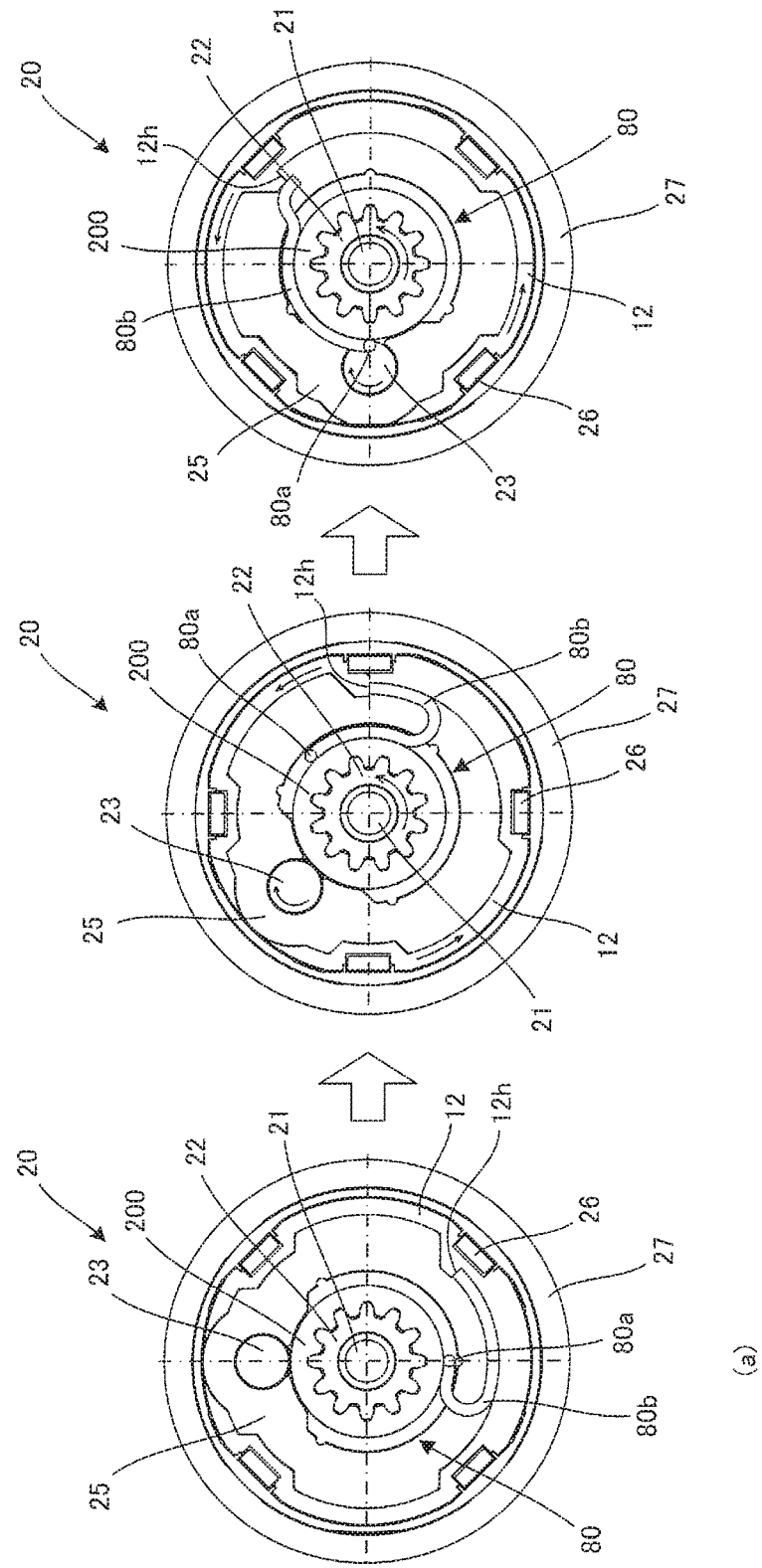
FIG. 40 illustrate cross-sectional views illustrating the elastic member while the pretensioner mechanism is in operation at the second operation timing of the EA mechanism of the seat belt retractor of the third embodiment.

FIG. 40 illustrate cross-sectional views illustrating the elastic member while the pretensioner mechanism is in operation at the second operation timing of the EA mechanism of the seat belt retractor of the third embodiment.

In the second operation timing of the seat belt retractor 3 of the third embodiment, before the pretensioner mechanism 50 is operated or at the same time as the pretensioner mechanism 50 is operated, when the load acquired by the seat weight sensor 71 is smaller than a predetermined value set in advance, the micro gas generator 32 is operated.

When the micro gas generator 32 is operated before the operation of the pretensioner mechanism 50, the release ring 27 becomes separated from the cover 28 and the release ring holder 26. Since the first torsion bar 21 is held by the locking base 61, the cover 28 is fixed together with the first torsion bar 21.

In the above state, when the spool 12 is retracted with the pretensioner mechanism 50, torsion occurs in the second torsion bar 24 since there is a difference between the retraction speed of the pretensioner mechanism 50 and the rotation speed of the spool 12; accordingly, the retraction load is reduced.

At the same time, a rotational difference occurs between the pinion 200 and the spool 12, and from the state in FIG. 40(*a*), as illustrated in FIG. 40(*b*), the bent position of the deforming portion 80*b* of the elastic member 80 moves. In other words, the deforming portion 80*b* of the elastic member 80 reduces the retraction load. Subsequently, when the spool 12 rotates further, as illustrated in FIG. 40(*c*), the other end of the deforming portion 80*b* becomes detached from the hooking portion 12*e* of the spool 12 and torsion solely occurs in the second torsion bar 24.

Accordingly, by operating the micro generator 32 before the pretensioner mechanism 50 is operated or at the same time as the pretensioner mechanism 50 is operated, it is possible to appropriately switch the retraction force of a single pretensioner mechanism 50 according to the difference in the weight of the occupant. In other words, the load when the spool 12 is retracted can be reduced.

Figure 41:
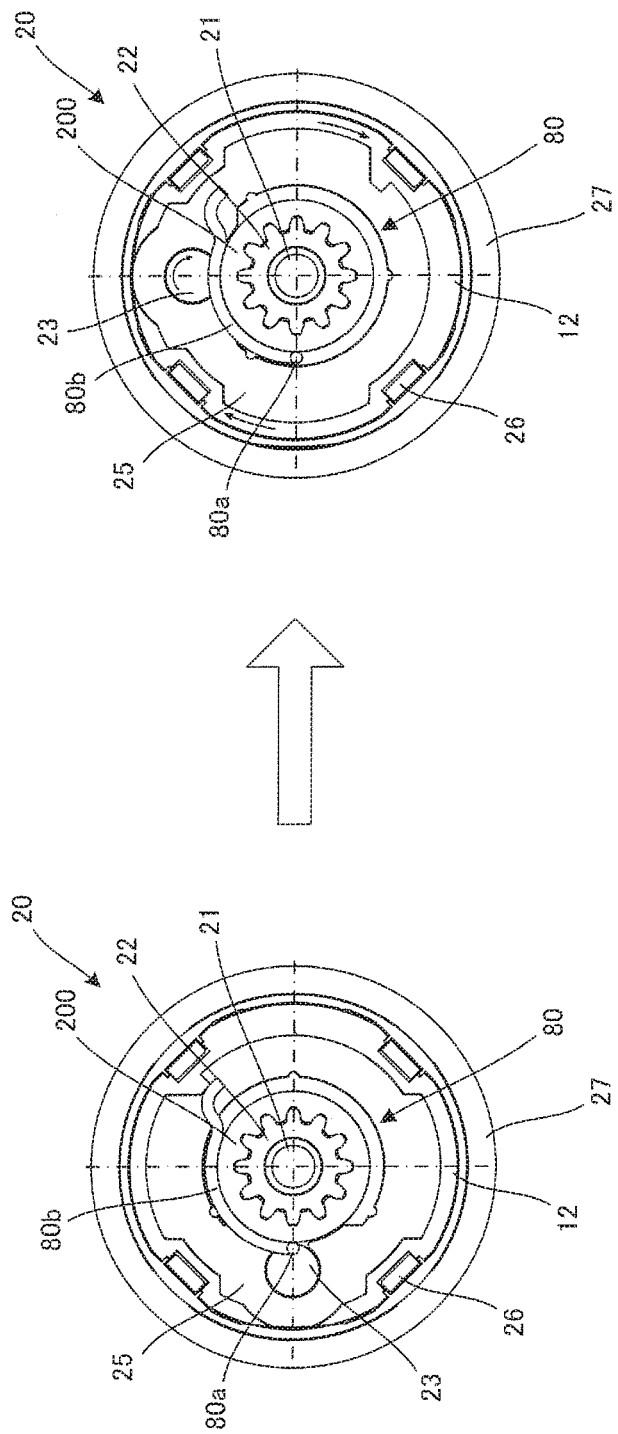
FIG. 41 illustrates cross-sectional views illustrating the elastic member after the pretensioner mechanism had been in operation at the second operation timing of the EA mechanism of the seat belt retractor of the third embodiment.

FIG. 41 illustrates cross-sectional views illustrating the elastic member after the pretensioner mechanism has been operated at the second operation timing of the EA mechanism of the seat belt retractor of the third embodiment.

After the operation of the pretensioner mechanism 50, the other end of the deforming portion 80*b* of the elastic member 80 is detached from the hooking portion 12*e* of the spool 12 and, from the state in FIG. 41(*a*), as illustrated in the state in FIG. 41(*b*), there will be no transmission of a load between the spool 12 and the pinion 200 such that relative rotation is allowed.

In other words, after the retraction of the seat belt 4 is completed with the pretensioner mechanism 50 of the seat belt retractor 3 of the third embodiment, the elastic member 80 does not absorb energy and only the second torsion bar 24 operates to absorb energy.

Figure 42:
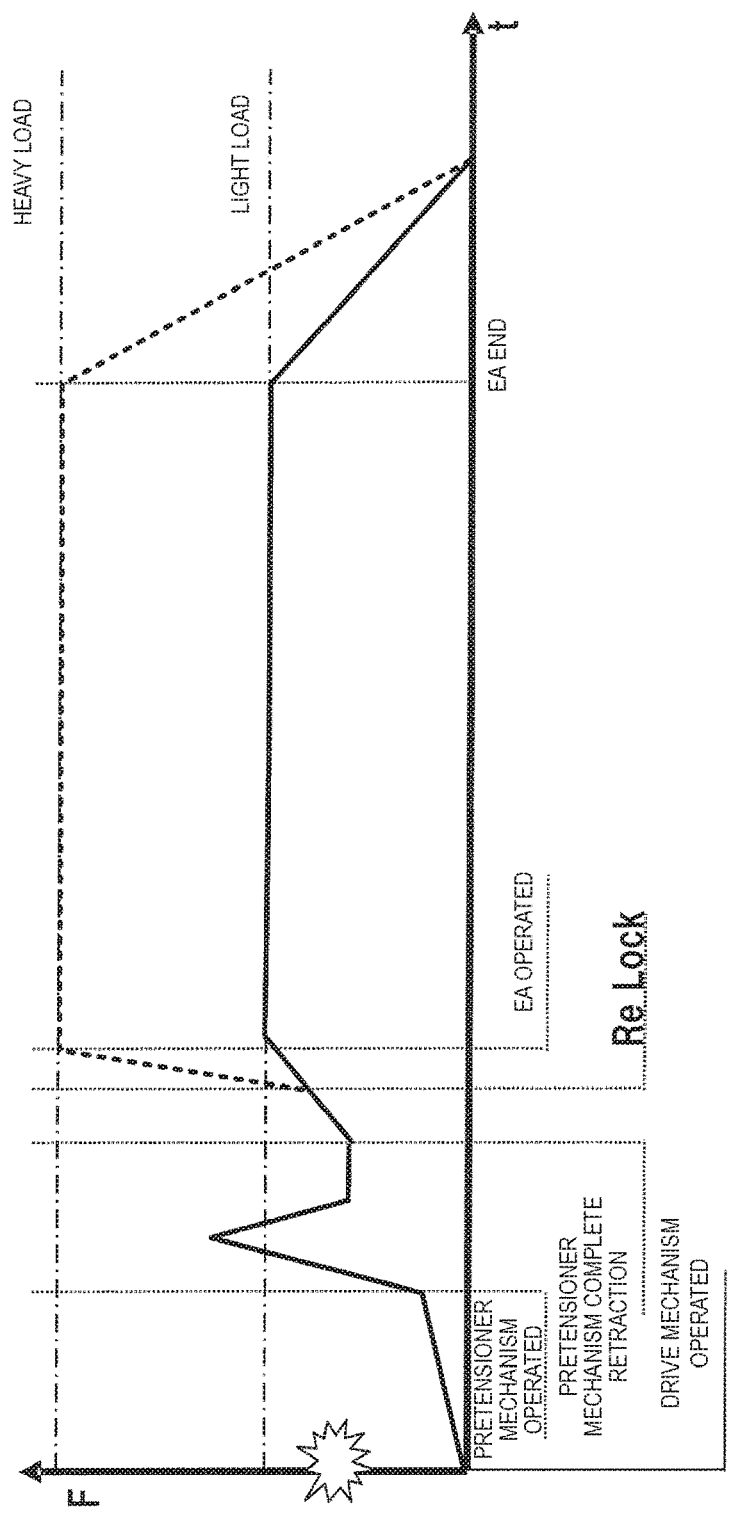
FIG. 42 illustrates the second operation timing of the seat belt retractor of the third embodiment.

FIG. 42 illustrates the second operation timing of the seat belt retractor of the third embodiment.

In the second operation timing, when a load acquired by the seat sheet weight sensor 71 and the like is smaller than a predetermined value set in advance, the seat belt retractor 3 of the third embodiment starts operating the pretensioner mechanism 50 after operating the micro gas generator 32 such that the seat belt 4 is retracted with the pretensioner mechanism 50.

Furthermore, when the micro gas generator 32 of the seat belt retractor of the third embodiment is operated at the second operation timing, then, since only the second torsion bar 24 operates to absorb energy, it is possible to absorb energy that is smaller than the energy absorbed by the first torsion bar 21 in the drive mechanism non-operating state and that is smaller than the energy absorbed by the second torsion bar 24 and the elastic member 80 at the first operation timing in the drive mechanism operating state; accordingly, the absorption of energy can be performed in three separate stages. Accordingly, control of the EA mechanism can be performed so as to match the occupant.

A control of the seat belt retractor of the third embodiment will be described next.

Figure 43:
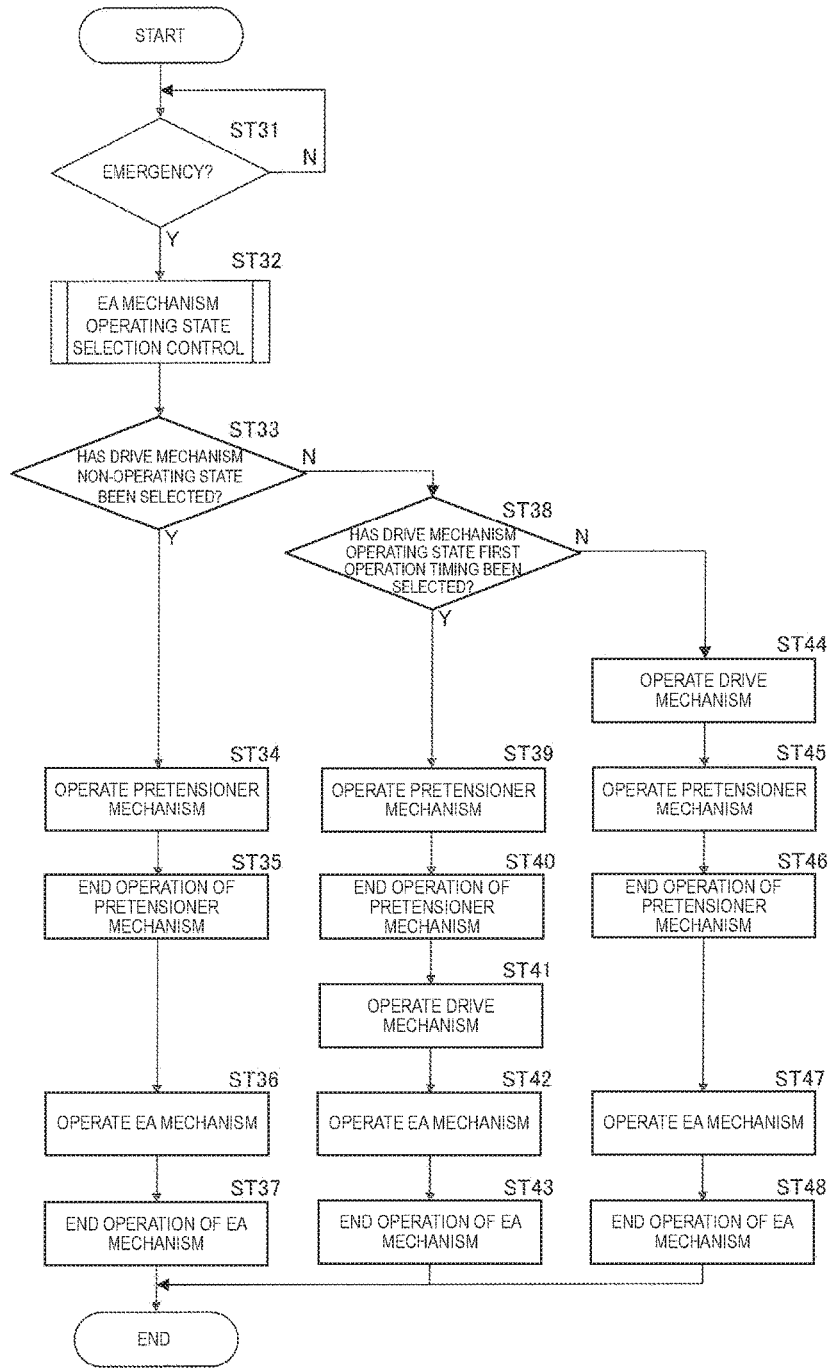
FIG. 43 is a diagram illustrating a control flow chart of the seat belt retractor of the third embodiment.
Figure 44:
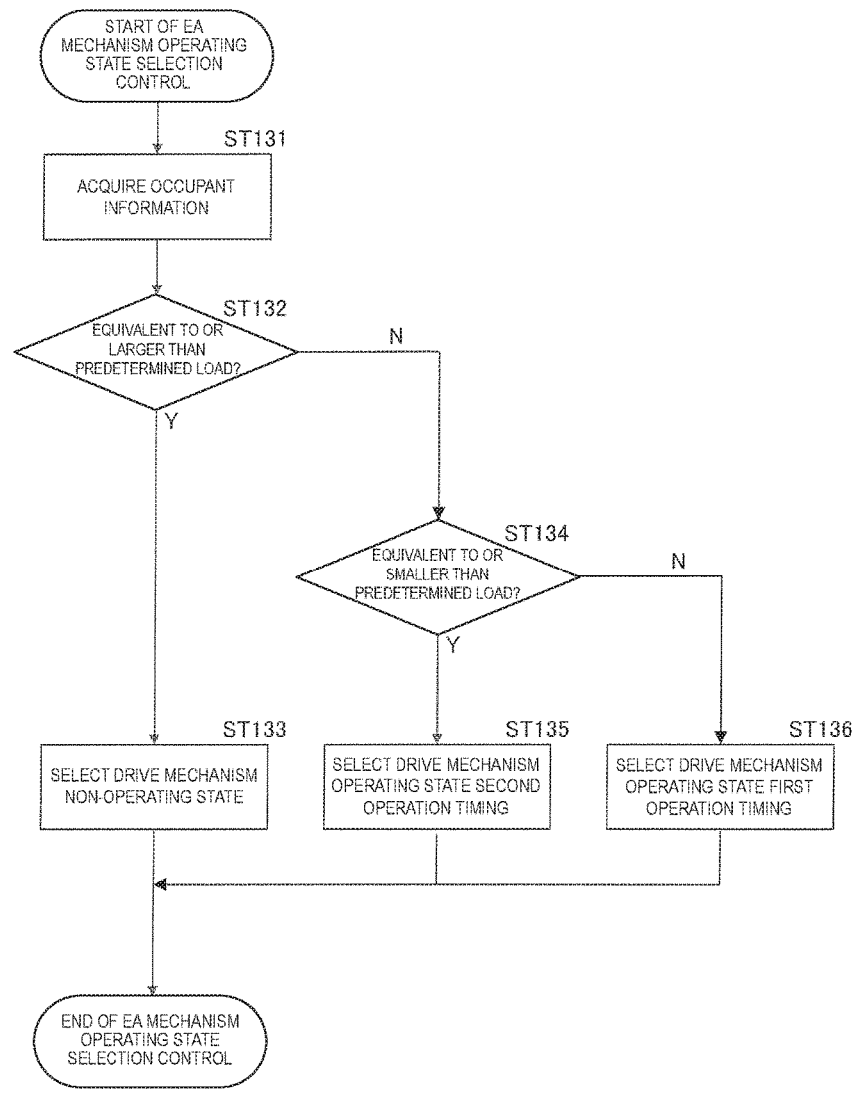
FIG. 44 is a diagram illustrating a control flow chart of the EA mechanism of the seat belt retractor of the third embodiment.

FIG. 43 is a diagram illustrating a control flow chart of the seat belt retractor of the third embodiment. FIG. 44 is a diagram illustrating a control flow chart of the EA mechanism of the seat belt retractor of the third embodiment.

First, in step 31, it is determined whether it is an emergency (ST31). Whether it is an emergency is determined by whether a rapid deceleration, due to a collision or the like, exceeding a predetermined amount that has been set in advance has been detected by the acceleration sensor 73. In step 31, when it is determined that it is not an emergency, the process returns to step 31.

In step 31, when it is determined that it is an emergency, in step 32, the EA mechanism operation state selection control is executed (ST32).

In the EA mechanism operating state selection control, first, in step 131, occupant information is acquired (ST131). The occupant information is acquired from each of the sensors and the like illustrated in FIG. 17.

Subsequently, in step 132, it is determined whether the occupant information acquired in step 131 is equivalent to or larger than a predetermined load set in advance (ST132). For example, it is determined whether a load acquired by the sheet weight sensor 71 is equivalent to or larger than a predetermined value set in advance or is smaller than the predetermined value.

In step 132, when the acquired occupant information is equivalent to or larger than a predetermined load set in advance, in step 133, the drive mechanism non-operating state in which the micro gas generator 32 is not operated is selected (ST133). In step 132, when it is determined that the condition is not satisfied, in step 134, it is determined whether the occupant information acquired in step 131 is equivalent to or smaller than a predetermined load set in advance (ST134).

In step 134, when the acquired occupant information is equivalent to or smaller than the predetermined load set in advance, in step 135, the drive mechanism operating state second operation timing in which the micro gas generator 32 is not operated is selected (ST135). In step 134, when the acquired occupant information is larger than the predetermined load set in advance, in step 136, the drive mechanism operating state first operation timing in which the micro gas generator 32 is not operated is selected (ST136). After performing the process of selecting the operation state of the EA mechanism, the EA mechanism operation state selection control is ended.

Subsequently, in step 33, it is determined whether the drive mechanism non-operating state has been selected in the EA mechanism operation state selection control in step 22 (ST33).

In step 33, when determined to be the drive mechanism non-operating state, in step 34, the pretensioner mechanism 50 is operated (ST34).

Subsequently, in step 35, the operation of the pretensioner mechanism 50 is ended (ST35).

Subsequently, in step 36, the EA mechanism 20 is operated (ST36).

Subsequently, in step 37, the operation of the EA mechanism 20 is ended (ST37) and the control is ended.

In step 33, when determined to be the drive mechanism operating state, in step 38, it is determined whether the drive mechanism operating state first operation timing has been selected (ST38).

In step 38, when determined that the drive mechanism operating state first operation timing has been selected, in step 39, the pretensioner mechanism 50 is operated (ST39).

Subsequently, in step 40, the operation of the pretensioner mechanism 50 is ended (ST40).

Subsequently, in step 41, the micro gas generator 32 serving as the drive mechanism is operated (ST41).

Subsequently, in step 42, the EA mechanism 20 is operated (ST42).

Subsequently, in step 43, the operation of the EA mechanism 20 is ended (ST43) and the control is ended.

In step 38, when determined that the drive mechanism operating state first operation timing has not been selected, in step 44, the micro gas generator 32 serving as the drive mechanism is operated (ST44).

Subsequently, in step 45, the pretensioner mechanism 50 is operated (ST45).

Subsequently, in step 46, the operation of the pretensioner mechanism 50 is ended (ST46).

Subsequently, in step 47, the EA mechanism 20 is operated (ST47).

Subsequently, in step 48, the operation of the EA mechanism 20 is ended (ST48) and the control is ended.

Other examples of the EA mechanism 20 will be described next.

Figure 45:
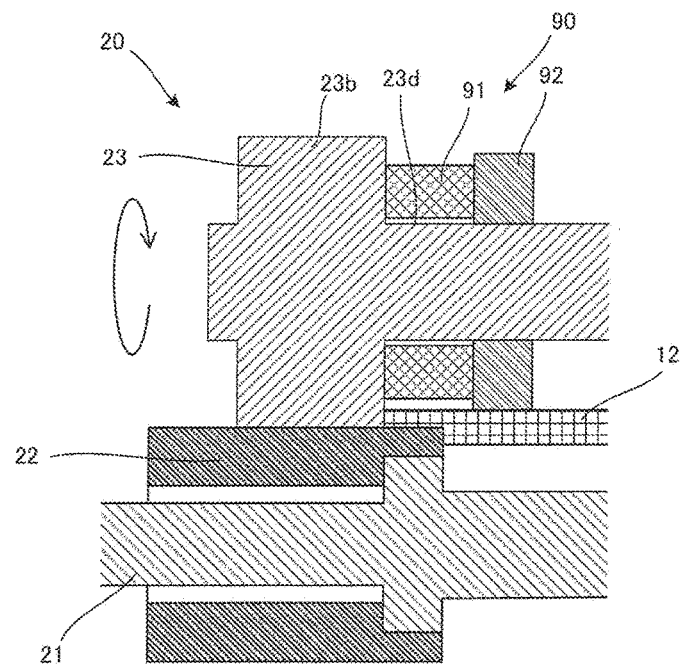
FIG. 45 illustrates an example of the EA mechanism employing a friction member.

FIG. 45 illustrates an example of the EA mechanism 20 employing a friction member 91.

The example of the EA mechanism 90 illustrated in FIG. 45 employs, in place of the second torsion bar, the friction member 91 serving as the second energy absorption member. Furthermore, in the second gear 23 of the present example, a screw portion 23d is formed on one side of the third engagement teeth 23b, which meshes with the first gear 22, in the axial direction. A nut 92 is fitted on the screw portion 23d. Furthermore, the friction member 91 is attached between the third engagement teeth 23b of the second gear 23 and the nut 92. Furthermore, the outer periphery of the nut 92 is attached so as not to move with respect to the spool 12.

In the EA mechanism 20 employing the friction member 91, in the drive mechanism operating state, when the spool 12 rotates, the second gear 23 rotates around the first gear 21. Accordingly, the second gear 23 and the screw portion 23d rotate about the shaft. However, although the nut 92 is rotating together with the spool 12, the nut 92 does not rotate about the second gear 23. Accordingly, while receiving frictional resistance of the friction member 91, the nut 92 is tightened into the screw portion 23d. In other words, while the frictional resistance acts as a force limiter load, a predetermined withdrawal of the seat belt 4 is permitted and energy is absorbed.

In other words, in the drive mechanism operating state in which the micro gas generator 32 of the seat belt retractor 3 of the present example operates, the frictional resistance acting between the friction member 91 and the nut 92 absorbs energy.

Figure 46:
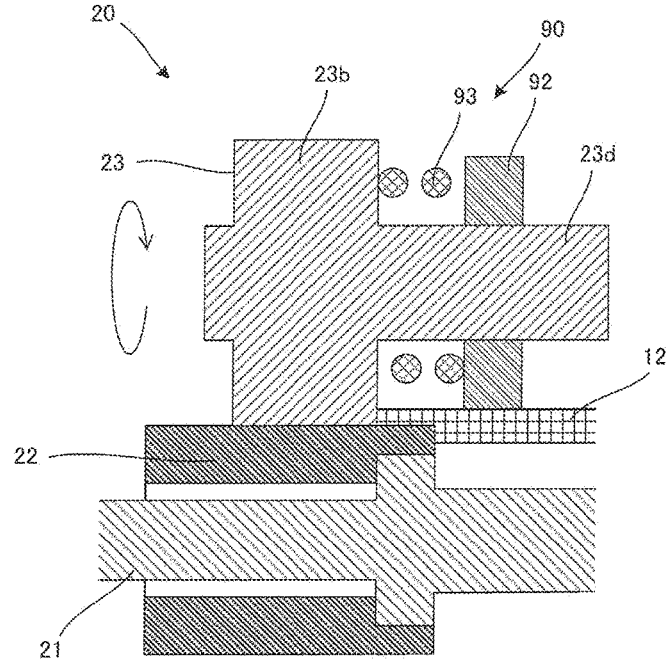
FIG. 46 illustrates an example of the EA mechanism employing an elastic member.

FIG. 46 illustrates an example of the EA mechanism 20 employing elastic members 93.

The example of the EA mechanism 90 illustrated in FIG. 46 employs, in place of the second torsion bar, the elastic members 93 serving as the second energy absorption member. Furthermore, in the second gear 23 of the present example, a screw portion 23d is formed on one side of the third engagement teeth 23b, which meshes with the first gear 22, in the axial direction. A nut 92 is fitted on the screw portion 23d. Furthermore, the elastic members 93 are each secured by the third engagement teeth 23b of the second gear 23 and the nut 92. Furthermore, the outer periphery of the nut 92 is attached so as not to move with respect to the spool 12. Note that each elastic member 93 is desirably a spring or the like.

In the EA mechanism 20 employing the elastic members 93, in the drive mechanism operating state, when the spool 12 rotates, the second gear 23 rotates around the first gear 21. Accordingly, the second gear 23 and the screw portion 23d rotate about the shaft. However, although the nut 92 is rotating together with the spool 12, the nut 92 does not rotate about the second gear 23. Accordingly, while receiving elastic force of the elastic members 93, the nut 92 is tightened into the screw portion 23d. In other words, while the elastic force acts as a force limiter load, a predetermined withdrawal of the seat belt 4 is permitted and energy is absorbed.

In other words, in the drive mechanism operating state in which the micro gas generator 32 of the seat belt retractor 3 of the present example operates, the action of the elastic force of each elastic member 93 absorbs energy.

Figure 47:
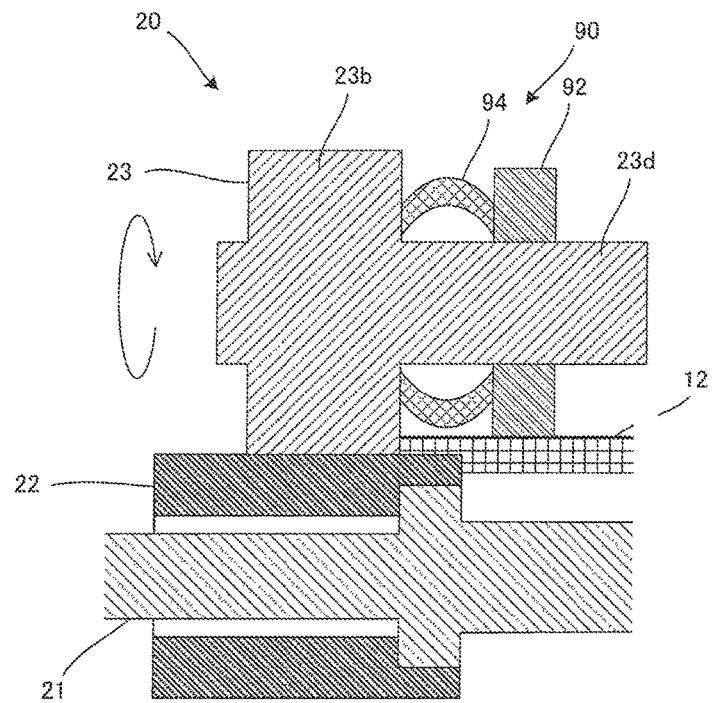
FIG. 47 illustrates an example of the EA mechanism employing a bended member.

FIG. 47 illustrates an example of the EA mechanism 20 employing a bended member 94.

The example of the EA mechanism 90 illustrated in FIG. 47 employs, in place of the second torsion bar, the bended member 94 serving as the second energy absorption member. Furthermore, in the second gear 23 of the present example, a screw portion 23d is formed on one side of the third engagement teeth 23b, which meshes with the first gear 22, in the axial direction. A nut 92 is fitted on the screw portion 23d. Furthermore, the bended member 94 is attached between the third engagement teeth 23b of the second gear 23 and the nut 92. Furthermore, the outer periphery of the nut 92 is attached so as not to move with respect to the spool 12.

In the EA mechanism 20 employing the bended member 94, in the drive mechanism operating state, when the spool 12 rotates, the second gear 23 rotates around the first gear 21. Accordingly, the second gear 23 and the screw portion 23d rotate about the shaft. However, although the nut 92 is rotating together with the spool 12, the nut 92 does not rotate about the second gear 23. Accordingly, while receiving bending force of the bended member 94, the nut 92 is tightened into the screw portion 23d. In other words, while the bending force acts as a force limiter load, a predetermined withdrawal of the seat belt 4 is permitted and energy is absorbed.

In other words, in the drive mechanism operating state in which the micro gas generator 32 of the seat belt retractor 3 of the present example operates, the action of the bending force of the bended member 94 absorbs energy.

Figure 48:
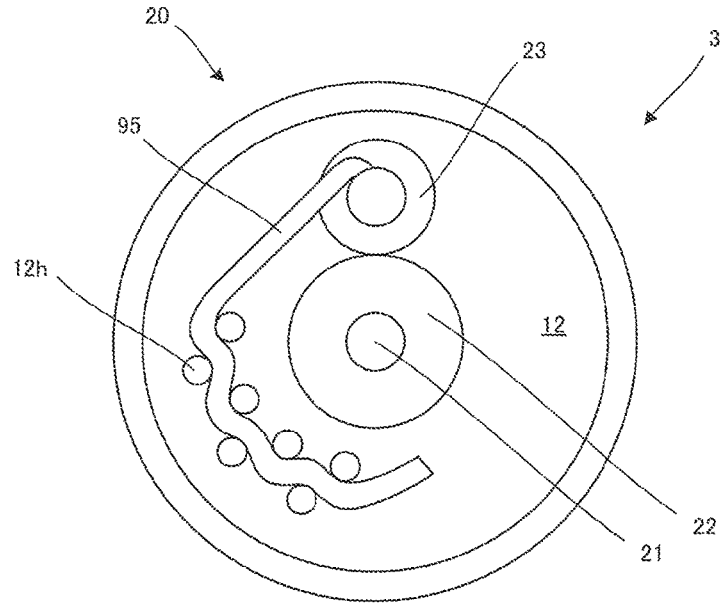
FIG. 48 illustrates an example of the EA mechanism employing a stroking pin.

FIG. 48 illustrates an example of the EA mechanism 20 employing a stroking pin 95.

The example of the EA mechanism 90 illustrated in FIG. 48 employs, in place of the second torsion bar 24, the stroking pin 95 serving as the second energy absorption member. Furthermore, a plurality of protruding pins 12h are formed in the spool 12 of the present example in a section that includes the first gear 22 and the second gear 23 and that is orthogonal to the axial direction. Note that the protruding pins may be formed using a member that is different from the spool 12. One end of the stroking pin 95 is secured to the second gear 23 and the other end side is installed so as to come in contact with the plurality of protruding pins 12h and pass therethrough in a zigzag manner.

In the EA mechanism 20 employing the stroking pin 95, in the drive mechanism operating state, when the spool 12 rotates, the second gear 23 rotates around the first gear 21.

Accordingly, the second gear 23 rotates about the shaft. Then, the one end of the stroking pin 95 is pulled by the second gear 23. Accordingly, the other end side of the stroking pin 95 is stroked by the protruding pins 12*h* and frictional force is created. In other words, while the frictional force acts as a force limiter load, a predetermined withdrawal of the seat belt 4 is permitted and energy is absorbed.

In other words, in the drive mechanism operating state in which the micro gas generator 32 of the seat belt retractor 3 of the present example operates, the frictional force acting between the stroking pin 95 and the protruding pins 12*h* absorbs energy.

Figure 49:
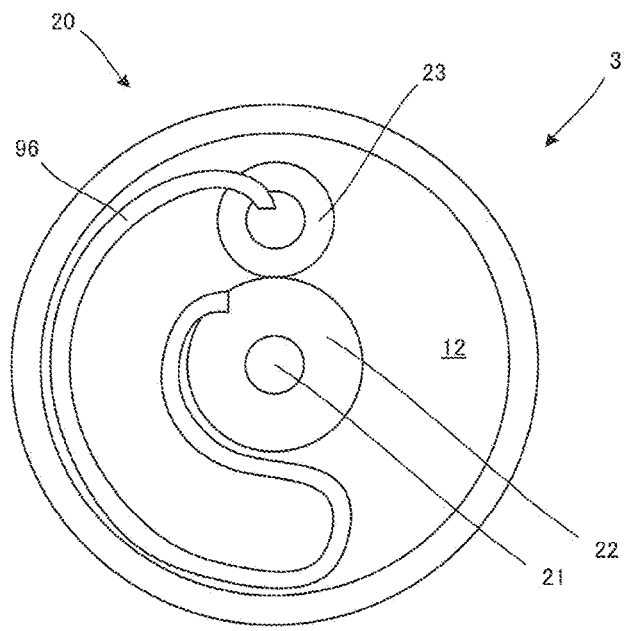
FIG. 49 illustrates an example of the EA mechanism employing an elastic pin.

FIG. 49 illustrates an example of the EA mechanism 20 employing an elastic pin 96.

The example of the EA mechanism 90 illustrated in FIG. 49 employs, in place of the second torsion bar 24, the elastic pin 96 serving as the second energy absorption member. One end of the elastic pin 96 is secured to the second gear 23 and the other end is secured to the first gear 22.

In the EA mechanism 20 employing the elastic pin 96, in the drive mechanism operating state, when the spool 12 rotates, the second gear 23 rotates around the first gear 21. Accordingly, the second gear 23 rotates about the shaft. Then, the one end of the elastic pin 96 is pulled by the second gear 23. However, since the other end of the elastic pin 96 that is secured to the first gear 22 does not rotate about the shaft, the elastic pin 96 becomes deflected creating elastic force. In other words, while the elastic force acts as a force limiter load, a predetermined withdrawal of the seat belt 4 is permitted and energy is absorbed.

In other words, in the drive mechanism operating state in which the micro gas generator 32 of the seat belt retractor 3 of the present example operates, the action of the elastic force of the elastic pin 96 absorbs energy.

Figure 50:
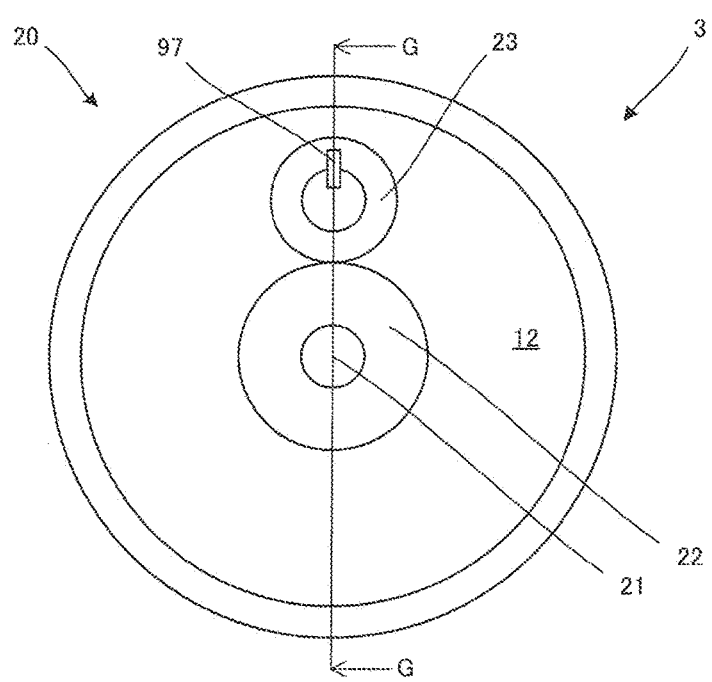
FIG. 50 illustrates an example of the EA mechanism employing a bended pin.
Figure 51:
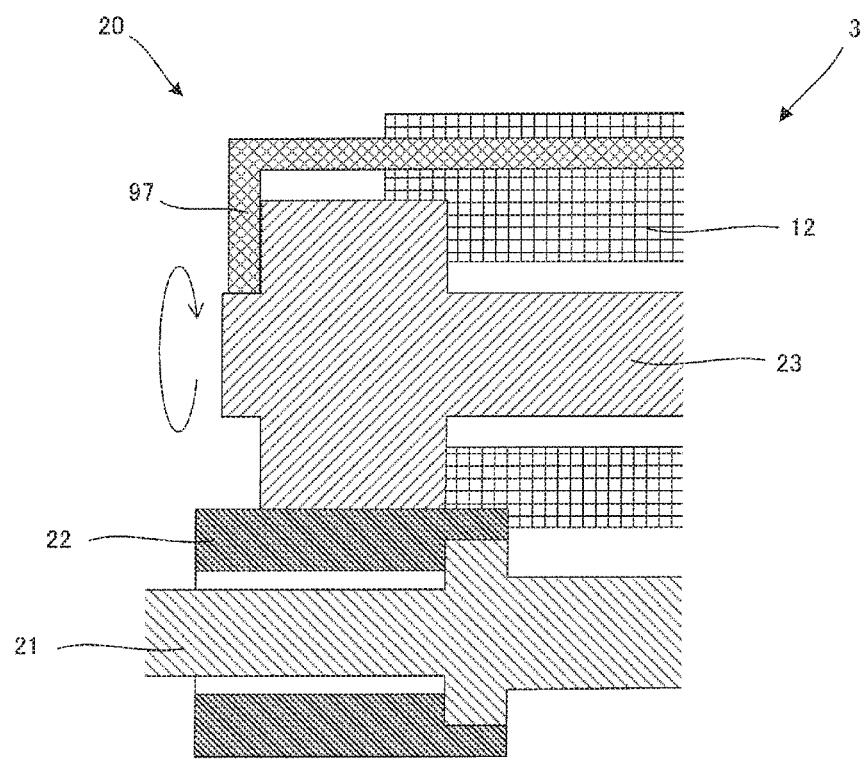
FIG. 51 is a cross-sectional view taken along line G-G in FIG. 50.

FIG. 50 illustrates an example of the EA mechanism 20 employing a bended pin 97. FIG. 51 is a cross-sectional view taken along line G-G in FIG. 50.

The example of the EA mechanism 90 illustrated in FIGS. 50 and 51 employs, in place of the second torsion bar, the bended pin 97 serving as the second energy absorption member. One end of the bended pin 97 is attached to the second gear 23, and the other end is attached to the spool 12. For example, in the present example, the bended pin 97 is inserted into a hole formed in the spool 12.

In the EA mechanism 20 employing the bended pin 97, in the drive mechanism operating state, when the spool 12 rotates, the second gear 23 rotates around the first gear 21. However, although the bended pin 97 is rotating together with the spool 12, the bended pin 97 does not rotate about the second gear 23. Accordingly, the second gear 23 rotates while receiving the bending force of the bended pin 97. In other words, while the bending force acts as a force limiter load, a predetermined withdrawal of the seat belt 4 is permitted and energy is absorbed.

A fourth embodiment will be described next.

Figure 52:
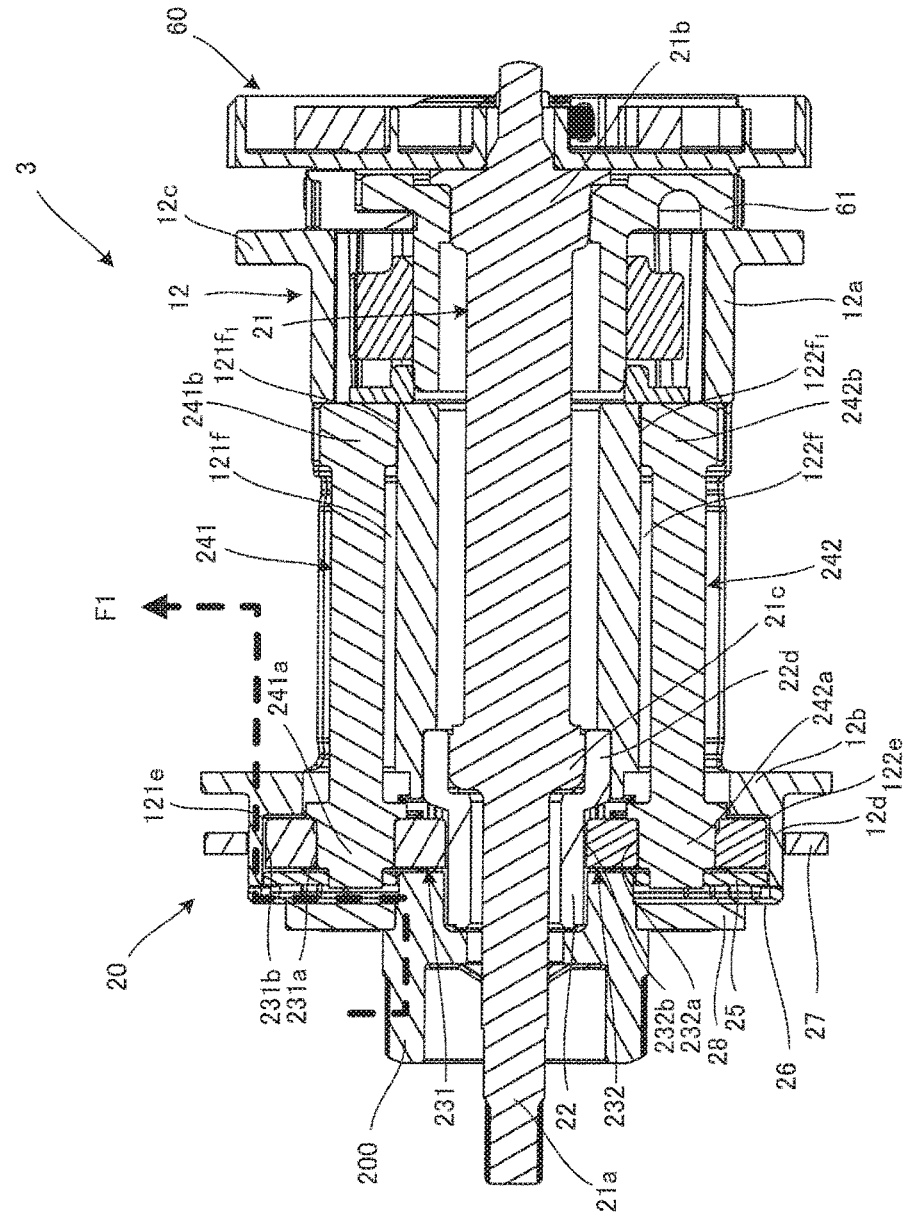
FIG. 52 is a cross-sectional view illustrating transmission of torque of a pretensioner mechanism when an EA mechanism of a seat belt retractor of a fourth embodiment is in the drive mechanism non-operating state.

FIG. 52 is a cross-sectional view illustrating transmission of torque of the pretensioner mechanism when the EA mechanism of the seat belt retractor of the fourth embodiment is in the drive mechanism non-operating state.

As illustrated in FIG. 52, the seat belt retractor 3 of the fourth embodiment increases the number of the second torsion bar 24 of the second embodiment to two and is structured so as to be provided with a second torsion bar 241 serving as a second energy absorption member and a third torsion bar 242, serving as a third energy absorption member, provided in a parallel relationship with a second torsion bar 241. Furthermore, corresponding to the above, the seat belt retractor 3 of the fourth embodiment is structured so as to be provided with a second gear 231 serving as a second energy transmission member and a third gear 232 serving as a third energy transmission member. Note that the structure other than the above is substantially the same as that of the second embodiment, and description thereof is omitted.

In the second gear 231, a hole portion 231*a* in which the second torsion bar 241 is inserted is formed. Third engagement teeth 231*b* are formed on the outer periphery of the second gear 231. The second gear 231 is attached on one end 241*a* side of the second torsion bar 241 so as to rotate in an integral manner with the second torsion bar 241. The second gear 231 is installed inside a portion of a first hole portion 121*e* formed in the holding portion 12*d* of the spool 12 so that the third engagement teeth 231*b* mesh with the first gear 22.

The one end 241*a* of the second torsion bar 241 is inserted into the hole portion 231*a* of the second gear 231 so as to integrally rotate therewith. Other end 241*b* of the second torsion bar 241 engages with a first engagement portion 121*f*1 formed in a spline shape in the first groove portion 121*f*.

In the third gear 232, a hole portion 232*a* in which the third torsion bar 242 is inserted is formed. Fourth engagement teeth 232*b* are formed on the outer periphery of the third gear 232. The third gear 232 is attached on one end 242*a* side of the third torsion bar 242 so as to rotate in an integral manner with the third torsion bar 242. The third gear 232 is installed inside a portion of a second hole portion 122*e* formed in the holding portion 12*d* of the spool 12 so that the fourth engagement teeth 232*b* mesh with the first gear 22.

The one end 242*a* of the third torsion bar 242 is inserted into the hole portion 232*a* of the third gear 232 so as to integrally rotate therewith. Other end 242*b* of the third torsion bar 242 engages with a second engagement portion 122*f*1 formed in a spline shape in the second groove portion 122*f*.

An operation of the seat belt retractor 3 of the fourth embodiment will be described next.

In the seat belt retractor 3 of the fourth embodiment, first, when the deceleration detection means 40 illustrated in FIG. 25 detects a rapid deceleration of the vehicle, which occurs when in an emergency, the operation of the pretensioner mechanism 50 and that of the lock mechanism 60 are started.

In a state in which the pretensioner mechanism 50 is operated, the pinion 200, the cover 28, the release ring 27, and the spool 12 rotate in an integral manner and torque F1 generated when retracting with the pretensioner mechanism 50 acts on the seat belt 4 (not shown). Accordingly, since the spool 12 can be rotated without through the first torsion bar 21, the second torsion bar 241, and the third torsion bar 242, no torsion will occur in the first torsion bar 21, the second torsion bar 241, and the third torsion bar 242, and the load can be transmitted in a swift and appropriate manner.

Then, the EA mechanism 20 is operated. Note that the EA mechanism 20 of the fourth embodiment is operated in two ways, namely, the drive mechanism non-operating state and the drive mechanism operating state.

Figure 53:
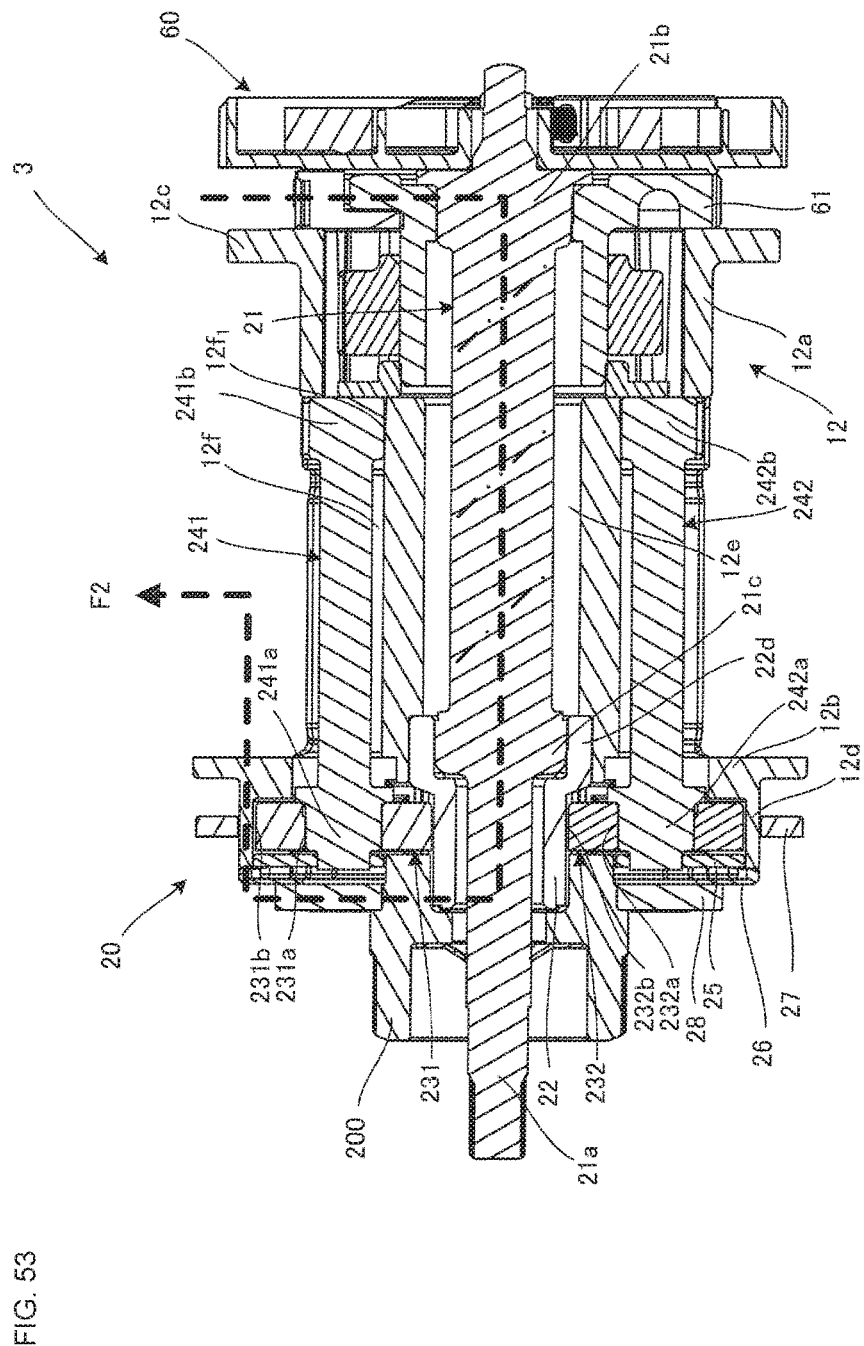
FIG. 53 is a cross-sectional view illustrating transmission of a load when the EA mechanism of the seat belt retractor of the fourth embodiment is in the drive mechanism non-operating state.

FIG. 53 is a cross-sectional view illustrating transmission of a load when the EA mechanism of the seat belt retractor of the fourth embodiment is in the drive mechanism non-operating state. Note that in the drawing, the two-dot chain line schematically illustrates the torsion state.

After the pretensioner mechanism 50 is operated and the spool 12 is rotated in the retracting direction, by inertia of the occupant, the spool 12 rotates in the belt withdrawing direction.

In the drive mechanism non-operating state, the release ring 27 is meshed with the cover 28 and is in the first position. Accordingly, when the spool 12 rotates, the load F2 is transmitted in a sequential manner to the release ring 27, the cover 28, the pinion 200, the first gear 22, and the first torsion bar 21.

However, since the first torsion bar 21 is held by the locking base 61, the first torsion bar 21 cannot rotate. Accordingly, torsion occurs in the first torsion bar 21. In other words, under the action of the force limiter load, the first torsion bar 21 absorbs energy.

Figure 54:
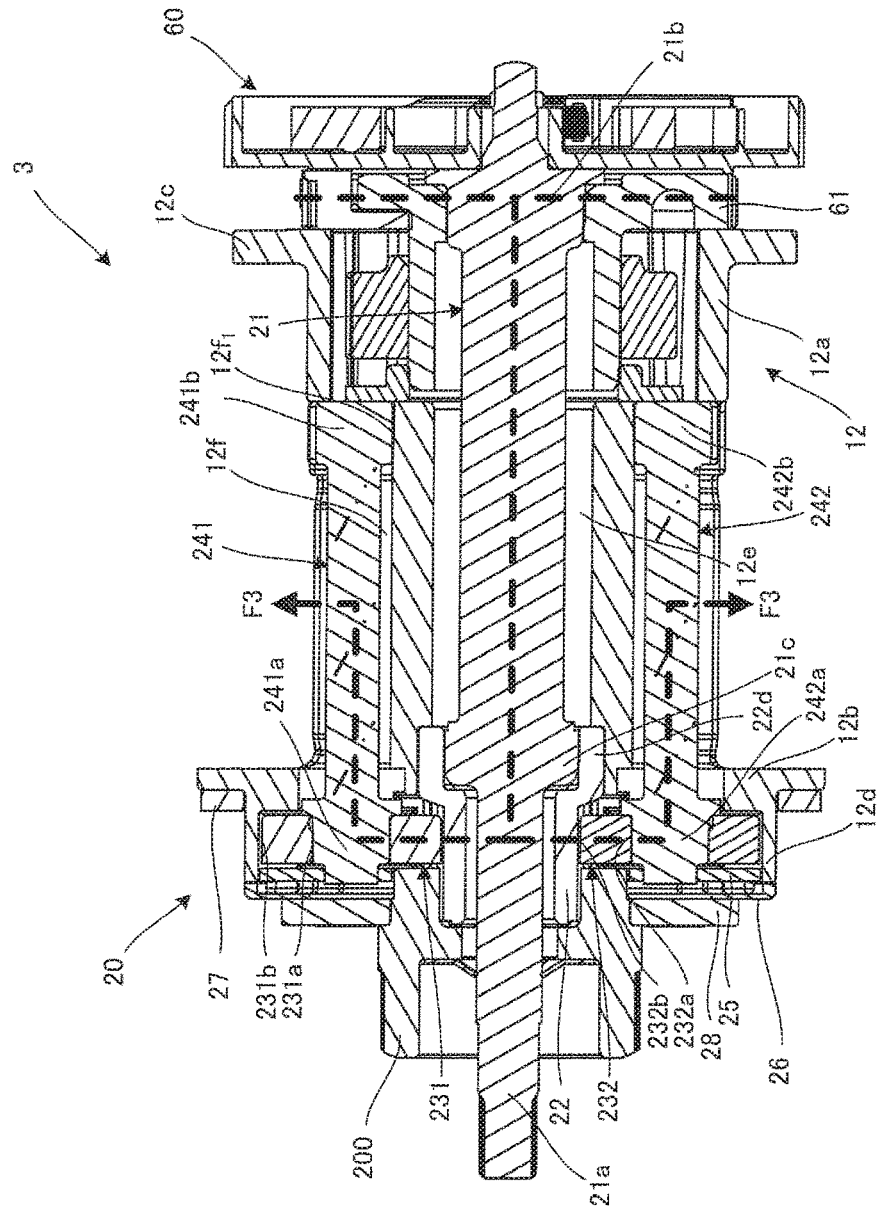
FIG. 54 is a cross-sectional view illustrating transmission of a load when the EA mechanism of the seat belt retractor of the fourth embodiment is in the drive mechanism operating state.

FIG. 54 is a cross-sectional view illustrating transmission of a load when the EA mechanism of the seat belt retractor of the fourth embodiment is in the drive mechanism operating state.

In the drive mechanism operating state, the micro gas generator 32 illustrated in FIG. 25 is operated and the release ring 27 is separated from the cover 28 and the release ring holder 26. Since the first torsion bar 21 is held by the locking base 61, the cover 28, the pinion 200, and the first gear 22 are fixed together with the first torsion bar 21.

In the above state, when the spool 12 rotates, while the second gear 231 and the third gear 232 rotate around the first gear 21, the second torsion bar 241 and the third torsion bar 242 themselves do not rotate; accordingly, torsion occurs in the second torsion bar 241 and the third torsion bar 242. In other words, under the action of the force limiter load F3, the second torsion bar 241 and the third torsion bar 242 absorb energy.

In other words, in the drive mechanism operating state in which the micro gas generator 32 of the seat belt retractor 3 of the fourth embodiment is operated, the second torsion bar 241 and the third torsion bar 242 operate to absorb energy.

In the seat belt retractor 3 of the fourth embodiment, similar to the second embodiment illustrated in FIG. 32, after the pretensioner mechanism 50 has started to operate and the retraction of the seat belt 4 with the pretensioner mechanism 50 has been completed, when the load acquired by the seat weight sensor 71 is smaller than a predetermined value set in advance, the micro gas generator 32 may be operated. Note that the timings may be similar to those of the operation of the pretensioner mechanism and the operation of the EA mechanism of the seat belt retractor of the first embodiment illustrated in FIG. 18.

As described above, after the operation of the pretensioner mechanism 50 has ended, by operating the drive mechanism 35, the performance of retracting the seat belt 4 with the pretensioner mechanism 50 can be maintained.

Furthermore, the timings of the seat belt retractor 3 of the fourth embodiment may be similar to those of the operation of the pretensioner mechanism and the operation of the EA mechanism of the seat belt retractor of the second embodiment illustrated in FIG. 33.

Transmission of the load in the above case will be described.

Figure 55:
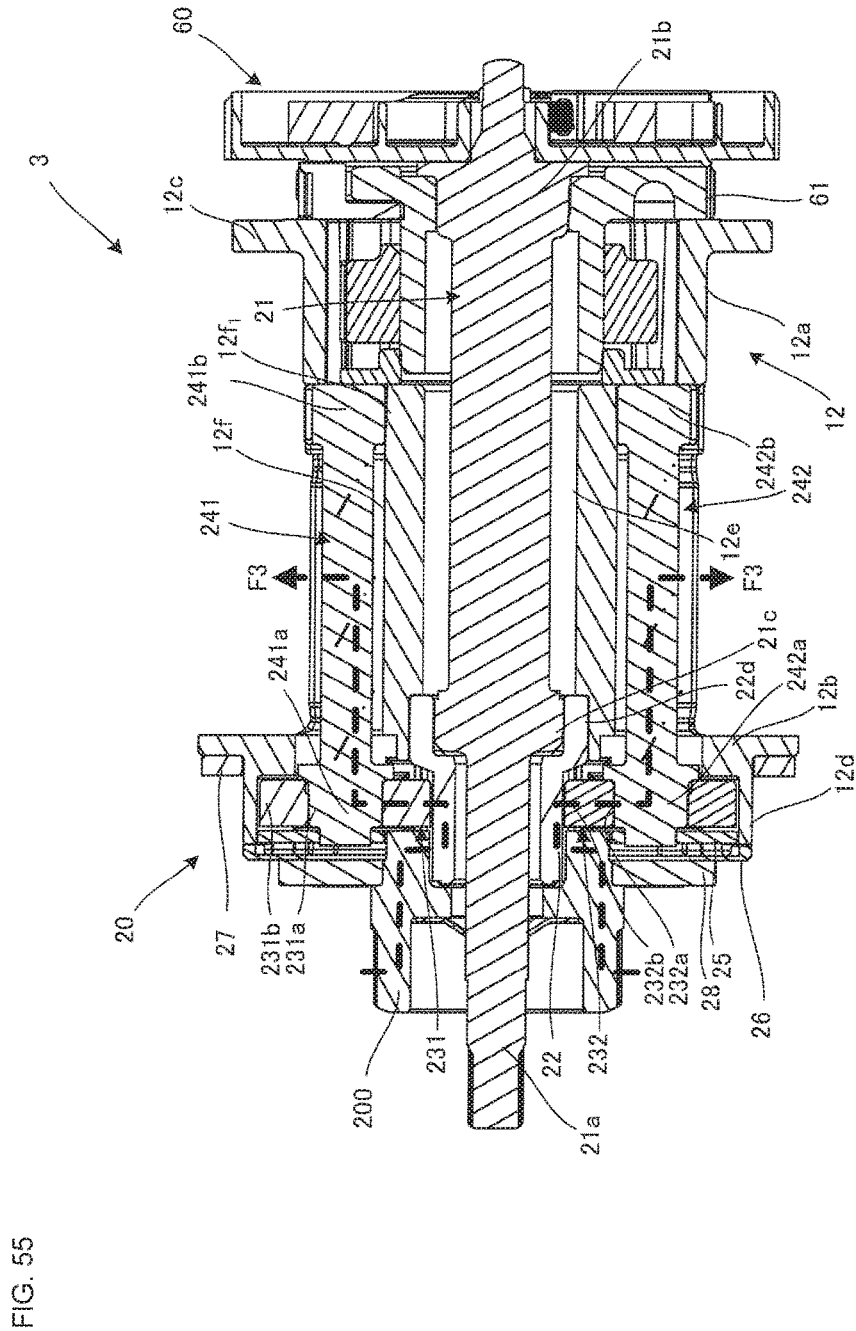
FIG. 55 is a cross-sectional view illustrating transmission of torque of the pretensioner mechanism when the EA mechanism of the seat belt retractor of the fourth embodiment is in the drive mechanism operating state.

FIG. 55 is a cross-sectional view illustrating transmission of torque of the pretensioner mechanism when the EA mechanism of the seat belt retractor of the fourth embodiment is in the drive mechanism operating state. Note that in the drawing, the two-dot chain line schematically illustrates the torsion state.

When the micro gas generator 32 is operated before the operation of the pretensioner mechanism 50, the release ring 27 becomes separated from the cover 28 and the release ring holder 26. Since the first torsion bar 21 is held by the locking base 61, the cover 28 is fixed together with the first torsion bar 21.

In the above state, the torque of the pretensioner mechanism 50 is transmitted to the spool 12 from the pinion 200 and the first gear 22 through the second gear 231, the second torsion bar 241, the third gear 232, and the third torsion bar 242. However, since the torque of the pretensioner mechanism 50 is larger than the torsion force of the second torsion bar 241 and the third torsion bar 242, torsion occurs in the second torsion bar 241 and the third torsion bar 242. In other words, the load when the spool 12 is retracted can be reduced.

The timing of the operation of the drive mechanism, the timing of the operation of the pretensioner mechanism, and the timing of the operation of the EA mechanism of the seat belt retractor of the fourth embodiment are the same as those of the second embodiment illustrated in FIG. 35.

In the seat belt retractor 3 of the fourth embodiment, before the pretensioner mechanism 50 is operated or at the same time as the pretensioner mechanism 50 is operated, when the load acquired by the seat weight sensor 71 is smaller than a predetermined value set in advance, the micro gas generator 32 is operated.

By operating the micro generator 32 before the pretensioner mechanism 50 is operated or at the same time as the pretensioner mechanism 50 is operated, it is possible to appropriately switch the torque of a single pretensioner mechanism 50 according to the difference in the weight of the occupant.

For example, in a case of an occupant having a light load, torque of the pretensioner mechanism 50 may be reduced by operating the micro generator 32 and creating torsion in the second torsion bar 241 and the third torsion bar 242; accordingly, torque of the pretensioner mechanism 50 may be set so as to match an occupant having a high load while obtaining sufficient retraction performance.

As described above, since the seat belt retractor 3 of the present embodiment includes the frame 11, the seat belt 4, the spool 12 that is rotatably supported by the frame 11 and that retracts the seat belt, the lock mechanism 60 that allows rotation of the spool 12 while not in operation and that prevents rotation of the spool 12 in the seat belt withdrawing direction while in operation, and the energy absorption mechanism 20 that restricts the load acting on the seat belt 4 and that absorbs energy of an occupant, and since the energy absorption mechanism 20 includes the first energy absorption member 21 that absorbs energy through the rotational difference between the spool 12 and the lock mechanism 60, the first energy transmission member 22 that is attached on one end side of the first energy absorption member 21, the second energy transmission member 23 that meshes with the first energy transmission member 22, and the second energy absorption member 24 that absorbs energy through the rotational difference between the second energy transmission member 23 and the spool 12, when absorbing energy by restricting the load acting on the seat belt 4, a further stable load can be generated.

Furthermore, in the seat belt retractor 3 of the present embodiment, since the energy absorption mechanism 20 includes the third energy absorption mechanism 80 that absorbs energy through the rotational difference between the second energy transmission member 23 and the spool 12, the absorption of energy can be performed in three separate stages and control of the EA mechanism matching the occupant can be performed.

Furthermore, in the seat belt retractor 3 of the present embodiment, since the energy absorption mechanism 20 includes the third energy transmission member 232 that meshes with the first energy transmission member 21, and the third energy absorption member 242 that is in a parallel relationship with the second energy transmission member 231 and that absorbs energy through the rotational difference between the third energy transmission member 232 and the spool 12, control of the EA mechanism matching the occupant can be performed.

Furthermore, in the seat belt retractor 3 of the present embodiment, the energy absorption mechanism 20 includes the release ring 27 that integrally rotates with the spool 12 and that moves, with respect to the spool 12, to the first position and the second position that is different from the first position, and the cover member 28 that transmits rotation of the release ring 27 to the first energy transmission member 22 when the release ring 27 is in the first position and that becomes separated from the release ring 27 when the release ring 27 is in the second position, the stages of the energy absorption can be appropriately switched.

Furthermore, in the seat belt retractor 3 of the present embodiment, since the energy absorption mechanism 20 includes the release ring holder 26 that holds the release ring 27 when the release ring 27 is in the first position, the release ring 27 can be held appropriately.

Furthermore, since the seat belt retractor 3 of the present embodiment includes the drive mechanism 35 that moves the release ring 27, the release ring 27 can be moved appropriately.

Furthermore, in the seat belt retractor of the present embodiment, since the drive mechanism 35 includes the micro gas generator 32, the lever ring 31 that is driven by the micro gas generator 32 and that moves the release ring 27 to the first position and the second position, and the housing 30 that movably supports the lever ring 31 and in which the micro gas generator 32 is installed, by driving the lever ring 31 and moving the release ring 27 with the drive mechanism 35 installed in the rigid housing 30, each member interact with each other and a further appropriate operation can be performed.

Furthermore, in the seat belt retractor of the present embodiment, since the housing 30 includes the cam portions $30c_{10}$ against which the lever ring 31 is capable of abutting, and the lever ring 31 is separated from the cam portions $30c_{10}$ before the micro gas generator 32 is operated and the lever ring 31 abuts against the cam portions $30c_{10}$ when the micro gas generator 32 is operated, by moving the release ring 27 through abutment between the lever ring 31 and the cam portions $30c_{10}$, a further appropriate operation can be performed.

Furthermore, since the seat belt retractor 3 of the present embodiment includes the occupant information acquisition unit 70 that acquires occupant information, and the controller 77 that determines whether the occupant information acquired by the occupant information acquisition unit 70 satisfies a condition set in advance and that operates the drive mechanism 35 according to a determination result, control matching the occupant can be performed and a further appropriate operation can be performed.

Furthermore, since the seat belt retractor 3 of the present embodiment includes the pretensioner mechanism 50 that rotates the spool 12 in the retracting direction of the seat belt 4 when in an emergency, the seat belt 4 can be retracted in a swift manner in an emergency.

Furthermore, in the seat belt retractor 3 of the present embodiment, since the controller 77 operates the drive mechanism 35 according to the determination result, after the pretensioner mechanism 50 has completed retracting the seat belt 4, the seat belt 4 can be appropriately retracted in an emergency.

Furthermore, in the seat belt retractor 3 of the present embodiment, since the controller 77 operates the drive mechanism 35 according to the determination result, before or at the same time as the pretensioner mechanism 50 starts the retraction of the seat belt 4, the load when retracting the seat belt can be reduced with the pretensioner mechanism 50.

Furthermore, since the seat belt retractor 3 of the present embodiment includes the frame 11, the seat belt 4, the spool 12 that is rotatably supported by the frame 11 and that retracts the seat belt 4, the lock mechanism 60 that allows rotation of the spool 12 while not in operation and that prevents rotation of the spool 12 in the seat belt withdrawing direction while in operation, the energy absorption mechanism 20 that restricts a load acting on the seat belt 4 and that absorbs energy of the occupant, the drive mechanism 35 that switches energy absorbed by the energy absorption mechanism 20, the pretensioner mechanism 50 that rotates the spool 12 in the retracting direction of the seat belt 4 when in an emergency, the occupant information acquisition unit 70 that acquires occupant information, and the controller 77 that determines whether the occupant information acquired by the occupant information acquisition unit 70 satisfies a condition set in advance and that operates the drive mechanism 35 according to a determination result and since the controller 77 operates the drive mechanism 35 according to the determination result, after the pretensioner mechanism 50 has completed retracting the seat belt 4, the seat belt 4 can be appropriately retracted in an emergency.

Furthermore, since the seat belt retractor 3 of the present embodiment includes the frame 11, the seat belt 4, the spool 12 that is rotatably supported by the frame 11 and that retracts the seat belt 4, the lock mechanism 60 that allows rotation of the spool 12 while not in operation and that prevents rotation of the spool 12 in the seat belt withdrawing direction while in operation, the energy absorption mechanism 20 that restricts a load acting on the seat belt 4 and that absorbs energy of the occupant, the drive mechanism 35 that switches energy absorbed by the energy absorption mechanism 20, the pretensioner mechanism 50 that rotates the spool 12 in the retracting direction of the seat belt 4 when in an emergency, the occupant information acquisition unit 70 that acquires occupant information, and the controller 77 that determines whether the occupant information acquired by the occupant information acquisition unit 70 satisfies a condition set in advance and that operates the drive mechanism 35 according to a determination result and since the controller 77 operates the drive mechanism 35 according to the determination result, before or at the same time as the pretensioner mechanism 50 starts retraction of the seat belt 4, the load when retracting the seat belt 4 with the pretensioner mechanism 50 cam be reduced.

Furthermore, in the seat belt apparatus 1 of the present embodiment including at least a seat belt 4 that restricts an occupant, a seat belt retractor 3 that retracts the seat belt 4 while allowing the seat belt 4 to be withdrawn, the seat belt retractor 3 operating in an emergency so as to stop withdrawal of the seat belt 4, a tongue 4a that is slidably supported by the seat belt 4 that has been withdrawn from the seat belt retractor 3, and a buckle 7 that is provided in the vehicle body or the vehicle seat 2, the tongue 4a being locked to the buckle 7 so as to be capable of being engaged and disengaged, since a seat belt retractor 3 of the above is used as the seat belt retractor 3, when absorbing energy by restricting the load acting on the seat belt 4, a further stable load can be generated and the seat belt retractor 3 can be made compact such that the degree of freedom of the disposition of each component of the seat belt apparatus 1 can be increased further.

INDUSTRIAL APPLICABILITY

The seat belt retractor of the present invention can be suitably applied to a seat belt retractor that is employed in a seat belt apparatus installed in a vehicle, such as an automobile, and that restricts the load acting on the seat belt and absorbs the energy of the occupant while preventing withdrawal of the seat belt in an emergency, such as at a time of collision.

REFERENCE SIGNS LIST

1 seat belt apparatus
2 vehicle seat
3 seat belt retractor
4 seat belt
5 guide anchor
6 tongue
7 buckle
11 frame
12 spool
13 spring portion
20 EA mechanism (energy absorption mechanism)
21 first torsion bar (first energy absorption member)
22 first gear (first energy transmission member)
23 second gear (second energy transmission member)
231 second gear (second energy transmission member)
232 third gear (third energy transmission member)
24 second torsion bar (second energy absorption member)
241 second torsion bar (second energy absorption member)
242 third torsion bar (third energy absorption member)
25 tie plate
26 release ring holder (moving member holder)
27 release ring (moving member)
28 cover (cover member)
29 push nut
30 housing
31 lever ring (press member)
32 micro gas generator (drive mechanism)
33 O-ring
34 piston
35 drive mechanism
40 deceleration detection means
50 pretensioner mechanism
60 lock mechanism
77 controller
91 friction member
93 elastic member
94 bended member
95 stroking pin
96 elastic pin
97 bended pin
200 pinion

The invention claimed is:
1. A seat belt retractor comprising:
a frame;
a seat belt;
a spool that is rotatably supported by the frame and that retracts the seat belt;
a lock mechanism that allows rotation of the spool while not in operation and that prevents rotation of the spool in a seat belt withdrawing direction while in operation; and
an energy absorption mechanism that restricts a load acting on the seat belt and that absorbs energy of an occupant, wherein
the energy absorption mechanism includes
a first energy absorption member that absorbs energy through a rotational difference between the spool and the lock mechanism,
a first energy transmission member that is attached on one end side of the first energy absorption member,
a second energy transmission member that meshes with the first energy transmission member, and
a second energy absorption member that absorbs energy through a rotational difference between the second energy transmission member and the spool.

2. The seat belt retractor according to claim 1, wherein the energy absorption mechanism includes
a third energy absorption member that absorbs energy through a rotational difference between the second energy transmission member and the spool.

3. The seat belt retractor according to claim 1, wherein the energy absorption mechanism includes
a third energy transmission member that meshes with the first energy transmission member, and
a third energy absorption member that is in a parallel relationship with the second energy transmission member and that absorbs energy through a rotational difference between the third energy transmission member and the spool.

4. The seat belt retractor according to claim 1, wherein the energy absorption mechanism includes
a moving member that integrally rotates with the spool and that moves, with respect to the spool, to a first position and a second position that is different from the first position, and
a cover member that transmits rotation of the moving member to the first energy transmission member when the moving member is in the first position and that becomes separated from the moving member when the moving member is in the second position.

5. The seat belt retractor according to claim 4, wherein the energy absorption mechanism includes a moving member holder that holds the moving member when the moving member is in the first position.

6. The seat belt retractor according to claim 4, further comprising a drive mechanism that moves the moving member.

7. The seat belt retractor according to claim 6, wherein the drive mechanism includes
a drive member,
a press member that is driven by the drive member and that moves the moving member to the first position and the second position, and
a housing that movably supports the press member and in which the drive member is installed.

8. The seat belt retractor according to claim 7, wherein the housing includes a cam portion against which the press member is capable of abutting,
the press member is separated from the cam portion before the drive member is operated, and
the press member abuts against the cam portion when the drive member is operated.

9. The seat belt retractor according to claim 6, further comprising an occupant information acquisition unit that acquires occupant information, and a controller that determines whether the occupant information acquired by the occupant information acquisition unit satisfies a condition set in advance and that operates the drive mechanism according to a determination result.

10. The seat belt retractor according to claim 9, further comprising a pretensioner mechanism that rotates the spool in a seat belt retracting direction when in an emergency.

11. The seat belt retractor according to claim 10, wherein the controller operates the drive mechanism according to the determination result, after the pretensioner mechanism has completed retracting the seat belt.

12. The seat belt retractor according to claim 10, wherein the controller operates the drive mechanism according to the determination result, before or at a same time as the pretensioner mechanism starts to retract the seat belt.

13. A seat belt retractor comprising:
a frame;
a seat belt;
a spool that is rotatably supported by the frame and that retracts the seat belt;
a lock mechanism that allows rotation of the spool while not in operation and that prevents rotation of the spool in a seat belt withdrawing direction while in operation;
an energy absorption mechanism that restricts a load acting on the seat belt and that absorbs energy of an occupant;
a drive mechanism that switches energy absorbed by the energy absorption mechanism;
a pretensioner mechanism that rotates the spool in a seat belt retracting direction when in an emergency;
an occupant information acquisition unit that acquires occupant information; and
a controller that determines whether the occupant information acquired by the occupant information acquisition unit satisfies a condition set in advance and that operates the drive mechanism according to a determination result, wherein
the controller operates the drive mechanism according to the determination result, after the pretensioner mechanism has completed retracting the seat belt.

14. A seat belt retractor comprising:
a frame;
a seat belt;
a spool that is rotatably supported by the frame and that retracts the seat belt;
a lock mechanism that allows rotation of the spool while not in operation and that prevents rotation of the spool in a seat belt withdrawing direction while in operation;
an energy absorption mechanism that restricts a load acting on the seat belt and that absorbs energy of an occupant;
a drive mechanism that switches energy absorbed by the energy absorption mechanism;
a pretensioner mechanism that rotates the spool in a seat belt retracting direction when in an emergency;
an occupant information acquisition unit that acquires occupant information; and
a controller that determines whether the occupant information acquired by the occupant information acquisition unit satisfies a condition set in advance and that operates the drive mechanism according to a determination result, wherein
the controller operates the drive mechanism according to the determination result, before or at a same time as the pretensioner mechanism starts to retract the seat belt.

15. A seat belt apparatus comprising:
a seat belt that restricts an occupant;
a seat belt retractor that retracts the seat belt in a withdrawable manner and that operates in an emergency to prevent the seat belt from being withdrawn;
a tongue that is slidably supported by the seat belt that has been withdrawn from the seat belt retractor; and
a buckle that is provided in a vehicle body or a vehicle seat and to which the tongue is detachably locked, wherein
the seat belt retractor according to claim 1 is employed as the seat belt retractor.

* * * * *